US007830566B2

(12) United States Patent
Yamada et al.

(10) Patent No.: US 7,830,566 B2
(45) Date of Patent: Nov. 9, 2010

(54) IMAGE PROCESSING METHOD AND DEVICE ENABLING FAITHFUL REPRODUCTION OF APPEARANCE AND FURTHER PREFERRED COLOR REPRODUCTION OF APPEARANCE, IMAGE OUTPUT DEVICE AND DIGITAL CAMERA USING THE SAME, AND IMAGE PROCESSING PROGRAM FOR EXECUTING THE IMAGE PROCESSING METHOD AND RECORDING MEDIUM ON WHICH THE PROGRAM IS RECORDED

(75) Inventors: Makoto Yamada, Kanagawa (JP); Takao Uchiyama, Kanagawa (JP); Hideyasu Ishibashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1431 days.

(21) Appl. No.: 10/944,268

(22) Filed: Sep. 20, 2004

(65) Prior Publication Data

US 2005/0275911 A1    Dec. 15, 2005

(30) Foreign Application Priority Data

Sep. 18, 2003   (JP)   ............................. 2003-325703
Mar. 26, 2004   (JP)   ............................. 2004-093284

(51) Int. Cl.
*G03F 3/08* (2006.01)
*H04N 1/46* (2006.01)
*G06F 15/00* (2006.01)
*G06K 1/00* (2006.01)
*G06K 9/00* (2006.01)

(52) U.S. Cl. .................. 358/518; 358/505; 358/509; 358/1.9; 382/162; 382/167

(58) Field of Classification Search ................. 358/500, 358/505, 518, 509, 1.9, 1.1, 501; 382/162, 382/167, 165; 345/601, 602
See application file for complete search history.

(56) References Cited

U.S. PATENT DOCUMENTS 5,299,015 A  *  3/1994   Imaide et al. ............ 348/229.1

(Continued)

FOREIGN PATENT DOCUMENTS

EP          1 079 605 A3    6/2004

(Continued)

*Primary Examiner*—Twyler L Haskins
*Assistant Examiner*—Ming Hon
(74) *Attorney, Agent, or Firm*—Sughrue Mion, PLLC

(57) ABSTRACT

The image processing method and device photograph a subject or transparent image to acquire calorimetric values of a subject image, acquire chromaticity information and illuminance information of a light source illuminating the subject and the transparent image, perform on the calorimetric values of the subject image chromatic adaptation correction based on the chromaticity information and the acquired illuminance information and contrast correction based on the illuminance, and correct the corrected calorimetric values to be output by an amount of flare in outputting the subject image, thereby enabling faithful reproduction of appearance. The method and device further perform at least one of contrast conversion and chroma conversion on the calorimetric values of the subject image based on a chromaticity value in a case where a degree of adaptation or an adaptation luminance is set higher than that determined for an illuminating color of the light source before performing the chromatic adaptation correction, thereby enabling faithful reproduction of appearance and preferred color reproduction of appearance.

105 Claims, 23 Drawing Sheets

U.S. PATENT DOCUMENTS

| | | | |
|---|---|---|---|
| 5,461,682 A * | 10/1995 | Nomura | 382/232 |
| 5,579,132 A | 11/1996 | Takahashi et al. | |
| 5,717,783 A * | 2/1998 | Endo et al. | 382/167 |
| 5,786,823 A * | 7/1998 | Madden et al. | 345/591 |
| 5,956,044 A * | 9/1999 | Giorgianni et al. | 345/590 |
| 6,027,201 A * | 2/2000 | Edge | 347/19 |
| 6,031,543 A * | 2/2000 | Miyashita et al. | 345/593 |
| 6,493,108 B1 * | 12/2002 | Hirai | 358/1.18 |
| 6,526,304 B1 * | 2/2003 | Patel et al. | 600/407 |
| 6,535,301 B1 * | 3/2003 | Kuwata et al. | 358/1.9 |
| 6,594,388 B1 | 7/2003 | Gindele et al. | |
| 6,628,822 B1 | 9/2003 | Nakabayashi et al. | |
| 6,693,642 B1 * | 2/2004 | Ogawa | 345/589 |
| 6,739,767 B2 | 5/2004 | Ikeda et al. | |
| 6,771,385 B1 * | 8/2004 | Iizuka et al. | 358/1.15 |
| 6,856,354 B1 * | 2/2005 | Ohsawa | 348/370 |
| 6,999,617 B1 | 2/2006 | Ohga | |
| 2001/0017627 A1 * | 8/2001 | Marsden et al. | 345/501 |
| 2002/0177086 A1 * | 11/2002 | Southby et al. | 430/405 |
| 2003/0058349 A1 * | 3/2003 | Takemoto | 348/222.1 |

FOREIGN PATENT DOCUMENTS

| | | |
|---|---|---|
| JP | 6-139323 A | 5/1994 |
| JP | 7-15612 A | 1/1995 |
| JP | 11-32228 A | 2/1999 |
| JP | 11-205620 A | 7/1999 |
| JP | 2000-50089 A | 2/2000 |
| JP | 2000-152269 A | 5/2000 |
| JP | 2000-261825 A | 9/2000 |
| JP | 2001-60082 A | 6/2001 |
| JP | 2002-51231 A | 2/2002 |
| JP | 2002-300415 A | 10/2002 |
| JP | 2003-244467 A | 8/2003 |

* cited by examiner

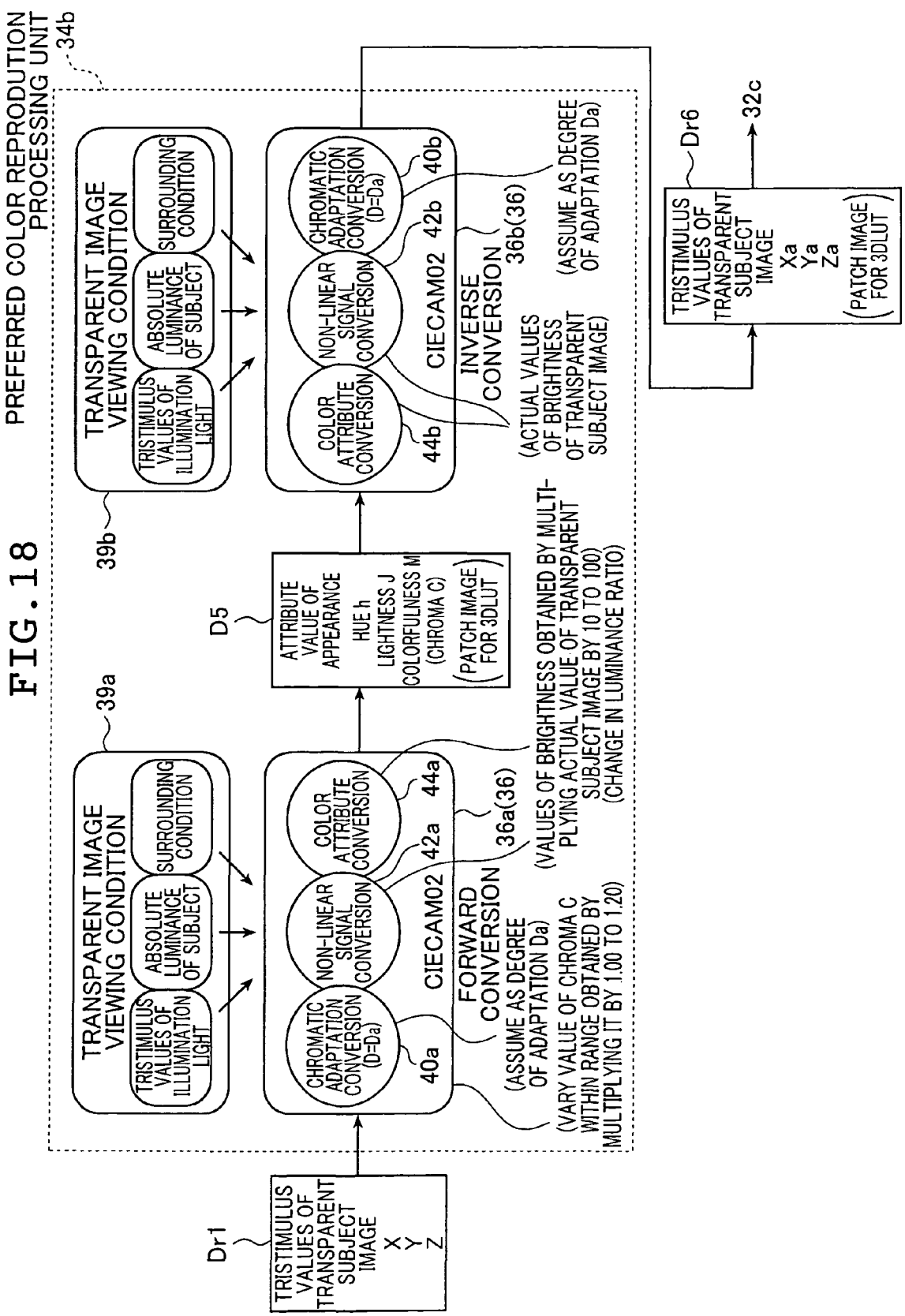

IMAGE PROCESSING METHOD AND DEVICE ENABLING FAITHFUL REPRODUCTION OF APPEARANCE AND FURTHER PREFERRED COLOR REPRODUCTION OF APPEARANCE, IMAGE OUTPUT DEVICE AND DIGITAL CAMERA USING THE SAME, AND IMAGE PROCESSING PROGRAM FOR EXECUTING THE IMAGE PROCESSING METHOD AND RECORDING MEDIUM ON WHICH THE PROGRAM IS RECORDED

BACKGROUND OF THE INVENTION

1. Field of the Invention

The present invention relates to: an image processing method and an image processing device enabling faithful reproduction of appearance and further preferred color reproduction of appearance, for reproducing a subject image such as a subject image obtained directly by photographing a subject or from a color negative film or a displayed transparent image on a color reversal film (hereinafter, also simply referred to as a transparent image) on a color photo print (hereinafter, also simply referred to as a print) as a hardcopy image (a reflection image or a print image) and/or on a display screen (a monitor) as a softcopy image (a monitor display image); an image output device (an image forming device) and a digital camera using the image processing method and device; an image processing program for executing the image processing method; and a recording medium on which the image processing program is recorded.

More specifically, the present invention relates to: an image processing method and an image processing device enabling faithful reproduction of appearance of the above-mentioned subject image such as a subject or a displayed transparent image when the subject image (the subject or the displayed transparent image) is output to a display medium such as a print or a monitor display screen as a reproduced image and, in addition, enabling conversion for obtaining preferred color reproduction; an image output device (an image forming device) and a digital camera using the image processing method and device; an image processing program for executing the image processing method; and a recording medium on which the image processing program is recorded.

In particular, the present invention relates to: an image processing method and an image processing device enabling color conversion for faithfully reproducing the appearance of a subject image such as a subject or a displayed transparent image, and in addition, enabling color conversion to values (lightness and chroma) for achieving preferred color reproduction common to various subjects and scenes, that is, executing a color conversion method for creating a reproduced image such as a color print or a monitor image; an image output device (an image forming device) using the image processing method and device; an image processing program for executing the image processing method; and a recording medium on which the image processing program is recorded.

Throughout this specification, the term "subject" encompasses all objects to be photographed, which are present in a photographed scene by a digital camera or on a color negative film or a color reversal film (that is, not limited to a main subject such as a person and denotes the entire scene including the background). The term "appearance" of an image denotes a kind of subjective evaluation by multiple observers, and serves as an evaluation index of the appearance of a subject image (a photographed subject by a digital camera or on a color negative film and a displayed transparent image on a color reversal film) by multiple observers under an actual viewing condition.

2. Prior Art

In the technical field of photography, how to reproduce a subject (a photographed scene) on a print has been discussed since a long time ago. Although a unified answer for this question can hardly be found because the answer may differ depending on the contents of a subject, photographic conditions, or the regions and cultures. In the basic idea of photography, however, the reproduction closer to the visual impression of a human being (observer) when he/she sees a subject is preferred.

For example, from the above-described point of view, JP 6-139323 A discloses a method involving digitalizing an image photographed on a color negative film, obtaining colorimetric information of a subject by digital signal processing, and then reproducing calorimetric values on a print. According to the patent publication 1, by directly reproducing the obtained calorimetric values on a print, it is possible to faithfully reproduce the calorimetric values of a subject.

On the other hand, a transparent image on a color reversal film is capable of offering a vivid color which is lit up by high-luminance light from a projector or a viewer and is also capable of producing subtle shades of color or a wide range of colors. Therefore, the transparent image is mainly viewed on a projector, a viewer, or the like.

A transparent image on a color reversal film is also reproduced to be viewed as a photo print (a reflection image or a hardcopy image) similarly to a photographed image on a color negative film.

As described above, since the color reversal film is capable of offering a wide range of colors such as vivid colors lit up by light and subtle shades of color as compared with the color negative film, prints produced from the color reversal film is used by professional photographers, photography experts (high-level amateurs), and the like. In the current situation, however, general users use the prints obtained from the color reversal film less frequently than the prints produced from the color negative film.

In view of such a situation, there exists a digital photo printer capable of digitally processing and outputting not only an image photographed on a color negative film but also an image photographed on a color reversal film. However, since there is a request for reproduction of subtle shades of color or a wide range of colors on a print from a color reversal film, the existence of an optical print (analog print), which is obtained by direct printing from a color reversal film, is absolute. For this reason, a print superior to the optical print has not been developed until now. Therefore, the color reproduction unique to the transparent image on the color reversal film is not fully taken into consideration in the digital photo printer. The finish of a print from a transparent image on the color reversal film exclusively depends on the performance of a print photographic sensitive material in the actual situation.

Moreover, in recent years, there is a request for color reproduction with a high chroma also in an optical print with the increased chroma of a color reversal film.

In comparison of a print produced according to the method described in JP 6-139323 A and an original photographed scene (that is, a subject) with each other, the produced print sometimes practically fails to reproduce the appearance of the photographed scene. Similarly, in the case of a color reversal film, the produced print sometimes fails to reproduce the appearance of a transparent image to be viewed.

Furthermore, a user produces a photo print by reproducing a transparent image on a color reversal film after he/she views the transparent image with a projector, a viewer, or the like. Specifically, when a print is to be produced from a color reversal film, the user more frequently expects that the appearance of a transparent image on the color reversal film, which has been viewed with a projector, a viewer, or the like, is reproduced on the print, rather than the appearance of a subject image when a subject is photographed on the color reversal film.

However, the photo prints produced based on the transparent images on the color reversal films which are now sold in the market do not faithfully reproduce the color gradation of the originals of the transparent images to be viewed or "bright beauty", which is one of the characteristics of color reproduction. Therefore, there is a problem in that the user who expects the reproduction of finesse of the original of a transparent image on a print cannot be fully satisfied. Specifically, the print produced based on a transparent image on a color reversal film is not produced by an image processing method for providing the reproduction close to the visual impression that a human being (observer) has when he/she sees the transparent image, and therefore has a problem in that its finish depends on the performance of the photographic sensitive material of a print.

For the above-described reason, in the field of photo print production such as in a laboratory, in order to achieve a match in appearance between a transparent image on a color reversal film viewed with a viewer or the like and a print, an operator displays digital image data read by a scanner such as a digital photo printer from an image on a color reversal film on a display or the like in which the matching between a printer output and the corresponding color is achieved, and also observes the transparent image on the color reversal film displayed on the viewer so as to manually adjust the digital image data for matching between the appearance of the display image on the display, which is color adjusted with a hardcopy printer for output, and the appearance of the transparent image. However, the adjustment is not only extremely difficult but also extremely troublesome. In the case of an inexperienced operator, in particular, there is a problem in that expected results cannot always be obtained.

SUMMARY OF THE INVENTION

The present invention is devised in view of the above problems and has a first object of providing: an image processing method and an image processing device, which solve the above-described problems in the conventional techniques to enable faithful reproduction of the appearance of a subject; an image output device and a digital camera using the image processing method and the image processing device; an image processing program for executing the image processing method; and a recording medium on which the image processing program is recorded.

A second object of the present invention is to provide: an image processing method and an image processing device, which solve the above-described problems to enable faithful reproduction of the appearance of a subject and further preferred color reproduction of an appearance, enabling the enhancement of contrast and chroma for a visual appearance as natural as possible for an image, on which the appearance of the subject is faithfully reproduced, and the enhancement of contrast and chroma for avoiding unnatural reproduction even when a subject is illuminated with a non-white light source; an image output device and a digital camera using the image processing method and the image processing device; an image processing program for executing the image processing method; and a recording medium on which the image processing program is recorded.

A third object of the present invention is to provide: an image processing method and an image processing device, which solve the above-described problems in the conventional techniques to enable faithful reproduction of an appearance and further preferred color reproduction of an appearance, enabling the reproduction of the visual impression when a human being observes a transparent image on a color reversal film, that is, a transparent original image (transparent subject image) on a photo print and, in addition, enabling the acquisition of optimal values of brightness, contrast, and chroma enhancement common to various subjects and scenes for an image on which the appearance of the transparent image is reproduced so as to set the optimal values as optimal main performance of the print image on which the appearance is reproduced; an image forming device using the image processing method and the image processing device; an image processing program for executing the image processing method; and a recording medium on which the image processing program is recorded.

Specifically, the present invention has an object of obtaining colorimetric information of a transparent image to be viewed and reproducing the calorimetric values on a print directly or after contrast or chroma enhancement for further preferred reproduction so as to produce a photo print obtained based on the transparent image on a color reversal film, thereby reproducing the beauty of an original of the transparent image on a print.

A fourth object of the present invention is to provide: an image processing method and an image processing device, which solve the above-described problems in the conventional techniques to enable faithful reproduction of an appearance and further preferred color reproduction of an appearance, enabling the reproduction of a visual impression of the appearance of a subject image when a subject is photographed or a visual impression of the appearance when a subject image such as a transparent image on a color reversal film is viewed on a photo print or a monitor display image, and in addition, enabling the acquisition of optimal values of brightness, contrast, and chroma enhancement common to various subjects or scenes for an image on which the appearance of the subject image is reproduced so as to perform the image reproduction suitable for each of the subjects or scenes to reproduce an image optimal for the subject or scene and also the automation of the color conversion processing; an image forming device using the image processing method and the image processing device; an image processing program for executing the image processing method; and a recording medium on which the image processing program is recorded.

A fifth object of the present invention is to provide: an image processing method and an image processing device, which solve the above-described problems in the conventional techniques to enable faithful reproduction of an appearance and further preferred color reproduction of an appearance, enabling the reproduction of a visual impression of the appearance of a subject image when a subject is photographed or a visual impression of the appearance when a subject image such as a transparent image on a color reversal film is viewed, on a photo print or a monitor display image, and in addition, enabling the acquisition of optimal values of brightness, contrast, and chroma enhancement common to various subjects or scenes for an image on which the appearance of the subject image is reproduced so as to implement the image reproduction suitable for each of the subjects or scenes to reproduce an image optimal for the subject or scene and also the automation of the color conversion processing; an image forming device using the image processing method and the image processing device; an image processing program for executing the image processing method; and a recording medium on which the image processing program is recorded.

The inventors of the present invention have keenly studied to achieve the above objects. As a result, the inventors of the present invention have found the following. In the case of a color negative film, when a print produced in accordance with the method described in JP 6-139323 A was compared with a photographed original scene (that is, a subject), the print did not actually reproduce the appearance of the photographed scene in some cases. Similarly, in the case of a color reversal film, a produced print did not reproduce the appearance of a transparent image to be viewed. As a result of examination of conditions under which such an appearance mismatch occurs, it was found that a phenomenon of appearance mismatch occurred under the following three conditions. Specifically, 1. There is a difference between an absolute brightness of a scene (a subject or a transparent image to be viewed) and an absolute brightness when a print is viewed;

2. There is a difference between an illumination color of a scene and an illumination color in viewing a print; and 3. There is viewing flare depending on the print viewing environment.

In the conventional method of reproducing calorimetric values from a color negative film described in JP 6-139323 A, it is found that the appearance of a scene sometimes failed to be reproduced even if colorimetric values estimated from a color negative film were accurately reproduced on a print because the above-described factors were not taken into account. Even for a transparent image on a color reversal film, it is found that the appearance of a transparent image to be viewed could not be reproduced. Specifically, if the conventional method described in the patent publication 1 for reproducing colorimetric values of a color negative film is applied to a color reversal film, it is found that the appearance of a transparent image to be viewed cannot be reproduced in some cases even though calorimetric values estimated from a color reversal film can be accurately reproduced on a print because the above-described factors are not taken into account. Accordingly, the present invention has been achieved.

In order to achieve the above-described first object, a print offering the appearance of a subject can be produced by the following method disclosed in the present invention for faithfully reproducing the appearance of a subject on a print. It is certain that the thus obtained print provides the faithful reproduction of the appearance of a scene. When the print is viewed as a single print, however, it is found that some images rather lack in sharpness depending on the print or the scene, resulting in so-called flat and unimpressive images.

Therefore, such images are generally processed to enhance the contrast or to increase the color chroma. Since various methods thereof have conventionally been proposed, the color gradation or chroma is varied by using the methods to successfully achieve an image offering preferred color reproduction. In such methods, however, it was found that the following problems arose.

4. When a subject is reproduced under a non-white light source, the image is reproduced leaving the color of the light source at a certain ratio in consideration of incomplete chromatic adaptation. If the contrast or the chroma is enhanced for such an image, the color of the light source is much more enhanced than needed. For example, when white paper is viewed under significantly reddish illumination such as tungsten illumination, the white paper normally looks white to a human being even if the illumination is red because of the effects of adaptation of the human being. However, if the color of the light source is extremely strong, the white paper does not look perfectly white but looks slightly reddish. Therefore, when the appearance of a subject is to be reproduced, a print is reproduced to slightly leave the reddishness without completely eliminating the reddishness of the light source. However, if the chroma is increased to provide the sharpness or the impressiveness for the image, the tint of the light source, that is, the reddishness is fairly enhanced because the reddishness is left. As a result, a critical problem in appearance is generated.

5. There are an extremely large number of methods of varying the chroma or the gradation. Therefore, how to convert the chroma or the gradation on the image on which the appearance is reproduced is a problem, that is, there is a problem in that the best choice or a suitable choice of a method is not clear.

6. If the chroma or the gradation is varied, it is not known by which degree of variation in chroma or gradation the preferred reproduction of an appearance is obtained. Specifically, it is not clear which degree of variation achieves the most preferred reproduction.

In particular, the second to fifth objects of the present invention are to provide: an image processing method and an image processing device, which solve the above problems to enable faithful reproduction of the appearance of a subject image such as a subject or a transparent image to be viewed and to enable the reproduction of an image, on which preferred color reproduction is achieved, as a print image or a monitor display image; an image output device using the image processing method and the image processing device; an image processing program for executing the image processing method; and a recording medium on which the image processing program is recorded.

In order to attain the first object described above, a first mode of a first aspect according to the present invention provides an image processing method, comprising: photographing a subject to acquire calorimetric values of a subject image that is thus photographed; acquiring chromaticity information and illuminance information of a light source illuminating the subject; performing chromatic adaptation correction on the calorimetric values of the subject image based on the chromaticity information and the acquired illuminance information of the light source that are acquired; performing contrast correction on the calorimetric values of the subject image based on the illuminance information of the light source; and correcting the calorimetric values of the subject image which are subjected to the chromatic adaptation correction and the contrast correction by an amount of flare in outputting the subject image as one of a hardcopy image and a softcopy image to obtain the corrected calorimetric values of the subject image a stristimulus values to be output.

In order to attain the second object described above, a first mode of a second aspect according to the present invention provides an image processing method, comprising: photographing a subject to acquire calorimetric values of a subject image that is thus photographed; acquiring chromaticity information and illuminance information of a light source illuminating the subject; performing at least one of contrast conversion and chroma conversion on the calorimetric values of the subject image based on a chromaticity value in a case where a degree of adaptation is set higher than that obtained from the chromaticity information and the illuminance information of the light source that are acquired to obtain converted calorimetric values of the subject image; performing chromatic adaptation correction on the converted calorimetric values of the subject image based on the chromaticity information and the illuminance information of the light source; performing contrast correction on the converted colorimetric values of the subject image based on the illuminance information of the light source; and correcting the converted calorimetric values of the subject image which are subjected to the chromatic adaptation correction and the contrast correction by an amount of flare in outputting the subject image as one of a hardcopy image and a softcopy image to obtain the corrected calorimetric values of the subject image as tristimulus values to be output.

Preferably, the contrast conversion comprises conversion equivalent to an illuminance of the subject virtually being within a range of 10,000 to 100,000 Lux.

And, the chroma conversion is performed by providing an increase in colorfulness value equivalent to an increase in luminance of the subject obtained by multiplying an actual value preferably by 5 to 150; more preferably, or in a case where the subject image is a landscape, by 15 to 150; and the chroma conversion is performed by providing an increase in colorfulness value equivalent to an increase in luminance of the subject obtained by multiplying an actual value more preferably by 5 to 20 in a case where the subject image comprises a portrait image and priority is given to skin color.

Further, preferably, the chromaticity value in the case where the degree of adaptation is set higher than that obtained from the chromaticity information and the illuminance information of the light source is a chromaticity value when it is assumed that perfect or almost perfect adaptation to the light source is achieved.

In addition, in the image processing method of the first mode of the first and second aspect, preferably, the chromaticity information and the illuminance information of the light source are acquired by actual measurement with a measuring device.

And, preferably, the illuminance information of the light source is acquired by estimation from a photometric value obtained in photographing the subject.

Preferably, the chromaticity information of the light source is acquired by estimation from one of a white point and an average chromaticity in the subject, or the chromaticity information of the light source is acquired by acquiring a chromaticity of an object having a known reflectance in the subject.

Further, preferably, a flare rate in viewing one of the hardcopy image and the softcopy image is acquired in advance to correct the amount of flare by using the acquired flare rate in accordance with a viewing environment.

Meanwhile, in order to attain the first object described above, a second mode of the first aspect according to the present invention provides an image processing device, comprising: imaging means for imaging a subject to acquire calorimetric values of a subject image; acquisition means for acquiring chromaticity information and illuminance information of a light source illuminating the subject; chromatic adaptation correction means for performing chromatic adaptation correction on the calorimetric values of the subject image based on the chromaticity information and the illuminance information of the light source that are acquired; contrast correction means for performing contrast correction on the calorimetric values of the subject image based on the illuminance information of the light source; and flare correction means for correcting the calorimetric values of the subject image which are subjected to the chromatic adaptation correction and the contrast correction by an amount of flare in accordance with a viewing environment of one of a hardcopy image and a softcopy image of the subject image.

In addition, in order to attain the second object described above, a second mode of the second aspect according to the present invention provides an image processing device, comprising: imaging means for imaging a subject to acquire calorimetric values of a subject image; acquisition means for acquiring chromaticity information and illuminance information of a light source illuminating the subject; conversion means for performing at least one of contrast conversion and chroma conversion on the calorimetric values of the subject image based on a chromaticity value in a case where a degree of adaptation is set higher than that obtained from the chromaticity information and the illuminance information of the light source that are acquired to obtain converted calorimetric values of the subject image; chromatic adaptation correction means for performing chromatic adaptation correction on the converted calorimetric values of the subject image based on the chromaticity information and the illuminance information of the light source that are acquired; contrast correction means for performing contrast correction on the converted calorimetric values of the subject image based on the illuminance information of the light source; and flare correction means for correcting the converted calorimetric values of the subject image which are subjected to the chromatic adaptation correction and the contrast correction by an amount of flare in accordance with a viewing environment of one of a hardcopy image and a softcopy image of the subject image.

In the image processing device of the second mode of the second aspect according to the present invention, preferably, the conversion means performs conversion equivalent to an illuminance of the subject virtually being within a range of 10,000 to 100,000 Lux as the contrast conversion.

And, the conversion means performs the chroma conversion to provide an increase in colorfulness value equivalent to an increase in luminance of the subject obtained by multiplying an actual value preferably by 5 to 150; more preferably, or in a case where the subject image is a landscape, by 15 to 150; and the conversion means performs the chroma conversion to provide an increase in colorfulness value equivalent to an increase in luminance of the subject obtained by multiplying an actual value more preferably by 5 to 20 in a case where the subject image comprises a portrait image and priority is given to skin color.

Preferably, the chromaticity value in the case where the degree of adaptation is set higher than that obtained from the chromaticity information and the illuminance information of the light source is a chromaticity value when it is assumed that perfect or almost perfect adaptation to the light source is achieved.

Additionally, in the image processing device of the second mode of the first and second aspect according to the present invention, preferably, the acquisition means comprises a measuring device for actually measuring a chromaticity and an illuminance of the light source.

And, preferably, the acquisition means acquires the illuminance information of the light source by estimation from a photometric value obtained in imaging the subject. Preferably, the acquisition means acquires the chromaticity information of the light source by estimation from one of a white point and an average chromaticity in the subject and the acquisition means acquires a chromaticity of an object having a known reflectance in the subject to acquire the illuminance information of the light source.

It is preferable that the image processing device further comprises flare rate acquisition means for acquiring in advance a flare rate in viewing one of the hardcopy image and the softcopy image, wherein the flare correction means corrects the amount of flare by using the acquired flare rate in accordance with a viewing environment.

In order to attain the first and second object described above, a third mode of the first and second aspect according to the present invention provides an image output device, comprising: the image processing device of the second mode of the first and second aspect; and image output means for outputting one of a hardcopy image and a softcopy image based image data being subjected to correction processing in the image processing device.

Moreover, in order to attain the first and second objects described above, a sixth mode of the first and second aspect according to the present invention provides a digital camera, comprising: the image processing device of the second mode of the first and second aspect; and image display means for displaying an image based on image data being subjected to correction processing in the image processing device.

In order to attain the first and second objects described above, a fourth mode of the first and second aspect according to the present invention provides an image processing program for executing the image processing method of the first mode of the first and second aspect by computer control.

Further, in order to attain the first and second objects described above, a fifth mode of the first and second aspect according to the present invention provides a computer readable recording medium, on which the image processing program of the fourth mode of the first and second aspect is recorded.

In order to attain the third object described above, a first mode of a third aspect according to the present invention provides an image processing method, comprising: acquiring digital data of a transparent image on a color reversal film to calculate calorimetric values of the transparent image from the digital data; acquiring chromaticity information and illuminance information of a light source illuminating the transparent image to be viewed on the color reversal film; performing at least one of contrast conversion and chroma conversion on the calorimetric values of the transparent image based on a chromaticity value in a case where an adaptation luminance is set higher than that obtained from the chromaticity information and the illuminance information of the light source that are acquired to obtain converted calorimetric values of the transparent image to be viewed; performing chromatic adaptation correction on the converted calorimetric values of the transparent image to be viewed based on the chromaticity information and the illuminance information of the light source; performing contrast correction on the converted calorimetric values of the transparent image to be viewed based on the illuminance information of the light source; and correcting the converted calorimetric values of the transparent image which are subjected to the chromatic adaptation correction and the contrast correction by an amount of flare in outputting the transparent image to be viewed as a photographic print image to obtain colorimetric values to be output.

Here, preferably, the contrast conversion performs conversion equivalent to a viewing illuminance of the transparent image on the color reversal film being virtually within a range of 30,000 to 300,000 Lux.

Preferably, in the chroma conversion, an increase rate of chroma is within a range of 1.0 to 1.2 times and a viewing illuminance of the transparent image on the color reversal film is within a range of 30,000 to 300,000 Lux.

Further, preferably, in the chroma conversion, an increase rate of chroma is within a range of 1.0 to 1.05 times and a viewing illuminance of the transparent image on the color reversal film is within a range of 50,000 to 200,000 Lux as optimal values.

Preferably, the chromaticity value in the case where the adaptation luminance is set higher than that obtained from the chromaticity information and the illuminance information of the light source is a chromaticity value when it is assumed that perfect or almost perfect adaptation to the light source is achieved.

Preferably, an enhancement parameter set in at least one of the contrast conversion and the chroma conversion comprises at least one of a luminance ratio, a chroma, a contrast, and a colorfulness.

Preferably, the calorimetric values comprise tristimulus values.

Preferably, at least one of the contrast conversion and the chroma conversion, the chromatic adaptation correction, the contrast correction, and the correction of the amount of flare are made as a three-dimensional color conversion table for converting the calorimetric values of the transparent image into the calorimetric values to be output from the calorimetric values of the transparent image.

Preferably, color conversion for altering a part of the three-dimensional color conversion table is added to the three-dimensional color conversion table.

Further, preferably, the three-dimensional color conversion table comprises a three-dimensional lookup table for color conversion, and the color conversion for altering the part of the three-dimensional color conversion table is added to the three-dimensional color conversion table by obtaining a distance from an aim color in color correction to a lattice point in the three-dimensional lookup table in a color space, obtaining an amount of conversion of the lattice point necessary for converting the aim color into a desired target color in accordance with the obtained distance to correct the three-dimensional lookup table.

Preferably, the chromaticity information and the illuminance information of the light source are acquired by actual measurement with a measuring device.

Preferably, the illuminance information of the light source is acquired by estimation from a photometric value of a viewing environment of the transparent image.

Preferably, the chromaticity information of the light source is acquired by estimation from one of a white point in the transparent image to be view and an average chromaticity.

Further, preferably, a flare rate in viewing the hardcopy image (a print image) is acquired in advance to correct the amount of flare by using the acquired flare rate in accordance with a viewing environment.

Moreover, in order to attain the third object described above, a second mode of the third aspect according to the present invention provides an image processing device, comprising: imaging means for photoelectrically reading a transparent image on a color reversal film to acquire digital data of the transparent image to calculate calorimetric values of the transparent image from the thus acquired digital data; acquisition means for acquiring chromaticity information and illuminance information of a light source illuminating the transparent image to be viewed on the color reversal film; conversion means for performing at least one of contrast conversion and chroma conversion on the calorimetric values of the transparent image to be viewed based on a chromaticity value in a case where an adaptation luminance is set higher than that obtained from the chromaticity information and the illuminance information of the light source that are acquired to obtain converted calorimetric values of the transparent image to be viewed; chromatic adaptation correction means for performing chromatic adaptation correction on the converted calorimetric values of the transparent image to be viewed based on the chromaticity information and the illuminance information of the light source that are acquired; contrast correction means for performing contrast correction on the converted calorimetric values of the transparent image to be viewed based on the illuminance information of the light source; and flare correction means for correcting the converted calorimetric values of the transparent image to be viewed which are subjected to the chromatic adaptation correction and the contrast correction by an amount of flare in accordance with a viewing environment of a photographic print image of the transparent image to be viewed.

Here, preferably, the conversion means performs conversion equivalent to a viewing illuminance of the transparent image on the color reversal film being virtually within a range of 30,000 to 300,000 Lux as the contrast conversion.

Preferably, the conversion means performs conversion with an increase rate of chroma being within a range of 1.0 to 1.2 times and a viewing illuminance of the transparent image on the color reversal film being within a range of 30,000 to 300,000 Lux as the chroma conversion.

Preferably, the conversion means performs conversion with an increase rate of chroma being within a range of 1.0 to 1.05 times and a viewing illuminance of the transparent image on the color reversal film being within a range of 50,000 to 200,000 Lux as optimal values of the chroma conversion.

Preferably, the chromaticity value in the case where the adaptation luminance is set higher than that obtained from the chromaticity information and the illuminance information of the light source comprises a chromaticity value when it is assumed that perfect or almost perfect adaptation to the light source is achieved.

Preferably, an enhancement parameter set in at least one of the contrast conversion and the chroma conversion comprises at least one of a luminance ratio, a chroma, a contrast, and a colorfulness.

Preferably, the calorimetric values comprise tristimulus values.

Preferably, the acquisition means comprises a measuring device for actually measuring a chromaticity and an illuminance of the light source.

And, preferably, the acquisition means acquires the illuminance information of the light source by estimation from a photometric value of a viewing environment of the transparent image.

Preferably, the acquisition means acquires the illuminance information of the light source by estimation from one of a white point in the transparent image to be viewed and an average chromaticity.

It is preferable that the image processing device further comprises flare rate acquisition means for acquiring in advance a flare rate in observing the hardcopy image (a print image), wherein the flare correction means corrects the amount of flare by using the acquired flare rate in accordance with a viewing environment.

And, in order to attain the third object described above, a third mode of the third aspect according to the present invention provides an image forming device comprising: the image processing device of the second mode of the third aspect; and image output means for outputting a photographic print image (a hard copy image) based on output image data being subjected to correction processing in the image processing device.

In order to attain the third object described above, a fourth mode of the third aspect according to the present invention provides an image processing program for executing the image processing method of the first mode of the third aspect by computer control.

Further, in order to attain the third object described above, a fifth mode of the third aspect according to the present invention provides a computer readable recording medium, on which the image processing program of the fourth mode of the third aspect is recorded.

In order to attain the fourth object described above, a first mode of the fourth aspect according to the present invention provides an image processing method, comprising: acquiring first digital image data of a subject image; acquiring chromaticity information and illuminance information of a first illuminating light source illuminating one of the subject image and a subject thereof; acquiring chromaticity information and illuminance information of a second illuminating light source in viewing a reproduced image of the subject image; and performing on the first digital image data appearance conversion processing for obtaining a match between an appearance of the reproduced image on which the subject image is reproduced and an appearance of the subject image by using the chromaticity information and the illuminance information of the first and second illuminating light sources, wherein the appearance conversion processing includes: at least one of contrast conversion and chroma conversion performed on colorimetric values of the subject image obtained from the first digital image data based on a chromaticity value in a case where an adaptation luminance is set higher than that obtained from the chromaticity information and the illuminance information of the first illuminating light source to obtain converted calorimetric values of the subject image; chromatic adaptation correction performed on the converted calorimetric values of the subject image based on the chromaticity information and the illuminance information of the first and second illuminating light sources; contrast correction performed on the converted calorimetric values of the subject image based on the illuminance information of the first and second illuminating light sources; and flare correction for correcting the colorimetric values of the subject image which are subjected to the chromatic adaptation correction and the contrast correction by an amount of flare in outputting the subject image as the reproduced image to obtain calorimetric values of the reproduced image to be output, at least one processing of the contrast conversion, the chroma conversion, the chromatic adaptation correction, the contrast correction and the flare correction includes a plurality of conversion processes with different conversion intensities for a single kind of conversion process, a single conversion process is selected from the plurality of conversion processes in accordance with the first digital image data of the subject image, and the appearance conversion processing is performed by performing the at least one processing using the thus selected single conversion process and second digital image data of the reproduced image is obtained from the calorimetric values of the reproduced image to be output.

Preferably, the plurality of conversion processes are set by an image characteristic amount of the subject image.

Preferably, the single conversion process is selected from the plurality of conversion processes based on the image characteristic amount of the subject image obtained from the first digital image data of the subject image.

Preferably, the image characteristic amount of the subject image is obtained based on at least one attribute value including a lightness and a chroma of the subject image.

In order to attain the fifth object described above, a firth mode of a fifth aspect according to the present invention provides An image processing method, comprising: acquiring first digital image data of a subject image; acquiring chromaticity information and illuminance information of a first illuminating light source illuminating one of the subject image and a subject thereof; acquiring chromaticity information and illuminance information of a second illuminating light source in viewing a reproduced image of the subject image; and performing on the first digital image data appearance conversion processing for obtaining a match between an appearance of the reproduced image on which the subject image is reproduced and an appearance of the subject image by using the chromaticity information and the illuminance information of the first and second illuminating light sources, wherein the appearance conversion processing includes: at least one of contrast conversion and chroma conversion performed on colorimetric values of the subject image obtained from the first digital image data based on a chromaticity value in a case where an adaptation luminance is set higher than that obtained from the chromaticity information and the illuminance information of the first illuminating light source to obtain converted calorimetric values of the subject image; chromatic adaptation correction performed on the converted calorimetric values of the subject image based on the chromaticity information and the illuminance information of the first and second illuminating light sources; contrast correction performed on the converted calorimetric values of the subject image based on the illuminance information of the first and second illuminating light sources; and flare correction for correcting the calorimetric values of the subject image which are subjected to the chromatic adaptation correction and the contrast correction by an amount of flare in outputting the subject image as the reproduced image to obtain calorimetric values of the reproduced image to be output, at least one processing of the contrast conversion, the chroma conversion, the chromatic adaptation correction, the contrast correction and the flare correction includes a plurality of conversion processes with different conversion intensities for a single kind of conversion process, at least two conversion processes of the plurality of color conversion processes are synthesized in accordance with the first digital image data of the subject image to obtain one conversion process, and the appearance conversion processing is performed by performing the at least one processing using the thus synthesized one conversion process and second digital image data of the reproduced image is obtained from the calorimetric values of the reproduced image to be output.

Preferably, the plurality of conversion processes are set by an image characteristic amount of the subject image.

Preferably, the one conversion process is obtained by synthesizing the at least two conversion processes selected from the plurality of conversion processes based on an image characteristic amount of the subject image obtained from the first digital image data of the subject image.

Preferably, the image characteristic amount of the subject image is obtained based on at least one attribute value including a lightness and a chroma of the subject image, and the one conversion process to be obtained by synthesis is obtained based on the at least one attribute value.

In the image processing method of the first mode of the fourth and fifth aspect, preferably, the conversion process is performed using one or more color conversion tables.

Preferably, all processing in the appearance conversion processing is performed as single conversion processing, one kind of color conversion table is set as the single kind of conversion process for the single conversion processing, and a plurality of color conversion tables with the different enhancement parameters are set for the one kind of color conversion table as the plurality of conversion processes with the different conversion intensities for the one kind of conversion process.

Preferably, the enhancement parameters comprise a luminance ratio to a luminance under the first illuminating light source and a chroma.

Preferably, the subject image is obtained by photographing the subject, the first digital image data comprises one of image data photoelectrically read from a color negative film on which the subject is photographed and image data photoelectrically directly acquired by photographing the subject, and the first illuminating light source comprises a light source for illuminating the subject in photographing the subject.

Or, preferably, the subject image comprises a transparent image to be viewed, the first digital image data comprises image data of the transparent image, and the first illuminating light source comprises a light source for illuminating the transparent image when the transparent image is viewed.

Preferably, the transparent image comprises a transparent image to be viewed on a color reversal film, and the image data of the transparent image comprises image data photoelectrically read from the color reversal film.

Preferably, the reproduced image comprises a reflection image to be viewed, on which the subject image is reproduced, the second digital image data comprises image data for outputting the reflection image, and the second illuminating light source comprises a light source for illuminating the reflection image when the reflection image is viewed.

Preferably, the reflection image comprises a photographic print image.

Preferably, the chromaticity value in the case where the adaptation luminance is set higher than that obtained from the chromaticity information and the illuminance information of the first illuminating light source comprises a chromaticity value when it is assumed that perfect or almost perfect adaptation to the light source is achieved.

Preferably, the calorimetric values comprise tristimulus values.

Moreover, in order to attain the fourth object described above, a second object of the fourth aspect according to the present invention provides an image processing device, comprising: first acquisition means for acquiring first digital image data of a subject image; second acquisition means for acquiring chromaticity information and illuminance information of a first illuminating light source illuminating one of the subject image and a subject thereof; third acquisition means for acquiring chromaticity information and illuminance information of a second illuminating light source for viewing the reproduced image; and appearance conversion processing means for performing on the first digital image data appearance conversion processing for obtaining a match between an appearance of the reproduced image on which the subject image is reproduced and an appearance of the subject image by using the chromaticity information and the illuminance information of the first and second illuminating light sources, wherein the appearance conversion processing means performs as the appearance conversion processing at least one of contrast conversion and chroma conversion performed on calorimetric values of the subject image obtained from the first digital image data based on a chromaticity value in a case where an adaptation luminance is set higher than that obtained from the chromaticity information and the illuminance information of the first illuminating light source to obtain converted calorimetric values of the subject image, chromatic adaptation correction performed on the converted calorimetric values of the subject image based on the chromaticity information and the illuminance information of the first and second illuminating light sources, contrast correction performed on the converted calorimetric values of the subject image based on the illuminance information of the first and second illuminating light sources and flare correction for correcting the calorimetric values of the subject image which are subjected to the chromatic adaptation correction and the contrast correction by an amount of flare in outputting the subject image as the reproduced image to obtain calorimetric values of the reproduced image to be output, wherein the appearance conversion processing means includes: storage means for storing a plurality of color conversion tables with different conversion intensities for one kind of color conversion table for performing at least one processing of the contrast conversion, the chroma conversion, the chromatic adaptation correction, the contrast correction and the flare correction; and selection means for selecting one color conversion table from the plurality of color conversion tables in accordance with the first digital image data of the subject image, and wherein the appearance conversion processing is performed by performing the at least one processing using the selected one color conversion table and second digital image data of the reproduced image is obtained from the calorimetric values of the reproduced image to be output.

Preferably, the plurality of color conversion tables are set by an image characteristic amount of the subject image.

Preferably, the selection means selects the one color conversion table from the plurality of color conversion tables based on an image characteristic amount of the subject image obtained from the first digital image data of the subject image.

Preferably, the image characteristic amount of the subject image is obtained based on at least one attribute value including a lightness and a chroma of the subject image.

In order to attain the fifth object described above, a second mode of the fifth aspect according to the present invention provides an image processing device, comprising: first acquisition means for acquiring first digital image data of a subject image; second acquisition means for acquiring chromaticity information and illuminance information of a first illuminating light source illuminating one of the subject image and a subject thereof; third acquisition means for acquiring chromaticity information and illuminance information of a second illuminating light source in viewing the reproduced image; and appearance conversion processing means for performing on the first digital image data appearance conversion processing for obtaining a match between an appearance of the reproduced image on which the subject image is reproduced and an appearance of the subject image by using the chromaticity information and the illuminance information of the first and second illuminating light sources, wherein the appearance conversion processing means performs as the appearance conversion processing, at least one of contrast conversion and chroma conversion performed on calorimetric values of the subject image obtained from the first digital image data based on a chromaticity value in a case where an adaptation luminance is set higher than that obtained from the chromaticity information and the illuminance information of the first illuminating light source to obtain converted calorimetric values of the subject image, chromatic adaptation correction performed on the converted calorimetric values of the subject image based on the chromaticity information and the illuminance information of the first and second illuminating light sources, contrast correction performed on the converted calorimetric values of the subject image based on the illuminance information of the first and second illuminating light sources and flare correction for correcting the calorimetric values of the subject image which are subjected to the chromatic adaptation correction and the contrast correction by an amount of flare in outputting the subject image as the reproduced image to obtain calorimetric values of the reproduced image to be output, wherein the appearance conversion processing means includes: storage means for storing a plurality of color conversion tables with different conversion intensities for one kind of color conversion table for performing at least one processing of the contrast conversion, the chroma conversion, the chromatic adaptation correction, the contrast correction and the flare correction; and synthesis means for synthesizing at least two conversion processes of the plurality of color conversion tables into one color conversion table in accordance with the first digital image data of the subject image, and wherein the appearance conversion processing is performed by performing the at least one processing using the one color conversion table obtained by synthesis and second digital image data of the reproduced image is obtained from the colorimetric values of the reproduced image to be output.

Here, preferably, the plurality of color conversion tables are set by an image characteristic amount of the subject image.

Preferably, the synthesis means synthesizes the at least two color conversion tables selected from the plurality of color conversion tables into the one color conversion table based on an image characteristic amount of the subject image obtained from the first digital image data of the subject image.

And, preferably, the image characteristic amount of the subject image is obtained based on at least one attribute value including a lightness and a chroma of the subject image, and the one conversion process obtained by synthesis is obtained based on the at least one attribute value.

In the image processing device of the second mode of the fourth and fifth aspect according to the present invention, preferably, the appearance conversion processing means performs all processing of the appearance conversion processing as single conversion processing, the one kind of color conversion table is set for the single conversion processing, and a plurality of color conversion tables with different enhancement parameters are set as the plurality of color conversion tables with the different conversion intensities for the one kind of color conversion table.

Preferably, the enhancement parameters comprise a luminance ratio to a luminance under the first illuminating light source and a chroma.

In order to attain the fourth and fifth objects described above, a third mode of the fourth and fifth aspect according to the present invention provides an image forming device comprising: the image processing device of the second mode of the fourth and fifth aspect; and image output means for outputting a photographic print image based on second digital image data of a reproduced image being subjected to appearance conversion processing in the image processing device.

In order to attain the fourth and fifth objects described above, a fourth aspect of the fourth and fifth aspect according to the present invention provides an image processing program for executing the image processing method of the first mode of the fourth and fifth aspect by computer control.

And, in order to attain the fourth and fifth objects described above, a fifth mode of the fourth and fifth aspect according to the present invention provides a computer readable recording medium, on which the image processing program of the fourth mode of the fourth and fifth aspect is recorded.

According to the first and second modes of the first aspect of the present invention, remarkable effects of achieving an image processing method and an image processing device enabling faithful reproduction of the appearance of a subject are produced.

Therefore, according to the first, second, fifth, and sixth modes of the first aspect of the present invention, a hardcopy image such as a print on which the appearance of a subject is faithfully reproduced or a softcopy image such as a monitor image can be obtained.

Moreover, according to the first and second modes of the second aspect of the present invention, remarkable effects of achieving an image processing method and an image processing device, which enable appropriate or natural contrast conversion or chroma conversion on an image, on which the appearance of a subject is reproduced, are produced.

Therefore, according to the first, second, fifth, and sixth modes of the first aspect of the present invention, appropriate contrast change or chroma change can be performed on an image, on which the appearance of a subject is reproduced, even if an illumination color of a light source is not white. Moreover, a method of enhancing the contrast or the chroma in a natural manner can be provided for an image, on which the appearance of a subject is reproduced.

According to the third and fourth modes of the first aspect of the present invention, remarkable effects of achieving an image output device and a digital camera based on the above-described technique are produced.

According to the third aspect of the present invention, the appearance of a transparent image to be viewed on a color reversal film, in particular, the color gradation of an original of the transparent image to be viewed and one of the characteristics of the color reproduction, "bright beauty", that is, the beauty of the original of the transparent image are faithfully reproduced. In addition, appropriate or natural contrast conversion, chroma conversion, or the like is performed to achieve preferred color reproduction common to various subjects or scenes.

Thus, according to the third aspect of the present invention, a photo print on which a fine and high-quality image of an original transparent image on a color reversal image is faithfully reproduced and, even more, a photo print on which further preferred color reproduction is achieved can be provided for a user. As a result, according to the third aspect of the present invention, the user expecting the reproduction of beauty of the original of a transparent image to be viewed on a print can be satisfied.

Moreover, according to the third aspect of the present invention, the image processing is incorporated into software so as to be automated. As a result, the visual impression of the original transparent image on a color reversal film can be easily reproduced on a photo print. Therefore, the working efficiency of printing in a laboratory where prints are produced can be significantly improved.

Furthermore, according to the fourth and fifth aspects of the present invention, in addition to faithful reproduction of the visual impression of the appearance of a subject to be photographed or the visual impression of the appearance of a transparent image on a color reversal film to be viewed as a reproduced image such as a photo print, appropriate or natural contrast conversion, chroma conversion, or the like is performed to provide preferred color reproduction common to various subjects or scenes.

In particular, according to the fourth and fifth aspects of the present invention, even in the case of a color reversal film, a photo print, on which a fine and high-quality image of an original transparent image is faithfully reproduced, and, even more, a photo print, on which further preferred color reproduction is achieved, can be provided for a user. As a result, according to the fourth and fifth aspects of the present invention, the user expecting the reproduction of beauty of the original of a transparent image to be viewed on a print can be satisfied.

Furthermore, if a color conversion table regarded as the most suitable for a color conversion table for conversion of an appearance regardless of scenes, for example, a color conversion table for a single condition is used when a reproduced image such as a photo print is to be produced, the structure can be simplified and the image reproduction can be performed for any scenes in a uniformly appropriate manner. However, appropriate image reproduction in accordance with the scene is not performed in some cases. On the other hand, in the fourth aspect of the present invention, a used color conversion table from a plurality of prepared color conversion tables is adaptively changed based on the characteristic of a subject image to be reproduced. In the fifth aspect of the present invention, a single appropriate color conversion table is produced by synthesizing a plurality of color conversion tables produced in advance under a plurality of conditions serving as the references. As a result, an optimal image based on the scene can be provided.

Furthermore, according to the fourth and fifth aspects of the present invention, the conversion of an appearance is incorporated as image processing software so as to be automated by the use of the color conversion table. As a result, the visual impression of a subject image can be easily reproduced on a photo print or a monitor. In particular, the working efficiency of printing in a laboratory for producing photo prints can be significantly improved.

This application claims priority on Japanese patent application Nos. 2003-325703 and 2004-093284, the entire contents of which are hereby incorporated by reference. In addition, the entire contents of literatures cited in this specification are incorporated by reference.

BRIEF DESCRIPTION OF THE DRAWINGS

FIG. 18 is a block diagram of an embodiment of a preferred color reproduction processing unit in the color conversion table creating section shown in FIG. 16.

BEST MODE FOR CARRYING OUT THE INVENTION

Hereinafter, an image processing method and an image processing device enabling faithful reproduction of an appearance and also enabling further preferred color reproduction of an appearance, an image output device and a digital camera using the image processing method and the image processing device, an image processing program for executing the image processing method, and a recording medium, on which the image processing program is recorded, according to the present invention, will be described in detail based on preferred embodiments illustrated in the accompanying drawings.

First, with reference to FIGS. 1 to 4, an image processing method, an image processing device, an image output device, and a digital camera in the first aspect of the present invention will be described.

Figure 1:
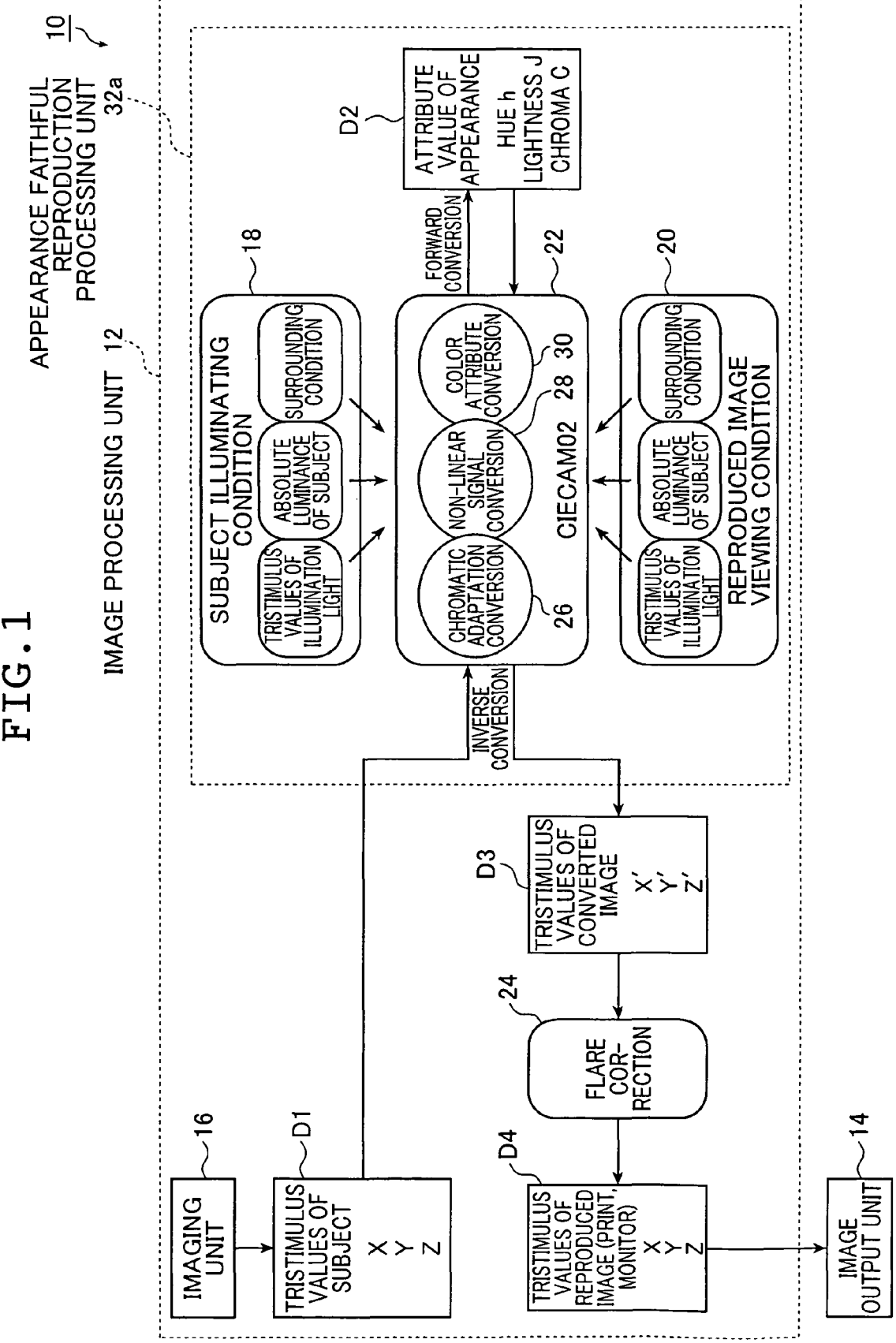
FIG. 1 is a block diagram of an embodiment of an image output device according to the present invention.

FIG. 1 is a block diagram of an embodiment of an image output device of the third mode, which is equipped with an image processing device of the second mode for executing the image processing method of the first mode of the first aspect according to the present invention.

As shown, an image output device 10 includes: an image processing unit 12 for correcting image data for faithful reproduction of the appearance of a subject; and an image output unit 14 for outputting an image to be viewed such as a hardcopy image (print) or a softcopy image (monitor) based on the image data which is subjected to the correction process for faithful reproduction of the appearance in the image processing unit 12.

The image processing unit 12 constitutes an embodiment of the image processing device of the second mode for executing the image processing method of the first mode in this aspect and serves to implement image processing so as to faithfully reproduce the appearance of a subject.

The image processing unit 12 includes: an imaging unit 16 for imaging a subject to acquire calorimetric values D1 (in this case, tristimulus values (XYZ) of a color of the subject) of each point on the subject image; an illuminating condition acquisition unit 18 for acquiring a subject illuminating condition for illuminating the subject; a viewing condition acquisition unit 20 for setting a viewing condition of a reproduced image obtained by reproducing the subject image; an appearance faithful reproduction conversion unit 22 for performing forward conversion of the calorimetric values D1 of the subject image by using the subject illuminating condition to obtain attribute values (a hue h, a lightness J, and a chroma C) D2 of color appearance and for performing inverse conversion of the thus obtained appearance attribute values D2 by using the reproduced image viewing condition so as to obtain calorimetric values D3 (tristimulus values (X'Y'Z') of an image to be output) of a converted image which is subjected to correction for faithful reproduction of an appearance; and a flare correction section 24 for correcting the amount of flare for the calorimetric values D3 of the converted image in accordance with the viewing environment of the reproduced image so as to obtain calorimetric values D4 of the subject image (tristimulus values (XYZ) of the reproduced image) to be output as the reproduced image (a hardcopy image (print) or a softcopy image (monitor)).

The illuminating condition acquisition unit 18, the viewing condition acquisition unit 20, and the appearance faithful reproduction conversion unit 22 are collectively configured as an appearance faithful reproduction processing unit 32a for performing the appearance faithful reproduction processing on the calorimetric values D1 of the subject image so as to obtain the calorimetric values D3 of the converted image (the tristimulus values (X'Y'Z') of the image to be output)).

The imaging unit 16 photographs the subject so as to obtain the calorimetric values D1 (the tristimulus values (XYZ) of the color of the subject) at each point on the subject image. The obtained calorimetric values D1 are input to the appearance faithful reproduction conversion unit 22. Any kind of imaging unit 16 may be used as long as it can obtain the calorimetric values D1 at each point on the subject image obtained by photographing the subject. For example, a photographic film obtained by photographing a subject may be read by using an imaging element such as a CCD or a CMOS sensor to obtain RGB data as digital data of the photographed image. Alternatively, the subject may be directly photographed with a digital still camera, a digital video camera, or the like to directly obtain digital data of the photographed image such as RGB data by using the imaging element. Then, the RGB data is converted into the calorimetric values D1, for example, the tristimulus values XYZ of the color of the subject. The calorimetric values used in the present invention are not limited to the tristimulus values (XYZ) of the color.

The illuminating condition acquisition unit 18 serves to acquire the tristimulus values of illumination light from a light source illuminating the subject, the luminance of the subject, and the surrounding conditions of the subject when the subject is photographed, that is, almost simultaneously with the photographing (immediately before and after the photographing). In the present invention, the illuminating condition acquisition unit 18 particularly serves to measure and record a chromaticity value and an absolute illuminance value of the illumination light from the illumination light source.

The viewing condition acquisition unit 20 serves to preset the viewing illuminating condition for viewing a reproduced image obtained by reproducing the subject image. The viewing condition acquisition unit 20 serves to obtain the tristimulus values of illumination light from the light source illuminating the reproduced image, the luminance of the subject, and the surrounding conditions of the subject. In the present invention, the viewing condition acquisition unit 20 particularly serves to measure and record in advance a chromaticity value and an absolute illuminance value of the illumination light when the reproduced image is viewed.

The appearance faithful reproduction conversion unit 22 serves to perform forward conversion of the calorimetric values D1 of the subject image (the tristimulus values (XYZ) of the subject) by using the subject illuminating condition to obtain the attribute values D2 (the hue h, the lightness J, and the chroma C) of color appearance and also to perform inverse conversion of the thus obtained appearance attribute values D2 by using the reproduced image viewing condition so as to obtain the calorimetric values D3 (tristimulus values (X'Y'Z') of an image to be output) of the converted image which is subjected to correction for faithful reproduction of an appearance. In the present invention, the appearance faithful reproduction conversion unit 22 is configured based on a color appearance model by CIECAM02 (Commission Internationale de l'Eclairage) in 2002 (CIECAM02 Color Appearance Model; see the Preceedings of IS & T/SID 10th Color Imaging Conference, pages 23 to 27). The appearance faithful reproduction conversion unit 22 includes: a chromatic adaptation conversion section 26 for chromatic adaptation correction; a non-linear signal conversion section 28 for contrast correction; and a color attribute conversion section 30 for chroma correction.

The CIECAM 02 gives five appearance attribute values, i.e., in addition to the hue h, the lightness J, and the chroma C respectively corresponding to HVC of the Munsell color system, a brightness Q serving as an index of the absolute brightness, that is, the amount of absolute sensation of brightness perceived by a human being, and a colorfulness M serving as an index of the amount of absolute sensation of color sharpness perceived by the human being. In this embodiment, however, only the hue h, the lightness J, and the chroma C are dealt with.

Herein, the chromatic adaptation conversion section 26 performs chromatic adaptation correction on the colorimetric values D1 of the subject image based on the chromaticity information (chromaticity value) and the illuminance information (absolute illuminance value) of the illumination light source acquired in the illuminating condition acquisition unit 18, and obtains calorimetric values reproduced under the viewing illuminating condition acquired in the viewing condition acquisition unit 20. Herein, specifically, for example, the chromatic adaptation conversion section 26 calculates the degree of adaptation (D) to an illumination color of a subject scene from the absolute illuminance value of the subject scene in forward conversion and calculates calorimetric values of a corresponding color for reproducing the appearance of the subject scene under the illumination used for viewing a reproduced image such as a print in inverse conversion.

Although a chromatic adaptation conversion section recommended by the CIECAM 02 is used as the chromatic adaptation conversion section 26 in the illustrated example, the present invention is not limited thereto. Any chromatic adaptation conversion section using various methods can be used as long as it is suggested for chromatic adaptation conversion.

Next, the non-linear signal conversion section 28 performs contrast correction on the calorimetric values D1 of the subject image based on the illuminance information (absolute illuminance value) of the illumination light source acquired in the illumination condition acquisition unit 18 so as to obtain calorimetric values reproduced under the viewing illuminating condition acquired in the viewing condition acquisition unit 20.

Herein, specifically, for example, in the forward conversion, the non-linear signal conversion section 28 calculates a contrast conversion characteristic from the absolute illuminance value of illumination of the subject scene and the absolute illuminance value of illumination for viewing the reproduced image so as to perform the contrast conversion on the calorimetric values of a corresponding color which are subjected to chromatic adaptation correction in the chromatic adaptation conversion section 26.

Although a non-linear signal conversion section recommended by the CIECAM 02 is used as the non-linear signal conversion section 28 in the illustrated example, the present invention is not limited thereto. Any non-linear signal conversion section using various methods can be used as long as it is suggested for contrast conversion.

In the above-described manner, the subject image which is subjected to appearance faithful reproduction correction in the appearance faithful reproduction conversion unit 22, that is, the calorimetric values D3 of the converted image can be obtained. The colorimetric values D3 of the converted image are input to the flare correction section 24.

The appearance faithful reproduction conversion unit 22 in the illustrated example performs, in forward conversion, the chromatic adaptation conversion in the chromatic adaptation conversion section 26, the non-linear signal conversion (contrast conversion) in the non-linear signal conversion section 28, and the color attribute conversion (chroma conversion) in the color attribute conversion section 30 based on the subject illuminating condition in a sequential manner so as to calculate the appearance attribute values D2 (the hue h, the lightness J, and the chroma C). In inverse conversion, the appearance faithful reproduction conversion unit 22 in the illustrated example performs the color attribute conversion (chroma conversion) in the section 30, the non-linear signal conversion (contrast conversion) in the section 28, and the chromatic adaptation conversion in the section 26 based on the viewing illuminating condition in a sequential manner on the calculated appearance attribute values D2 (the hue h, the lightness J, and the chroma C) so as to calculate the calorimetric values of the converted image. However, the present invention is not limited thereto. The forward conversion based on the subject illuminating condition and the inverse conversion based on the viewing illuminating condition may be performed in each of the conversion sections 26, 28, and 30.

Although the common appearance faithful reproduction conversion unit 22 is used for forward conversion as well as for inverse conversion in the appearance faithful reproduction processing unit 32a in the illustrated example, the present invention is not limited thereto. As in the case of an appearance faithful reproduction processing unit 32b shown in FIG. 2, the appearance faithful reproduction conversion unit 22 may be further composed of an appearance faithful reproduction forward conversion unit 22a and an appearance faithful reproduction inverse conversion unit 22b; the appearance faithful reproduction forward conversion unit 22a may be composed of a chromatic adaptation conversion section 26a, a non-linear signal conversion section 28a, and a color attribute conversion section 30a, while the appearance faithful reproduction inverse conversion unit 22b may be composed of a color attribute conversion section 30b, a non-linear signal conversion section 28b, and a chromatic adaptation conversion section 26b.

The flare correction section 24 corrects the amount of flare for the calorimetric values of the subject image which are subjected to chromatic adaptation correction and contrast correction, that is, the colorimetric values D3 of the converted image in accordance with the viewing environment of the reproduced image so as to obtain the calorimetric values D4 of the subject image (the tristimulus values (XYZ) of the reproduced image) to be output as a reproduced image (a hardcopy image (print) or a softcopy image (monitor)). Herein, specifically, the flare correction section 24 calculates, for example, the degree of decrease in density due to flare from the surrounding conditions when the reproduced image is viewed and performs density correction on the calorimetric values D3 of the converted image obtained in the appearance faithful reproduction conversion unit 22 so as to compensate for the decrease in density due to flare.

In this manner, the subject image achieving the faithful reproduction of the appearance of the subject, that is, the calorimetric values D4 of the reproduced image (tristimulus value (XYZ)) can be obtained in the image processing unit 12. The thus obtained calorimetric values D4 of the reproduced image are input to the image output unit 14.

The image output unit 14 creates and outputs a reproduced image so that the calorimetric values D4 of the image to be reproduced, which is finally obtained by performing the appearance faithful reproduction correction in the image processing unit 12, are reproduced on the reproduced image to be viewed such as a hardcopy image (print) or a softcopy image (monitor).

The thus output reproduced image is a hardcopy image such as a print or a softcopy image displayed on a monitor or the like, on which the appearance of the subject is faithfully reproduced.

Hereinafter, the image processing method, the image processing device, and the image output device according to the first to third modes of this aspect will be specifically described with an example.

Example 1

Hereinafter, the case where R, G, and B signals calculated by the image processing method according to the first mode of the first aspect of the present invention are input to a color digital printer corresponding to the image output device of the third mode of the first aspect to obtain a print image as a reproduced image will be described with reference to FIG. 3.

Figure 3:
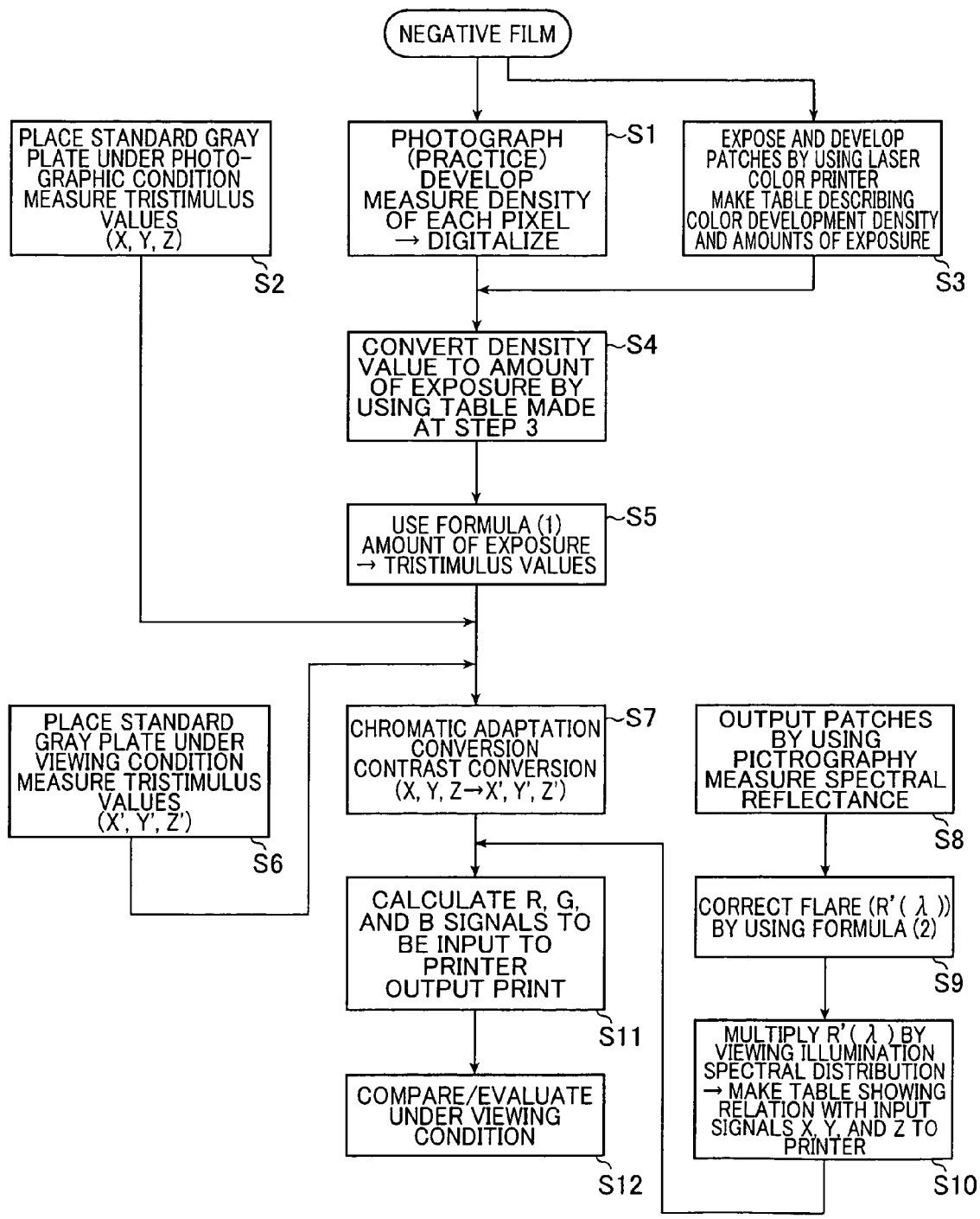
FIG. 3 is a flowchart for illustrating the flow of a series of processing in an embodiment of the image processing method according to the present invention.

FIG. 3 is a flowchart for illustrating the flow of a series of processing in this embodiment in the case where a silver salt photographic sensitive material is used.

Step S1:

A subject illuminated with a tungsten lamp at a color temperature of 3,000 K was photographed using a color negative film Superia 400 fabricated by Fuji Photo Film Co., Ltd. After development, the color negative film was scanned by a scanner SG-1000 fabricated by Dainippon Screen MFG Co., Ltd. to obtain digital image data.

Step S2:

For photographing the subject, a gray plate having a reflectance of 18% was placed at the same position as that of the subject. Tristimulus values of X, Y, and Z of the gray plate were measured by a luminance calorimeter CS-100 fabricated by Konica Minolta Holdings Inc.

Step S3:

A plurality of patches with the amounts of exposure of R, G, and B being respectively varied were output to the above color negative film by using a laser color printer described in SPIE vol. 1079, pages 90 to 98 to be scanned by the scanner SG-1000. A table describing the relation between each amount of exposure given to the color negative film and a density of color development was made.

Step S4:

The table made at the step S3 was used for the image data obtained at the step S1 to calculate the amounts of exposure R, G, and B given to each point in the image data.

Step S5:

CIE XYZ tristimulus values were calculated for the obtained amounts of exposure R, G, and B according to the following formula (1).

$$\begin{bmatrix} X \\ Y \\ Z \end{bmatrix} = M \cdot \begin{bmatrix} R \\ G \\ B \\ 1 \end{bmatrix} \tag{1}$$

where M is a matrix of 3 by 4; each factor is precalculated by optimization so that the amounts of exposure of R, G, and B obtained from the results of photographing a chart whose calorimetric values are known (for example, the Macbeth chart) represent target XYZ values in the best manner.

Step S6:

The gray plate was placed at the same position as the position where a print was placed in a photo print viewing environment illuminated with a color appraisal fluorescent lamp at a color temperature of 5,000 K with an illuminance of 300 Lux. Tristimulus values were measured with the above-described luminance calorimeter CS-100.

Step S7:

According to the method described in the Proceedings of IS & T/SID 10th Color Imaging Conference, pages 23 to 27, the chromatic adaptation conversion and the contrast conversion were implemented. In this case, tristimulus values X', Y', and Z' to be reproduced under the print viewing environment were calculated from the X, Y, and Z values of the subject scene. The tristimulus values of a background under each of the viewing conditions were set equal to those of the gray plate. The values obtained by multiplying the tristimulus values of the gray plate respectively by 5.56 were used as tristimulus values of adapted white.

Step S8:

A Pictography 3500 fabricated by Fuji Photo Film Co., Ltd. was used as a printer. Patches with R, G, and B input signals being respectively varied in advance were output. A spectral reflectance of each of the patches was subjected to spectrophotometric colorimetry by a TC-1800M fabricated by Tokyo Denshoku Co., Ltd.

Step S9:

For the spectral reflectance data R ($\lambda$) measured at the step S8, a spectral reflectance R' ($\lambda$) after flare correction was calculated according to the following formula (2).

$$R'(\lambda) = \left( \frac{R(\lambda) + h}{1 + h} \right) \cdot (1 + h') - h' \tag{2}$$

where h is a flare rate in the spectrophotometric calorimeter TC-1800M, and h' is a flare rate under the print viewing environment.

Step S10:

Tristimulus values of X, Y, and Z were calculated by multiplying the spectral reflectance R' (λ) after flare correction calculated at the step S9 by a spectral distribution of the print viewing illumination to make a table showing the relation between the input signals to the printer and the X, Y, and Z tristimulus values after the flare correction.

Step S11:

From the tristimulus values X', Y', and Z' to be output under the viewing environment calculated at the step S7 and the table obtained at the step S10, R, G, and B signals to be input to the printer were calculated. The R, G, and B signals were input to the printer Pictography 3500 so as to obtain a final output image.

Step S12:

The obtained output image was viewed under a predetermined print viewing condition to be compared with the appearance of the original scene. The results of comparison showed that they provided a very good match. Specifically, the object of faithfully reproducing the appearance of the subject was successfully achieved.

Example 2

Figure 4:
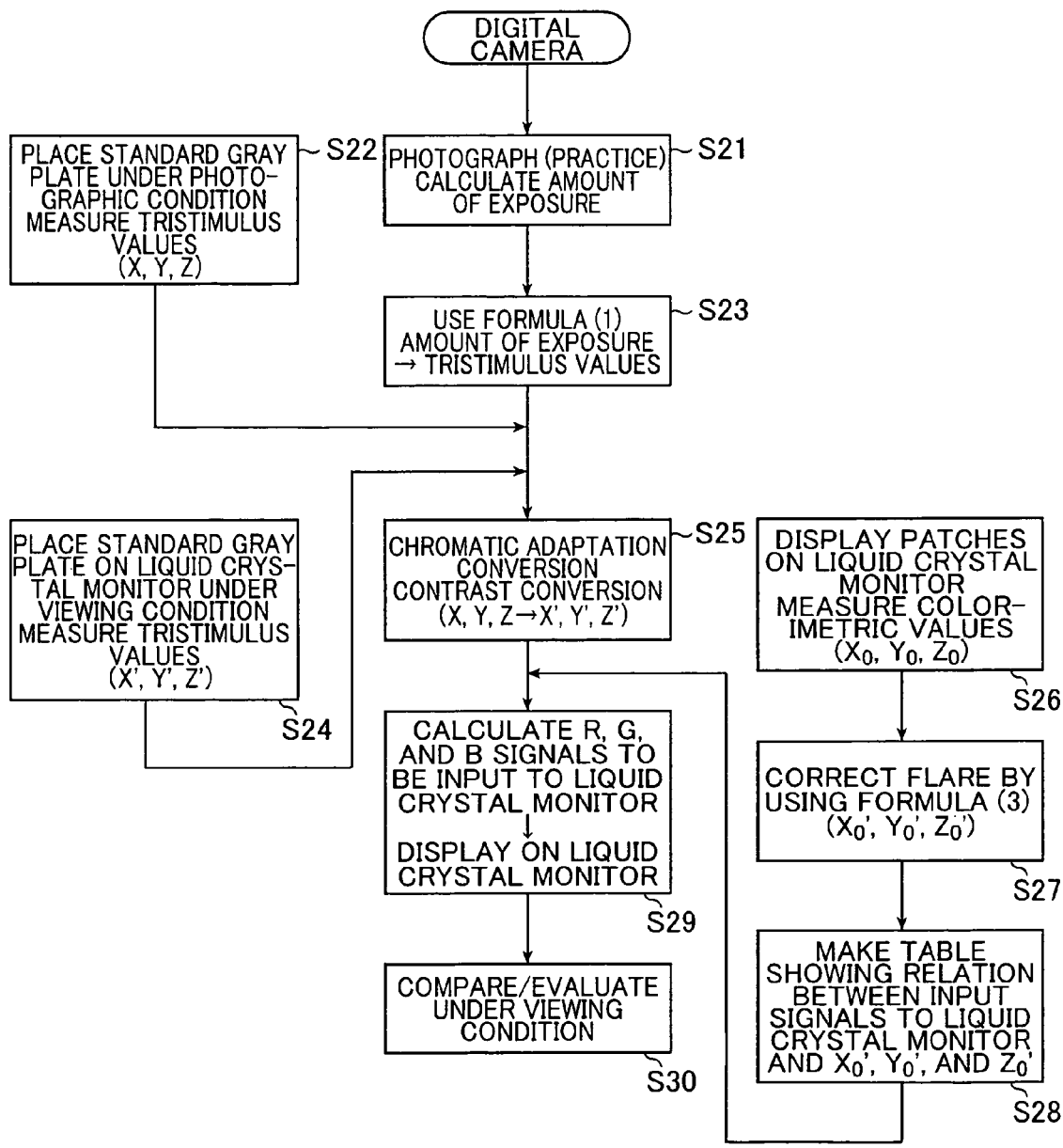
FIG. 4 is a flowchart for illustrating the flow of processing in another embodiment of the image processing method according to the present invention.

Next, Example 2 where a digital camera of the fourth mode in this aspect using the image processing device of the second mode for executing the image processing method of the first mode of this aspect will be described based on an operation flowchart shown in FIG. 4. Although this Example 2 differs from Example 1 in that the entire operation is performed in a digital camera, the basic idea is the same as that of Example 1.

Step 21:

A subject illuminated with a tungsten lamp at a color temperature of 3,000 K was photographed using a digital camera Fine Pix 4700 fabricated by Fuji Photo Film Co., Ltd. The amount of exposure of a CCD was calculated from the obtained image data.

Step S22:

For photographing the subject, a gray plate having a reflectance of 18% was placed at the same position as that of the subject. Tristimulus values of X, Y, and Z of the gray plate were measured by the luminance calorimeter CS-100.

Step S23:

For the amounts of exposure of R, G, and B at each point obtained at the step S21, CIE XYZ tristimulus values were calculated according to the above formula (1).

Step S24:

The gray plate was placed at the position of a liquid crystal monitor of the digital camera under such a condition that the liquid crystal monitor was viewed. Then, tristimulus values were measured by the luminance calorimeter CS-100.

Step S25:

As in Example 1, according to the method described in the Proceedings of IS & T/SID 10th Color Imaging Conference, pages 23 to 27, the chromatic adaptation conversion and the contrast conversion were performed. In this case, tristimulus values X', Y', and Z' to be reproduced under the print viewing environment were calculated from the X, Y, and Z values of the subject scene. The tristimulus values of a background under each of the viewing conditions were set equal to those of the gray plate. The values obtained by multiplying the tristimulus values of the gray plate respectively by 5.56 were used as tristimulus values of adapted white.

Step S26:

The above-described liquid crystal monitor was used as an image display device. Patches with R, G, and B input signals to be given to the liquid crystal being respectively varied in advance were displayed. Colorimetric values (in this case, tristimulus values $X_0, Y_0$, and $Z_0$) of each of the patches were measured by the above-described luminance calorimeter CS-100.

Step S27:

For the tristimulus values $X_0, Y_0$, and $Z_0$ measured at the step S26, XYZ tristimulus values $X_0', Y_0'$, and $Z_0'$ after flare correction were calculated according to the following formula (3).

$$X_0' = \left(\frac{X_0 + h}{1 + h}\right) \cdot (1 + h') - h'$$

$$Y_0' = \left(\frac{Y_0 + h}{1 + h}\right) \cdot (1 + h') - h'$$

$$Z_0' = \left(\frac{Z_0 + h}{1 + h}\right) \cdot (1 + h') - h'$$

(3)

where h is a flare rate of the liquid crystal monitor at the measurement with the spectrophotometric calorimeter TC-1800M, and h' is a flare rate under the environment where the photographed image is viewed on the liquid crystal monitor.

Step S28:

A table showing the relation between the input signals to the liquid crystal monitor and the X, Y, and X tristimulus values after flare correction was made from the tristimulus values after flare correction calculated at the step S27 and the input values given to the liquid crystal monitor.

Step S29:

From the tristimulus values X', Y', and Z' to be reproduced under the viewing environment calculated at the step S25 and the table made at the step S28, R, G, and B signals to be input to the liquid crystal monitor were calculated. The calculated R, G, and B signals were input to the liquid crystal monitor to obtain a final output image.

Step S30:

The obtained image output to the liquid crystal monitor was viewed under a predetermined print viewing condition to be compared with the appearance of an original scene. The results of comparison showed that they provided a very good match. Specifically, the object of faithfully reproducing the appearance of the subject was successfully achieved even in this Example.

The image processing method, the image processing device, the image output device, and the digital camera constituting the first to fourth modes of the first aspect of the present invention are basically configured as described above.

Next, with reference to FIGS. 5 to 9, an image processing method, an image processing device, an image output device, and a digital camera of the second aspect of the present invention will be described.

Figure 5:
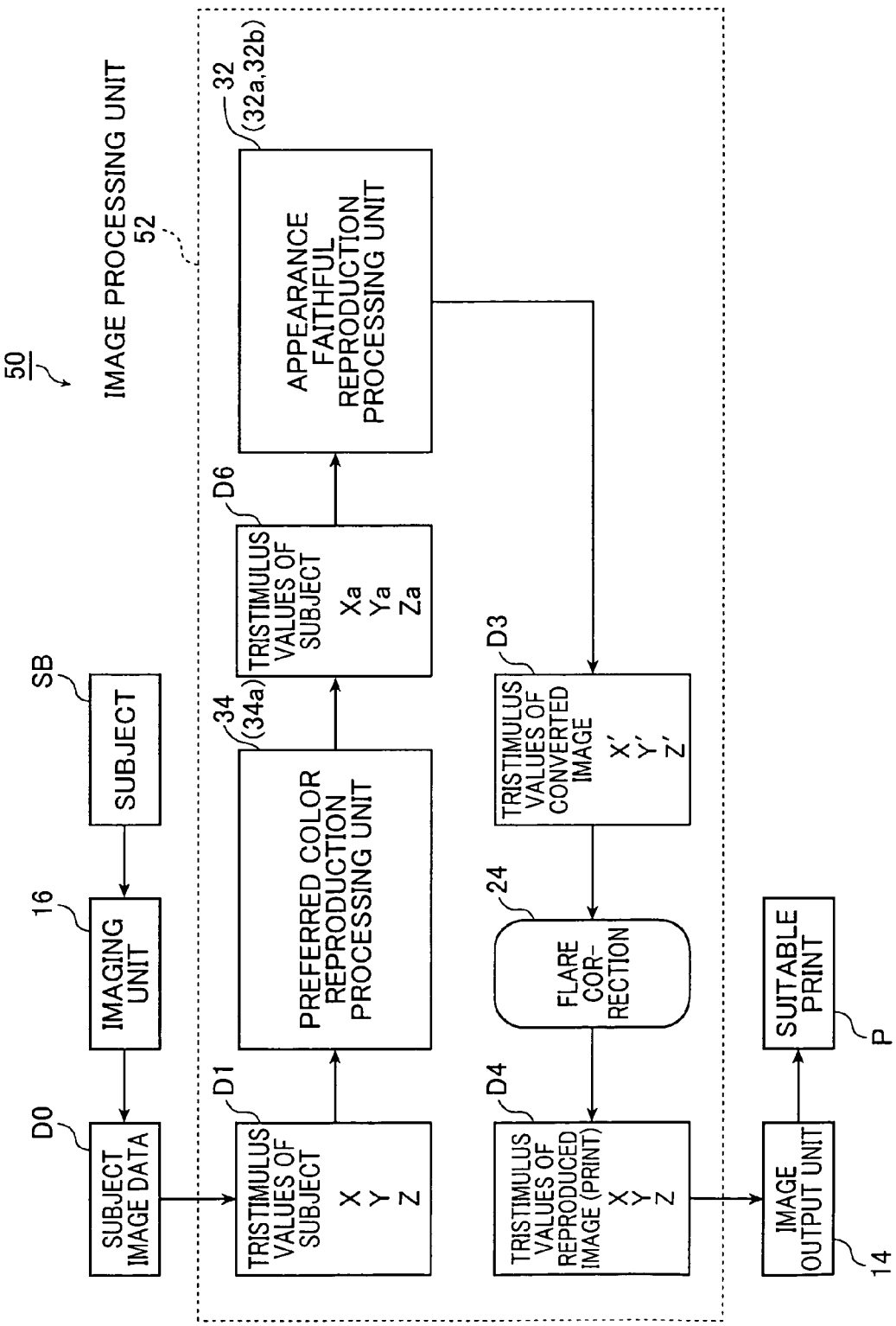
FIG. 5 is a block diagram of a further embodiment of the image output device according to the present invention.

FIG. 5 is a block diagram of an embodiment of an image output device of the third mode, which is equipped with an image processing device of the second mode for executing an image processing method of the first mode of the second aspect of the present invention.

An image output device 50 shown in FIG. 5 has the same structure as the image output device 10 shown in FIG. 1 except for the following points. Although the imaging unit 16 is included in the image processing unit 12 in the image output device 10, the imaging unit 16 is provided outside of an image processing unit 52. Moreover, a preferred color reproduction processing unit 34 is included in the image processing unit 52 positioned at the later stage of the imaging unit 16 so as to be positioned at the former stage of an appearance faithful reproduction processing unit 32 (32a and 32b) in the image processing unit 52. Accordingly, the same components are denoted by the same reference numerals, and the detailed description thereof is herein omitted.

As shown in FIG. 5, the image output device 50 includes: the imaging unit 16 for imaging a subject SB so as to obtain digital image data D0 to calculate the calorimetric values D1 of the subject; an image processing unit 52 for performing image processing so that the appearance of the subject is faithfully reproduced and further preferred color reproduction is achieved; and the image output unit 14 for outputting an image to be viewed such as a hardcopy image (photo print P) or a softcopy image (monitor) based on the image data which is subjected to appearance faithful reproduction processing and preferred color reproduction processing in the image processing unit 52.

The imaging unit 16 images the subject so as to obtain the digital image data D0 to calculate the calorimetric values D1 (in this case, the tristimulus values (XYZ) of the subject) at each point on the subject image from the digital image data D0. The obtained calorimetric values D1 are input to the image processing unit 52. The imaging unit 16 is provided outside the image processing unit 52 in the example shown in FIG. 5 and differs in this point from the example shown in FIG. 1 where the imaging unit 16 is included in the image processing unit 12. However, the imaging unit 16 in this example has the same functions as those of the image unit 16 in Example 1.

In each of the aspects of the present invention, the imaging unit 16 may be included in the image processing unit 12 as shown in FIG. 1 or may be provided outside the image processing unit 52 as in the example shown in FIG. 5. Moreover, the imaging unit 16 may also be composed of a scanner for photoelectrically reading a photographic film so as to output the digital image data D0 such as RGB data and calculation means for calculating the calorimetric values D1 of the subject image from the digital image data D0; the calculation means of the calorimetric values D1 may be included in the scanner or may be constituted as external calculation means to the scanner. Alternatively, the imaging unit 16 may be constituted by the scanner, and the calculation means of the calorimetric values D1 may be constituted as an independent body or may be included in the image processing unit 12 or 52.

The image processing unit 52 constitutes an embodiment of the image processing device constituting the second mode of the present invention for executing the image processing method constituting the first mode of the second aspect of the present invention. The image processing unit 52 performs the image conversion processing on the calorimetric values D1 of each point on the subject image acquired in the imaging unit 16 so as not only to faithfully reproduce the appearance of the subject but also to provide more preferred color reproduction.

The image processing unit 52 includes: a preferred color reproduction processing unit 34 for converting the calorimetric values D1 of the subject image into calorimetric values D6 of the subject image (the converted tristimulus values (XaYaZa) of the subject); an appearance faithful reproduction processing unit 32, to which the calorimetric values Dr6 of the subject image processed in the preferred color reproduction processing unit 34 are input to be converted into the calorimetric values D3 of the converted image (the tristimulus values (X'Y'Z') of an image to be output); and the flare correction section 24 for correcting the amount of flare for the colorimetric values D3 of the converted image in accordance with the viewing environment of the reproduced image to obtain the calorimetric values D4 (the tristimulus values (XYZ) of the reproduced image) of the subject image to be output as the reproduced image (hardcopy image (print)).

Figure 2:
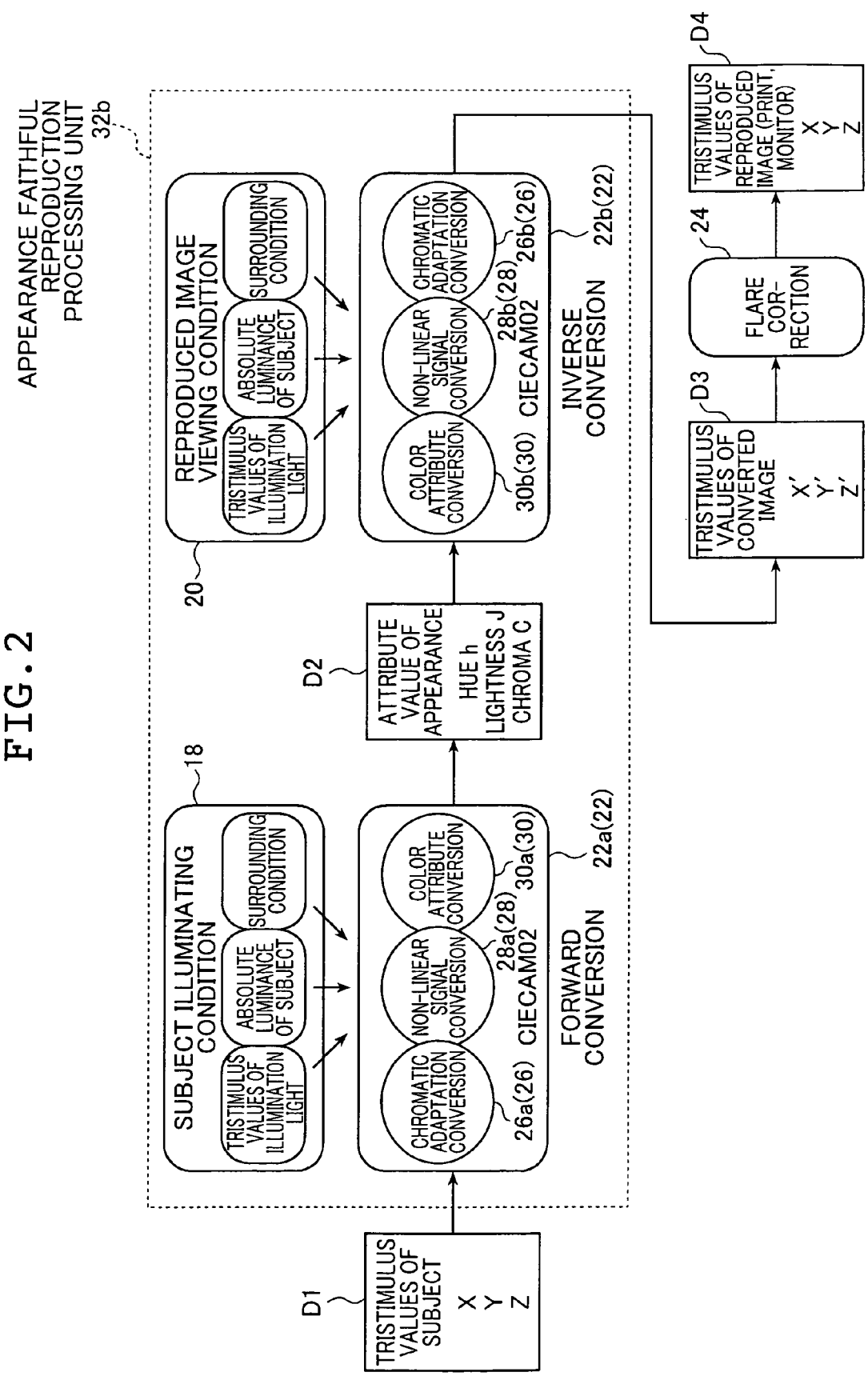
FIG. 2 is a block diagram of another embodiment of an image processing device of the present invention, which is applied to the image output device shown in FIG. 1.

In this aspect, the faithful reproduction processing unit 32a shown in FIG. 1 or the faithful reproduction processing unit 32b shown in FIG. 2 may be used as the appearance faithful reproduction processing unit 32 shown in FIG. 5. In any case, instead of the calorimetric values D1 at each point on the subject image, the colorimetric values D6 of the subject image are input.

Figure 6:
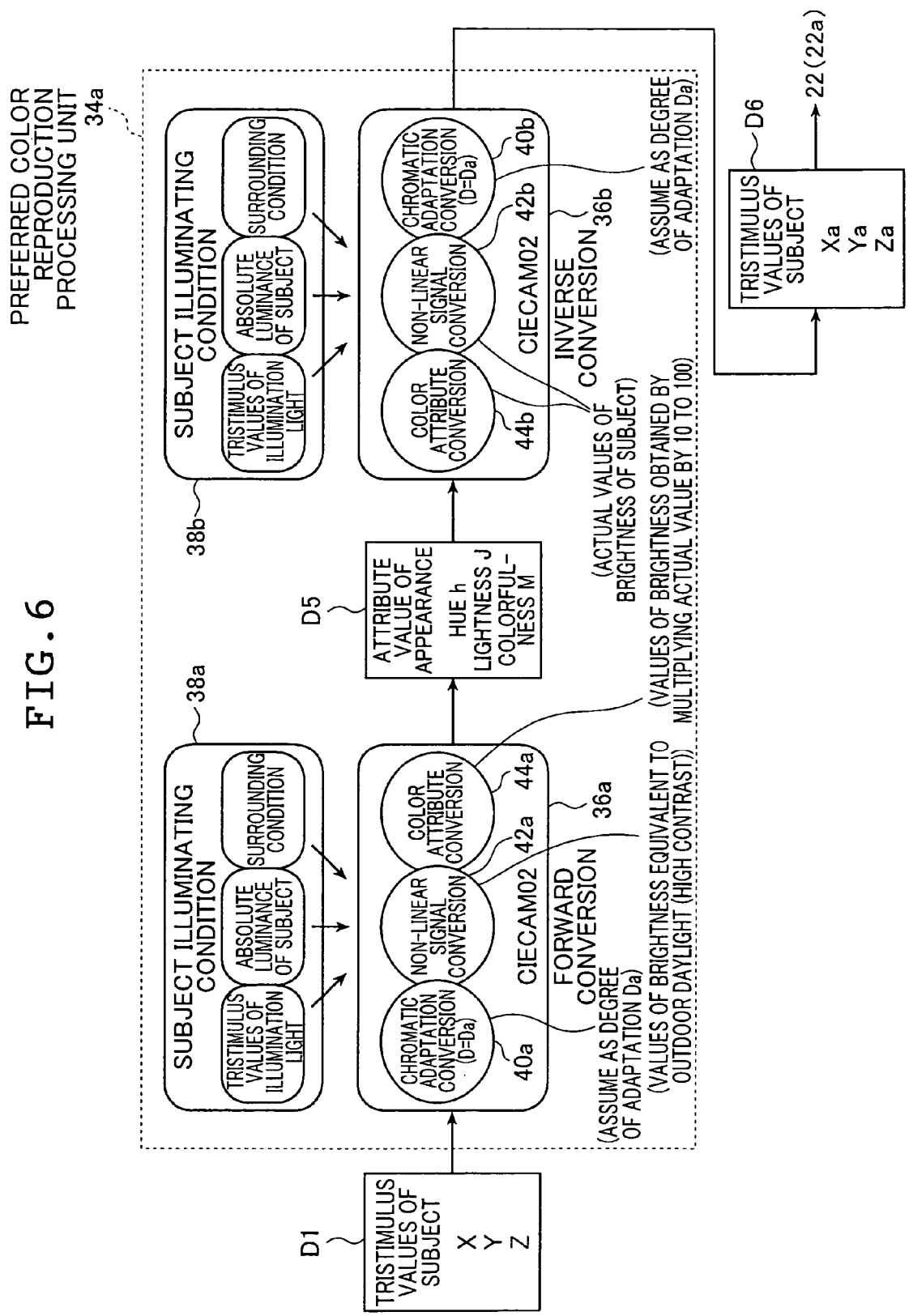
FIG. 6 is a partial block diagram of a further embodiment of the image processing device according to the present invention, which is applied to the image output device shown in FIG. 5.

FIG. 6 is a block diagram of an embodiment of a preferred color reproduction processing unit of the image processing device of the image output device shown in FIG. 5.

A preferred color reproduction processing unit 34a shown in FIG. 6 is used as the preferred color reproduction processing unit 34 of the image processing unit 52 shown in FIG. 5. The preferred color reproduction processing unit 34a performs in advance predetermined chromatic adaptation conversion, contrast and/or chroma conversion on the calorimetric values D1 at each point on a transparent subject image so that the processing at the later stage by the appearance faithful reproduction processing unit 32 provides preferred color reproduction in addition to faithful reproduction. Thus, in the preferred color reproduction processing unit 34a, the colorimetric values D1 of the subject image are converted into the colorimetric values D6 of the subject image (converted tristimulus values of the subject (XaYaZa)).

As shown in FIG. 6, the preferred color reproduction processing unit 34a includes: a contrast and chroma conversion unit 36 including a color appearance forward conversion unit 36a for converting the input calorimetric values D1 of the subject image into attribute values D5 of the appearance (the hue h, the lightness J, and the colorfulness M) and a color appearance inverse conversion unit 36b for converting the input appearance attribute values D5 into the converted colorimetric values D6 of the subject image (the converted tristimulus values (XaYaZa) of the subject); an illuminating condition setting unit 38a for setting a subject illuminating condition used in the color appearance forward conversion unit 36a; and an illuminating condition setting unit 38b for setting a subject illuminating condition used in the color appearance inverse conversion unit 36b.

Herein, the color appearance forward conversion unit 36a and the color appearance inverse conversion unit 36b in the contrast and chroma conversion unit 36 shown in FIG. 6 have basically the same structure as that of the appearance faithful reproduction conversion unit 22 (the appearance faithful reproduction forward conversion unit 22a and the appearance faithful reproduction inverse conversion unit 22b shown in FIG. 2). In addition, the illuminating condition setting units 38a and 38b basically have the same structure as the illuminating condition acquisition unit 18. Therefore, the detailed description thereof is herein omitted, and the functions of each of the units will be described.

In contrast with the illuminating condition acquisition unit 18, the illuminating condition setting units 38a and 38b do not acquire the actual photographic illuminating condition of the subject but set the subject illuminating condition so that the results of processing in the appearance faithful reproduction conversion unit 22 at the later stage provide not only the faithful reproduction but also preferred color reproduction. On the other hand, the color appearance forward conversion unit 36a and the color appearance inverse conversion unit 36b use the same structure as that of the appearance faithful reproduction conversion unit 22 not for the appearance faithful reproduction conversion under the illuminating condition of the photographed subject obtained by the illuminating condition acquisition unit 18 and the viewing condition of the reproduced image obtained by the viewing condition acquisition unit 20 but also for conversion of an appearance under predetermined illuminating conditions respectively set by the illuminating condition setting units 38a and 38b to provide preferred color reproduction even after the faithful reproduction conversion of an appearance at the later stage.

In the following description, it is assumed as follows. Even in the image processing unit 52 shown in FIG. 5, similarly to the image processing unit 12 shown in FIG. 1, the subject image is captured by the imaging unit 16 to be then digitalized to calculate the calorimetric values D1 (tristimulus values (XYZ) of the subject image) at each point on the subject image. Moreover, when the image is taken, the illuminating condition acquisition unit 18 measures and records the illuminance information such as an absolute illuminance value of illumination light irradiating the subject and the chromaticity information such as a chromaticity value. Furthermore, the illuminance information such as an absolute illuminance value of illumination and the chromaticity information such as a chromaticity value when the reproduced image such as a print is viewed are preset by the viewing condition acquisition unit 20.

In the preferred color reproduction processing unit 34a shown in FIG. 6, the calorimetric values D1 (tristimulus values (XYZ) of the subject image) at each point on the subject image are input to the contrast and chroma conversion unit 36. Herein, the appearance forward conversion unit 36a of the contrast and chroma conversion unit 36 performs the contrast conversion and the chroma conversion by using color appearance conversion formulae based on the subject illuminating condition set by the illuminating condition setting unit 38a to obtain the values of the lightness J, the hue h, and the colorfulness M as the appearance attribute values D5. At this time, the chromatic adaptation conversion is performed by the chromatic adaptation conversion section 40a of the color appearance forward conversion unit 36a, assuming that the observer is adapted to the illumination color at the degree of adaptation ($D_a$) higher than the degree of adaptation ($D_0$) determined by the subject illuminating condition obtained by the illuminating condition acquisition unit 18, preferably, is almost or perfectly adapted thereto. Moreover, the contrast conversion by the non-linear signal conversion section 42a and the chroma conversion by the color attribute conversion section 44a are performed, assuming that the contrast is at the outdoor daylight level and the colorfulness has the amount of change in luminance increased by to 5 to 150, preferably 15 to 150 times, and in the case of priority to skin color of a human portrait image, more preferably by 50 to 20, generally by about 10 to 100.

In this case, used as the color appearance conversion formulae in the color appearance forward conversion unit 36a and the color appearance inverse conversion unit 36b are those described in the Proceedings of IS & T/SID 10th Color Imaging Conference, pages 23 to 27 "CIECAM02 Color Appearance Model".

Specifically,

1. In the chromatic adaptation conversion by the chromatic adaptation conversion section 40a, the degree of adaptation D is set to $D_a$ (>$D_0$), most preferably, $D_a$=1;

2. In the contrast conversion (non-linear response conversion) by the non-linear signal conversion section 42a, a value of the parameter $F_L$ is calculated with a luminance value at the outdoor daylight level;

3. In the chroma conversion (color perceptual attribute calculation) by the color attribute conversion section 44a, the luminance $L_A$ of the subject, which is used in calculation of the colorfulness M, is set to the luminance value obtained by multiplying the actual luminance value of the subject by 50 to 150, generally by 10 to 100.

In the above procedure, the values of the lightness J, the hue h, and the colorfulness M are obtained.

Herein, it is assumed that the degree of adaptation D and the parameter $F_L$ are given by the following formulae (4) and (5) according to the Preceedings of IS & T/SID 10th Color Imaging Conference, pages 23 to 27, "CIECAM02 Color Appearance Model". Similarly to the degree of adaptation D and the parameter $F_L$, the hue h, the lightness J, the chroma C, the colorfulness M, and the brightness Q are also given according to the Preceedings of IS & T/SID 10th Color Imaging Conference, pages 23 to 27, "CIECAM02 Color Appearance Model". However, since this calculation is described in detail in the Preceedings of IS & T/SID 10th Color Imaging Conference, pages 23 to 27, "CIECAM02 Color Appearance Model", the description thereof is herein omitted.

$$D = F\left[1 - \left(\frac{1}{3.6}\right)e^{\left(\frac{-L_A-42}{92}\right)}\right] \quad (4)$$

$$F_L = 0.2k^4(5L_A) + 0.1(1-k^4)^2(5L_A)^{1/3} \quad (5)$$

$$k = 1/(5L_A + 1)$$

Then, the color appearance conversion is used as inverse conversion in the color appearance inverse conversion unit 36b to obtain the calorimetric values D6 of the subject image (the converted tristimulus values (XaYaZa) of the subject) serving as image values corresponding to the tristimulus values of the subject from the thus obtained appearance attribute values D5 (the values of the lightness J, the hue h, and the colorfulness M) obtained in the color appearance forward conversion unit 36a.

At this time, the subject illuminating conditions themselves obtained in the illuminating condition acquisition unit 18 are used as the viewing condition parameters set by the illuminating condition setting unit 38b in addition to the degree of adaptation $D_a$ used in the color appearance forward conversion unit 36a as the degree of adaptation D.

Therefore, specifically, in the color appearance inverse conversion unit 36b, the chroma conversion by the color attribute conversion section 44b and the contrast conversion by the non-linear signal conversion section 42b are performed using the luminance value of the actual subject. Then, the degree of adaptation D is set to the above-described degree of adaptation $D_a$, so the chromatic adaptation conversion is performed by the chromatic adaptation conversion section 40a.

In this manner, the subject virtually has the contrast at the outdoor daylight level. Moreover, the obtained data has the chroma increased by a predetermined amount.

Such contrast and chroma conversion assimilate to the human perception of contrast and chroma variation with a change of brightness. Therefore, this method is supposed to be a contrast and chroma conversion method for achieving preferred color reproduction which is perceived as natural by a human being.

In the preferred color reproduction processing unit 34a shown in FIG. 6, instead of the colorimetric values D1 of the subject image (the converted tristimulus values (XYZ) of the subject), the calorimetric values D6 of the subject image (the converted tristimulus values (XaYaZa) of the subject), which are obtained in the contrast and chroma conversion unit 36 to be subjected to preferred color reproduction conversion, are input to the appearance faithful reproduction processing unit 32 (the appearance faithful reproduction conversion unit 22 shown in FIG. 1 or the appearance faithful reproduction forward conversion unit 22a shown in FIG. 2) as shown in FIG. 5. As in the embodiment of the first aspect of the present invention described above, the appearance faithful reproduction processing is performed in the appearance faithful reproduction conversion unit 22, and then the flare correction is performed in the flare correction section 24 to output the calorimetric values D4 (tristimulus values (XYZ) of the reproduced image) of a final reproduced image.

After that, the thus output calorimetric values D4 of the final reproduced image are input to the image output unit 14 to output a reproduced image, for example, a hardcopy image such as a print and/or a softcopy image such as a monitor display image.

The thus obtained reproduced image provides not only faithful reproduction of an appearance but also preferred color reproduction, and therefore looks natural to the human.

If the preferred color reproduction processing unit 34a including the contrast and chroma conversion unit 36 composed of the color appearance forward conversion unit 36a and the color appearance inverse conversion unit 36b shown in FIG. 6 is used as the preferred color reproduction processing unit 34 shown in FIG. 5 in this aspect, it is preferred to use the appearance faithful reproduction processing unit 32b shown in FIG. 2 as the appearance faithful reproduction processing unit 32 shown in FIG. 5. In this aspect, instead of the preferred color reproduction processing unit 34a shown in FIG. 6, a preferred color reproduction processing unit (not shown) constituted to perform forward conversion and inverse conversion in a single contrast and chroma conversion unit so as to correspond to the appearance faithful reproduction processing unit 32a shown in FIG. 1 may be used as the preferred color reproduction processing unit 34 shown in FIG. 5.

Hereinafter, an image processing method, an image processing device, and an image output device respectively corresponding to the first to third modes of the second aspect of the present invention will be described in detail with an example.

The case where the R, G, and B signals calculated by the image processing method according to the first mode of the second aspect of the present invention are input to the color digital printer as the image output device according to the third aspect of the present invention to obtain a print image as a reproduced image will be described with reference to FIG. 7.

Figure 7:
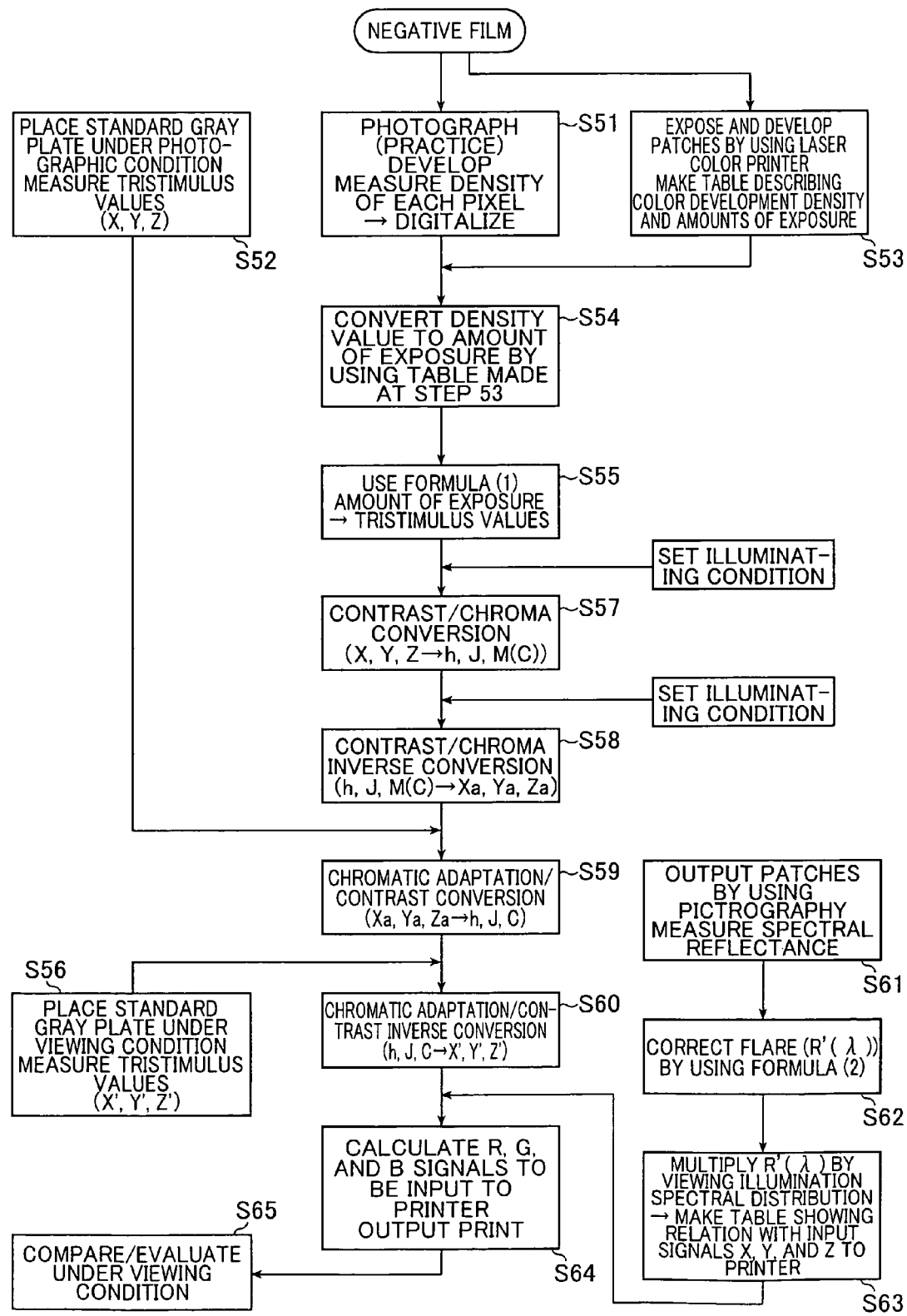
FIG. 7 is a flowchart for illustrating the flow of processing in a further embodiment of the image processing method according to the present invention.
Figure 8:
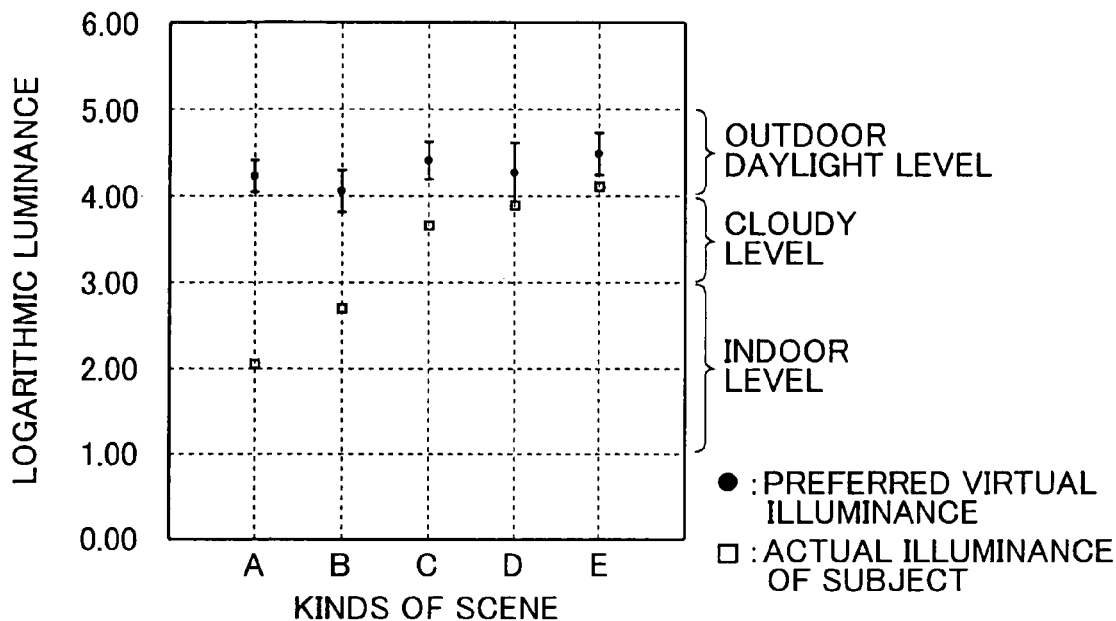
FIG. 8 is a graph of logarithmic luminances of five scenes obtained in Example 3 where the image processing method shown in FIG. 7 is implemented.
Figure 9:
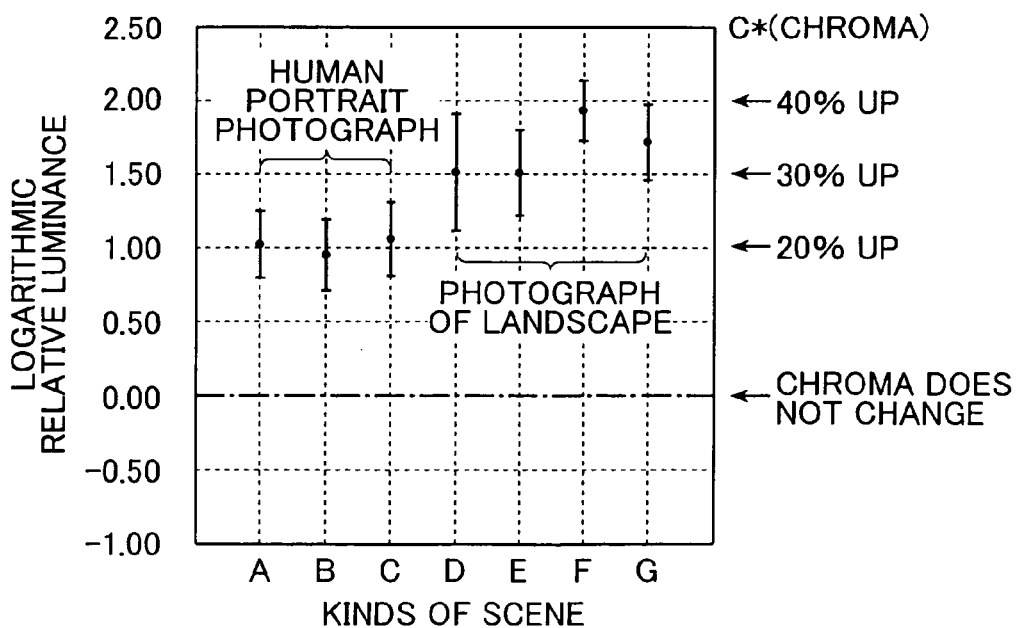
FIG. 9 is a graph of logarithmic relative luminances of seven scenes obtained in Example 4 where the image processing method shown in FIG. 7 is implemented.

FIG. 7 is a flowchart for illustrating the flow of a series of processing in this embodiment in the case where a silver salt photographic sensitive material is used.

Example 3

First, the case where the image processing method of this embodiment shown in FIG. 7 is implemented to obtain a print image as a reproduced image by means of a color digital printer to evaluate the optimal values for contrast conversion will be described.

Steps S51 to S56 described below are almost the same as the above-described steps S1 to S6 shown in FIG. 3, while steps S61 to S65 are almost the same as the above-described steps S8 to S12 shown in FIG. 3.

Step S51:

A subject at five different brightness levels was photographed using a color negative film Superia 400 fabricated by Fuji Photo Film Co., Ltd. After development, the color negative film was scanned by a scanner SG-1000 fabricated by Dainippon Screen MFG Co., Ltd. to obtain digital image data.

Step S52:

For photographing the subject, a gray plate having a reflectance of 18% was placed at the same position as the subject. Tristimulus values of X, Y, and Z of the gray plate were measured by a luminance calorimeter CS-100 fabricated by Konica Minolta Holdings Inc.

Step S53:

A plurality of patches with the amounts of exposure of R, G, and B being respectively varied were output to the above color negative film by using a laser color printer described in SPIE vol. 1079, pages 90 to 98 to be scanned by the scanner SG-1000. A table describing the relation between each amount of exposure given to the color negative film and a density of color development was made.

Step S54:

The table made at the step S53 was used for the image data obtained at the step S51 to calculate the amounts of exposure R, G, and B given to each point in the image data.

Step S55:

CIE XYZ tristimulus values (calorimetric values D1 of the subject image) were calculated for the obtained amounts of exposure R, G, and B according to the above formula (1).

Step S56:

The gray plate was placed at the same position as the position where a print was placed in a photo print viewing environment illuminated with a color appraisal fluorescent lamp at a color temperature of 5,000 K with an illuminance of 300 Lux. Tristimulus values were measured with the above-described luminance calorimeter CS-100.

Step S57:

According to the formulae described in the Proceedings of IS & T/SID 10th Color Imaging Conference, pages 23 to 27, five images (the appearance attribute values D5) which were obtained by performing contrast conversion on five subject images (the calorimetric values D1; the tristimulus values (XYZ) of the subject) were created. Herein, the calculation was performed, assuming that the observer was perfectly adapted to the light source illuminating the subject (a value of the degree of adaptation D represented by the above formula (4) was forced to be 1) (the set illuminating condition). In the contrast conversion, a plurality of values (the set illuminating conditions) corresponding to virtual variations of the illuminance value of the subject (variations of the value of $L_A$ in the above formula (5) used for calculating $F_L$) were substituted to create a series of images whose three appearance attribute values D5, that is, the hue h, the lightness J, and the chroma C, were calculated from the tristimulus values (XYZ) of the subject.

Step S58:

By using the formulae described in the Proceedings of IS & T/SID 10th Color Imaging Conference, pages 23 to 27, a series of images represented by tristimulus values (XaYaZa) of the subject (the calorimetric values D6) after contrast conversion were calculated by using the illuminating conditions (the set illuminating conditions) of the subject from the three appearance attribute values D5, that is, the hue h, the lightness J, and the chroma C, which were calculated at the step S57.

Step S59:

After that, from the images represented by the tristimulus values (XaYaZa) (the calorimetric values D6) obtained at the step S58, the chromatic adaptation conversion and the contrast conversion were performed by using the subject illuminating conditions obtained at the step S52 with the method described in the Proceedings of IS & T/SID 10th Color Imaging Conference, pages 23 to 27. A series of images whose three appearance attribute values D2, that is, the hue h, the lightness J, and the chroma C were calculated were created.

Step S60:

Next, by using the appearance conversion formulae described in the Proceedings of IS & T/SID 10th Color Imaging Conference, pages 23 to 27, a series of reproduced images represented by tristimulus values (X', Y', Z') of the converted images to be output on prints, which were subjected to appearance faithful reproduction processing and preferred color reproduction processing, were calculated from the three appearance attribute values D2, that is, the hue h, the lightness J, and the chroma C, calculated at the step S59 by using the illuminating conditions for viewing the prints, which were obtained at the step S56.

Step S61:

A Pictography 3500 fabricated by Fuji Photo Film Co., Ltd. was used as a printer. Patches with R, G, and B input signals being respectively varied in advance were output. A spectral reflectance of each of the patches was subjected to spectrophotometric colorimetry by a TC-1800M fabricated by Tokyo Denshoku Co., Ltd.

Step S62:

For the spectral reflectance data R ($\lambda$) measured at the step S61, a spectral reflectance R' ($\lambda$) after flare correction was calculated according to the above formula (2).

Step S63:

Tristimulus values of X, Y, and Z were calculated by multiplying the spectral reflectance R' ($\lambda$) after flare correction calculated at the step S62 by a spectral distribution of the print viewing illumination to make a table showing the relation between the input signals to the printer and the X, Y, and Z tristimulus values after the flare correction.

Step S64:

From the tristimulus values X', Y', and Z' to be output under the viewing environment calculated at the step S60 (calorimetric values D3) and the table obtained at the step S63, R, G, and B signals to be input to the printer were calculated. The R, G, and B signals were input to the printer Pictography 3500 to obtain a final output image.

Step S65:

The obtained five output images were viewed under the print viewing conditions to be compared and evaluated by eight observers for the preference of an appearance. Then, the results shown in a graph of FIG. 8 were obtained. Accordingly, it was found that preferred contrast can be obtained with the illuminance value of the subject being within the range of 10,000 to 100,000 Lux, regardless of a true illuminance value of the subject.

Example 4

First, the case where the image processing method of this embodiment shown in FIG. 7 is implemented to obtain a print image as a reproduced image by means of a color digital printer to evaluate the optimal values for chroma-conversion will be described.

Step S51:

Seven subjects (three portraits and four landscape pictures) were photographed by using the color negative film Superia 400 fabricated by Fuji Photo Film Co., Ltd. in the same manner as in Example 3 except that seven subjects were photographed instead of photographing the subject at five different brightness levels. The color negative film after development was scanned with the scanner SG-1000 fabricated by Dainippon Screen MFG Co., Ltd. to obtain digital image data.

Steps S52 to S56:

In exactly the same manner as in Example 3, the subject illuminating conditions in photographing, the illuminating conditions in viewing the prints, and the calorimetric values D1 of the seven subject images (the tristimulus values (XYZ) of the subjects) were obtained.

Step S57:

By using the formulae described in the Proceedings of IS & T/SID 10th Color Imaging Conference, pages 23 to 27, seven images (appearance attribute values D5) obtained by performing the chroma conversion on the seven subject images (the calorimetric values D1; the tristimulus values (XYZ) of the subject) were created. In this case, the calculation was performed, assuming that the observer was perfectly adapted to the light source illuminating the subjects (the value of the degree of adaptation D expressed by the above formula (4) was forced to be 1) (the set illuminating condition). In the contrast conversion, the calculation was performed, assuming $L_A = 2000$ cd/m$^2$ (equivalent to the outdoor daylight level) (the set illuminating condition). For the chroma conversion, a series of images whose three appearance attribute values D5, that is, the hue h, the lightness J, and the colorfulness M were calculated were created from the tristimulus values (XYZ) of the subjects by virtually changing the value of $L_A$ (the set illuminating condition) in the above formula (5) for calculating $F_L$ in the formula for calculating the colorfulness M.

Step S58:

By using the formulae described in the Proceedings of IS & T/SID 10th Color Imaging Conference, pages 23 to 27, a series of images represented by tristimulus values (XaYaZa) of the subjects (the calorimetric values D6) after chroma conversion were calculated by using the illuminating conditions (the set illuminating conditions) of the subjects from the three appearance attribute values D5, that is, the hue h, the lightness J, and the colorfulness M, which were calculated at the step S57.

Steps S59 to S64:

In exactly the same manner as in Example 3, from the images obtained from the tristimulus values (XaYaZa) (the calorimetric values D6) obtained at the step S58, the appearance faithful reproduction processing was performed to calculate a series of images represented by the tristimulus values (X', Y', Z') (the calorimetric values D3) of the converted images to be output to the print. In this manner, R, G, and B signals to be input to the printer were calculated and then were input to the above-described printer Pictography 3500 to obtain final output images.

Step S65:

The obtained seven output images were viewed under the print viewing conditions to be compared and evaluated by eight observers for the preference of an appearance. Then, the results shown in FIG. 9 were obtained.

As a result, the following was found. An increase of colorfulness M equivalent to the subject luminance multiplied by 15 to 150 is preferred; more preferably, an increase of colorfulness is equivalent to the subject luminance multiplied by 15 to 150, further preferably, by 30 to 100. In particular, in the case of portraits, an increase of colorfulness equivalent to the subject luminance multiplied by 5 to 20, for example, about 10, is more preferred. On the other hand, in the case of landscape pictures, an increase of colorfulness equivalent to the subject luminance multiplied by 15 to 150, more preferably, about 30 to 100, is more preferred.

Example 5

First, the case where the image processing method of this embodiment shown in FIG. 7 is implemented to create the contrast and chroma-converted print image, which is preferred as the reproduced image, by means of the color digital printer will be described.

Step S51:

A human being illuminated with a tungsten lamp at a color temperature of 3,000 K was photographed using a color negative film Superia 400 fabricated by Fuji Photo Film Co., Ltd. in exactly the same manner as in Example 1. After development, the color negative film was scanned by a scanner SG-1000 fabricated by Dainippon Screen MFG Co., Ltd. to obtain digital image data.

Steps S52 to S56:

In exactly the same manner as in Example 3, the subject illuminating conditions in photographing, the illuminating conditions in viewing the prints, and the calorimetric values D1 of the seven subject images (the tristimulus values (XYZ) of the subject) were obtained.

Step S57:

By using the formulae described in the Proceedings of IS & T/SID 10th Color Imaging Conference, pages 23 to 27, images obtained by performing the contrast and chroma conversion on the subject image (the calorimetric values D1; the tristimulus values (XYZ) of the subject) were created. In this case, the calculation was performed, assuming that the observer was perfectly adapted to the light source illuminating the subject (the value of the degree of adaptation D expressed by the above formula (4) was forced to be 1) (the set illuminating condition). In the contrast conversion, the calculation was performed, assuming $L_A$=2000 cd/m$^2$ (equivalent to the outdoor daylight level) (the set illuminating condition). For the chroma conversion, a value obtained by increasing the actually measured value of the subject (the set illuminating condition) by 10 was used as the value of $L_A$ in the above formula (5) for calculating $F_L$ in the formula for calculating the colorfulness M. In this manner, a series of images whose three appearance attribute values D5, that is, the hue h, the lightness J, and the colorfulness M were calculated were created from the tristimulus values (XYZ) of the subject.

Step S58:

By using the formulae described in the Proceedings of IS & T/SID 10th Color Imaging Conference, pages 23 to 27, a series of images represented by tristimulus values (XaYaZa) of the subject (the calorimetric values D6) after chroma conversion were calculated by using the illuminating conditions (the set illuminating conditions) of the subject from the three appearance attribute values D5, that is, the hue h, the lightness J, and the colorfulness M, which were calculated at the step S57.

Steps S59 to S64:

In exactly the same manner as in Example 3, from the images obtained from the tristimulus values (XaYaZa) (the colorimetric values D6) obtained at the step S58, the appearance faithful reproduction processing was performed to calculate a series of images represented by the tristimulus values (X', Y', Z') (the calorimetric values D3) of the converted images to be output to the print. In this manner, R, G, and B signals to be input to the printer were calculated and then were input to the above-described printer Pictography 3500 to obtain final output images.

Step S65:

The obtained output images were viewed under the print viewing conditions to be compared with the appearance of the original scenes. As a result, it was confirmed that visual matching was moderately obtained and, in addition, the contrast and chroma were preferably enhanced in the obtained images. Specifically, the object of enhancing the contrast or the chroma in a manner as natural as possible for the images, on which the appearance of the subject was faithfully reproduced, and also of enhancing the contrast or the chroma so as to avoid unnatural reproduction even if the subject was illuminated with a non-white light source was achieved.

As in the first aspect, it is apparent that the image processing device of the second mode for executing the image processing method of the first mode of this second aspect is applicable to the digital camera of the fourth mode of the second aspect even in this aspect.

The image processing method, the image processing device, the image output device, and the digital camera constituting the first to fourth modes of the second aspect of the present invention were basically configured as described above.

Next, with reference to FIGS. 10 to 14, an image processing method, an image processing device, and an image output device of the third aspect of the present invention will be described.

Figure 10:
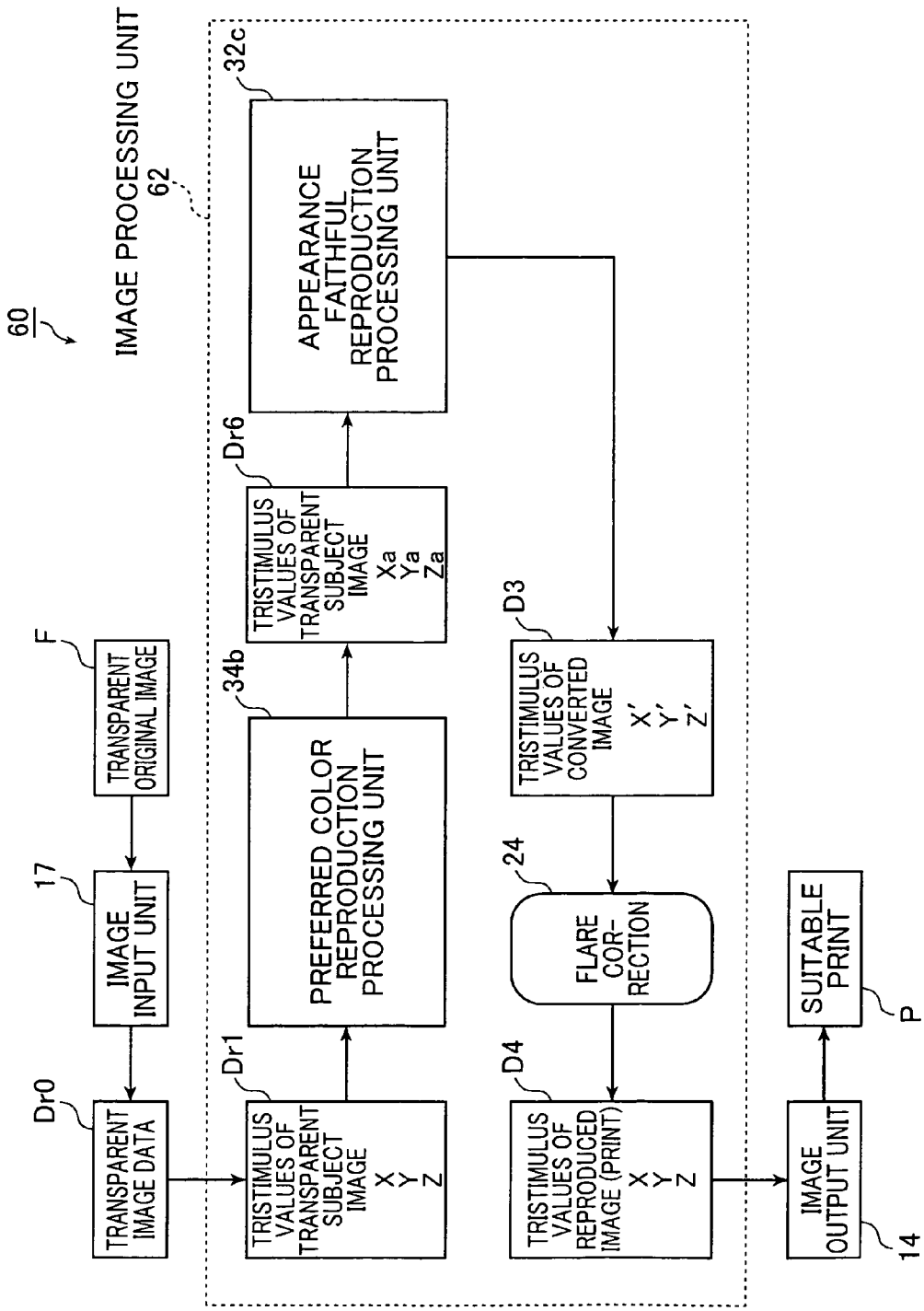
FIG. 10 is a block diagram of an embodiment of an image forming device according to the present invention, which is equipped with the image processing device of the present invention.

FIG. 10 is a block diagram of an embodiment of an image forming device serving as an image output device of the third mode, which is equipped with an image processing device of the second mode for executing an image processing method of the first mode of the third aspect of the present invention.

An image forming device 60 shown in FIG. 10 differs from the image output device 50 shown in FIG. 5 in the following points. The subject image data Dr0 is obtained from a subject image such as a subject itself or a color negative film by the imaging unit 16 in the image output device 50, while the transparent image data Dr0 is obtained from a transparent original image F such as a color reversal film by the image input unit 17 in the image forming device 60. The image processing unit 52 includes the preferred color reproduction processing unit 34 (34a) and the appearance faithful reproduction processing unit 32 (32a and 32b) in the image output device 50, while an image processing unit 62 includes a preferred color reproduction processing unit 34b and an appearance faithful reproduction processing unit 32c in the image forming device 60. The calorimetric values (tristimulus values) D1 and D6 of the subject are used as the input and output data to/from the preferred color reproduction processing unit 34 (34a) in the image output device 50, while calorimetric values (tristimulus values) Dr1 and Dr6 of a transparent subject image are used as the input and output data to/from the preferred color reproduction processing unit 34b in the image forming device 60. Otherwise, the image forming device 60 and the image output device 50 have the same structure. Accordingly, the same components are denoted by the same reference numerals, and the detailed description thereof is herein omitted.

As shown, the image forming device 60 includes: the image input unit 17 for photoelectrically reading the transparent image (transparent original image) F recorded on a reversal film, on which a subject is imaged, to obtain the digital image data Dr0 to calculate the calorimetric values Dr1 of the transparent image; the image processing unit 62 for performing image conversion processing on the image data (the colorimetric values Dr1 of the transparent image) acquired in the image input unit 17 so as not only to faithfully reproduce the appearance of the transparent image F on the reversal film being viewed but also to provide more preferred color reproduction; and the image output unit 14 for outputting an image to be viewed such as a hardcopy image (a photo print P) based on the image data obtained by performing the appearance faithful reproduction conversion processing in the image processing unit 62.

The image input unit 17 photoelectrically reads the transparent image (hereinafter, also referred to as a transparent subject image) recorded as a subject image on the reversal film, on which the subject is imaged, so as to obtain the digital image data Dr0. The image input unit 17 then calculates the calorimetric values Dr1 (in this case, the tristimulus values (XYZ) of a color of the transparent subject image) of each point on the transparent subject image from the acquired digital image data Dr0. Any image input unit can be used as the image input unit 17 as long as it can obtain the calorimetric values Dr1 of each point on the transparent subject image photographed on the color reversal film F. For example, the transparent subject image on the color reversal film F, obtained by photographing the subject, may be read by using an imaging element such as a CCD or a CMOS sensor to obtain RGB data (the digital image data Dr0) as digital data of the transparent subject image. Then, the RGB data Dr0 may be converted into the calorimetric values Dr1, for example, the tristimulus values XYZ of the color of the transparent subject image.

In this aspect, the image input unit 17 may be composed of: a scanner for photoelectrically reading a photographic film such as a color reversal film so as to output the digital image data Dr0 such as the RGB data; and calculation means for calculating the calorimetric values Dr1 of the transparent subject image on the color reversal film F from the digital image data Dr0. The calculation means of the calorimetric values Dr1 may be included in the scanner or may be constituted externally to the scanner. Alternatively, the image input unit 17 may be constituted by a scanner, while the calculation means of the calorimetric values Dr1 may be constituted as an independent body or may be included in the image processing unit 12. If the imaging unit 16 shown in FIG. 1 is capable of reading the transparent subject images on the color reversal film F in addition to images on the color negative film so as to obtain the digital image data Dr0 or the calorimetric values Dr1, the imaging unit 16 can be used as the image input unit 17.

The image processing unit 62 constitutes an embodiment of the image processing device constituting the second mode for executing the image processing method constituting the first mode of the third aspect of the present invention. The image processing unit 62 includes: the preferred color reproduction processing unit 34b for performing the image conversion processing on the calorimetric values Dr1 (the tristimulus values (XYZ) of a color of the transparent subject image) of each point on the transparent subject image acquired in the image input unit 17 so as not only to faithfully reproduce the appearance of the transparent image F on the reversal film being viewed but also to provide more preferred color reproduction, the preferred color reproduction processing unit 34b being for converting the calorimetric values Dr1 of the transparent subject image into the calorimetric values Dr6 of the transparent subject image (the converted tristimulus values (XaYaZa) of the transparent subject image); the appearance faithful reproduction processing unit 32c, to which the calorimetric values Dr6 of the transparent subject image processed in the preferred color reproduction processing unit 34b are input to be converted into the calorimetric values D3 of the converted image (the tristimulus values (X'Y'Z') of an image to be output); and the flare correction section 24 for correcting the amount of flare for the calorimetric values D3 of the converted image in accordance with the viewing environment of the reproduced image so as to obtain the calorimetric values D4 (the tristimulus values (XYZ) of the reproduced image) of the subject image to be output as the reproduced image (hardcopy image (print)).

Although the order is reversed in view of the process in the third aspect of the present invention, the appearance faithful reproduction processing unit 32c, which is regarded as the most characteristic of this aspect, will be described prior to the preferred color reproduction processing unit 34b.

Figure 11:
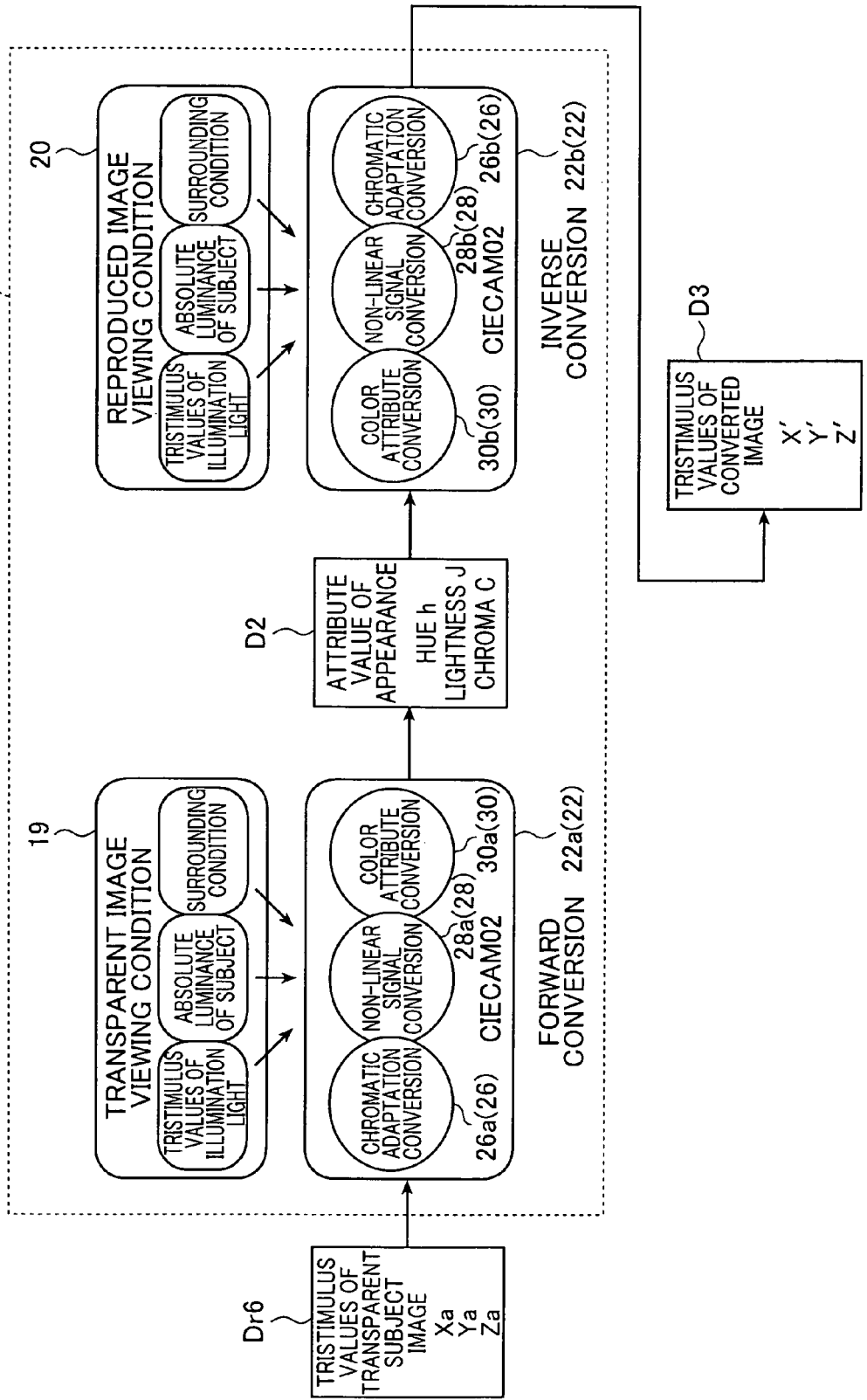
FIG. 11 is a block diagram showing an embodiment of an appearance faithful reproduction processing unit of the image processing device applied to the image forming device shown in FIG. 10.

FIG. 11 is a block diagram showing an embodiment of the appearance faithful reproduction processing unit.

The appearance faithful reproduction processing unit 32c shown in FIG. 11 differs from the appearance faithful reproduction processing unit 32b shown in FIG. 2 in the following points. The appearance faithful reproduction processing unit 32c includes a transparent image viewing condition acquisition unit 19 instead of the subject illuminating condition acquisition unit 18. The calorimetric values Dr6 of the transparent subject image (the tristimulus values (XaYaZa)) are input as input data instead of the calorimetric values D1 of the subject (the tristimulus values (XYZ)). Otherwise, the appearance faithful reproduction processing unit 32c and the appearance faithful reproduction processing unit 32b have the same structure. Accordingly, the same components are denoted by the same reference numerals, and the detailed description thereof is herein omitted.

The appearance faithful reproduction processing unit 32c shown in FIG. 11 performs image processing so as to faithfully reproduce the appearance of the transparent subject image on the reversal film F being viewed and converts the calorimetric values Dr6 of the transparent subject image (the converted tristimulus values (XaYaZa) of the transparent subject image) transmitted from the preferred color reproduction processing unit 34b at the former stage into the calorimetric values D3 of the converted image (the tristimulus values (X'Y'Z') of the image to be output).

As illustrated, the appearance faithful reproduction processing unit 32c includes: the transparent image viewing condition acquisition unit 19 for acquiring the viewing illuminating conditions of the transparent subject image, for observing the transparent subject image on the reversal film F being viewed on a viewer or a projector; a reproduced image viewing condition acquisition unit 20 for acquiring and setting the viewing illuminating condition of the reproduced image (reflection image) on which the transparent subject image is reproduced; and the appearance faithful reproduction conversion unit 22 (22a and 22b) for using the transparent image viewing conditions to perform forward conversion of the colorimetric values Dr6 of the transparent subject image to obtain the color appearance attribute values (the hue h, the lightness J, and the chroma C) D2 and for performing inverse conversion of the thus obtained appearance attribute values D2 by using the reproduced image viewing conditions to obtain the calorimetric values D3 (the tristimulus values (X'Y'Z') of the image to be output) of the converted image which is subjected to appearance faithful reproduction correction.

The transparent image viewing condition acquisition unit 19 serves to acquire the viewing illuminating conditions when the transparent subject image on the color reversal film F is viewed and therefore to acquire the tristimulus values of illumination light from a light source illuminating the transparent subject image, the luminance of the subject, and the surrounding conditions of the subject. In the present invention, in particular, the transparent image viewing condition acquisition unit 19 serves to measure and record the chromaticity value and the absolute illuminance value of the illumination light from the illumination light source.

In this aspect, the viewing condition acquisition unit 20 acquires in advance the viewing illuminating conditions (the chromaticity value and the absolute illuminance value of illumination light when the reproduced image is viewed) when the reproduced image (reflection print image) on which the transparent subject image is reproduced is to be viewed.

The appearance faithful reproduction conversion unit 22 (22a and 22b) serves to perform forward conversion of the calorimetric values Dr6 of the transparent subject image (the converted tristimulus values (XaYaZa) of the transparent subject image) by using the transparent image viewing conditions (see the forward conversion unit 22a) to obtain the appearance attribute values D2 of a color (the hue h, the lightness J, and the chroma C) and also to perform inverse conversion of the thus obtained appearance attribute values D2 by using the reproduced image viewing conditions (see the inverse conversion unit 22b) to obtain the calorimetric values D3 of the converted image (the tristimulus values (X'Y'Z') of the image to be output) which are subjected to appearance faithful reproduction correction. The appearance faithful reproduction conversion unit shown in FIG. 2 may be used as the appearance faithful reproduction conversion unit 22 (22a and 22b) in this aspect except for the following points. The appearance faithful reproduction conversion unit 22 (22a and 22b) in this aspect includes the chromatic adaptation conversion section 26 (26a and 26b) for chromatic adaptation correction, the non-linear signal conversion section 28 (28a and 28b) for contrast correction, and the color attribute (color perceptual attribute) conversion section 30 (30a and 30b for chroma correction). In addition, the calorimetric values Dr6 (tristimulus values (XaYaZa)) of the transparent subject image are used as input data. Moreover, the viewing illuminating conditions for observing the transparent subject image on the color reversal film F acquired in the transparent image viewing condition acquisition unit 19 are used as conversion conditions.

In this aspect, the chromatic adaptation conversion section 26 (26a and 26b) performs chromatic adaptation correction on the converted calorimetric values Dr6 of the transparent subject image based on the chromaticity information (chromaticity value) and the illuminance information (absolute illuminance value) of the illuminating light source acquired in the transparent image viewing condition acquisition unit 19 to obtain the calorimetric values to be reproduced under the reproduced image viewing conditions acquired in the reproduced image viewing condition acquisition unit 20. The chromatic adaptation conversion section 26 specifically calculates, for example, in the forward conversion (see 26a), the degree of adaptation (D) to an illumination color of the transparent subject image from the absolute illuminance value of the transparent subject image when the transparent image is viewed, and, in the inverse conversion (see 26b), calculates the calorimetric values of a corresponding color for reproducing the appearance of the transparent subject image under illumination which is used in viewing the reproduced image.

Next, the non-linear signal conversion section 28 (28a and 28b) performs contrast correction on the calorimetric values Dr6 of the transparent subject image based on the illuminance information (absolute illuminance value) of the illumination light source acquired in the transparent image viewing condition acquisition unit 19 so as to obtain the calorimetric values to be reproduced under the reproduced image viewing conditions acquired in the reproduced image viewing condition acquisition unit 20. In this case, specifically, the non-linear signal conversion section 28 calculates, for example, in forward conversion (see 28a), contrast conversion characteristics from the absolute illuminance value of illumination in viewing the transparent image and the absolute illuminance value of illumination in viewing the reproduced image so as to perform the contrast conversion on the colorimetric values of a corresponding color, which are subjected to chromatic adaptation correction in the chromatic adaptation conversion section 26.

In this manner, the transparent subject image which is subjected to appearance faithful reproduction correction, that is, the calorimetric values D3 of the converted image can be obtained in the appearance faithful reproduction conversion unit 22. The obtained calorimetric values D3 of the converted image are input to the flare correction section 24.

In the embodiment shown in FIG. 11, as in the embodiment shown in FIG. 2, the appearance faithful reproduction conversion unit 22 is composed of the appearance faithful reproduction forward conversion unit 22a and the appearance faithful reproduction inverse conversion unit 22b; the appearance faithful reproduction forward conversion unit 22a is further composed of the chromatic adaptation conversion section 26a, the non-linear signal conversion section 28a, and the color attribute conversion section 30a while the appearance faithful reproduction inverse conversion unit 22b is composed of the color attribute conversion section 30b, the non-linear signal conversion section 28b, and the chromatic adaptation conversion section 26b. However, the present invention is not limited thereto. As in the embodiment shown in FIG. 1, in each of the sections 26, 28, and 30, the forward conversion based on the transparent image viewing conditions and the inverse conversion based on the reproduced image viewing conditions may be performed. Specifically, in the appearance faithful reproduction conversion unit 22, in forward conversion, the chromatic adaptation conversion in the chromatic adaptation conversion section 26, the non-linear signal conversion (contrast conversion) in the non-linear signal conversion section 28, and the color perceptual attribute conversion (chroma conversion) in the color attribute conversion section 30 may be performed based on the transparent image viewing conditions in this order to calculate the appearance attribute values D2. In inverse conversion, the color perceptual attribute conversion in the conversion section 30, the non-linear signal conversion in the conversion section 28, and the chromatic adaptation conversion in the conversion section 26 may be performed in this order on the calculated appearance attribute values D2 based on the reproduced image viewing conditions to calculate the calorimetric values D3 of the converted image.

Next, the preferred color reproduction processing unit 34b for performing pre-processing at the former stage of the appearance faithful reproduction processing unit 32c will be described.

Figure 12:
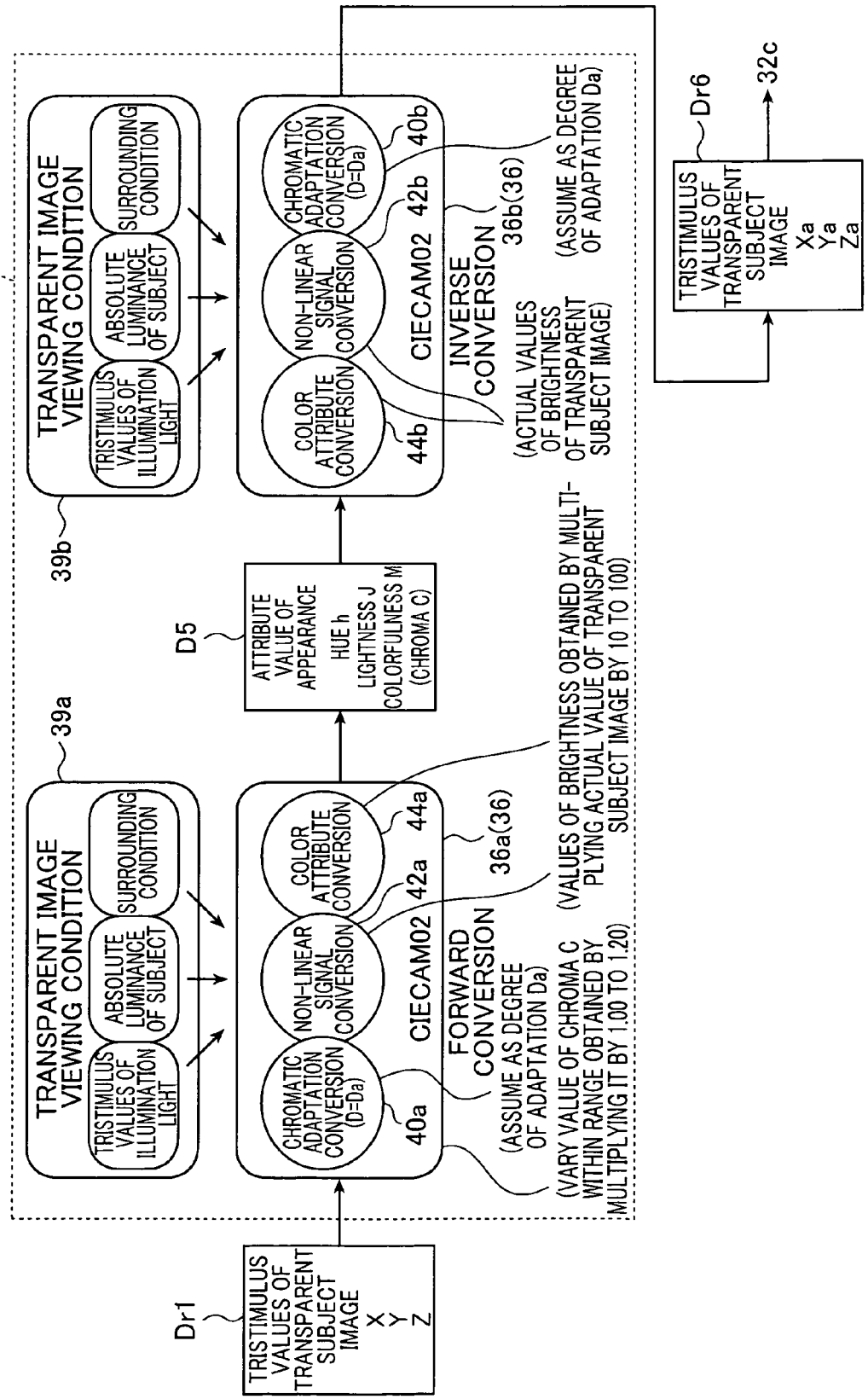
FIG. 12 is a block diagram showing an embodiment of a preferred color reproduction processing unit of the image processing device shown in FIG. 10.

FIG. 12 is a block diagram of an embodiment of the preferred color reproduction processing unit.

The preferred color reproduction processing unit 34b shown in FIG. 12 differs from the appearance faithful reproduction processing unit 34a shown in FIG. 6 in the following points. The preferred color reproduction processing unit 34b includes transparent image viewing condition setting units 39a and 39b instead of the subject illuminating condition setting units 38a and 38b. Instead of the calorimetric values D1 (tristimulus values (XYZ)) of the subject and the calorimetric values D6 (tristimulus values (XaYaZa)), the colorimetric values Dr1 (tristimulus values (XYZ)) of the transparent subject image and the calorimetric values Dr6 (tristimulus values (XaYaZa)) are input to the preferred color reproduction processing unit 34b as input and output data. Otherwise, they have the same structure. Accordingly, the same components are denoted by the same reference numerals, and the detailed description thereof is herein omitted.

The preferred color reproduction processing unit 34b shown in FIG. 12 performs in advance predetermined chromatic adaptation conversion, contrast and/or chroma conversion on the calorimetric values Dr1 of each point on the transparent subject image so that the processing in the appearance faithful reproduction processing unit 32c at the later stage provides not only faithful reproduction but also preferred color reproduction.

As shown in FIG. 12, the preferred color reproduction processing unit 34b includes: the contrast and chroma conversion unit 36 composed of the color appearance forward conversion unit 36a for converting the calorimetric values Dr1 of the transparent subject image (the tristimulus values (XYZ) of a color of the transparent subject image) input from the image input unit 17 into the appearance attribute values D5 (the hue h, the lightness J, and the colorfulness M) and the color appearance inverse conversion unit 36b for converting the input appearance attribute values D5 into the calorimetric values Dr6 of the converted transparent subject image (the converted tristimulus values (XaYaZa) of the transparent subject image); the transparent image viewing condition setting unit 39a for setting the transparent image viewing conditions used in the color appearance forward conversion unit 36a; and the transparent image viewing condition setting unit 39b for setting the transparent image viewing conditions used in the color appearance inverse conversion unit 36b. In addition, as in the appearance faithful reproduction processing unit 32c, the preferred color reproduction processing unit 34b may include the transparent image viewing condition acquisition unit 19 for acquiring the transparent image viewing conditions and the viewing condition acquisition unit 20 for setting the reproduced image viewing conditions. However, it is preferred to acquire the transparent image viewing conditions acquired in the transparent image viewing condition acquisition unit 19 and the reproduced image viewing conditions set in the viewing condition acquisition unit 20 from the appearance faithful reproduction processing unit 32c.

Herein, the color appearance forward conversion unit 36a and the color appearance inverse conversion unit 36b in the contrast and chroma conversion unit 36 shown in FIG. 12 have basically the same structures as those of the appearance faithful reproduction forward conversion unit 22a and the appearance faithful reproduction inverse conversion unit 22b of the appearance faithful reproduction conversion unit 22, respectively. In addition, the transparent image viewing condition acquisition units 39a and 39b basically have the same structure as that of the transparent image viewing condition acquisition unit 19. Therefore, the detailed description thereof is herein omitted, and the functions of each of the units will be described.

In contrast with the transparent image viewing condition acquisition unit 19, the transparent image viewing condition setting units 39a and 39b do not acquire the transparent image viewing conditions of the actual transparent subject image but set the transparent image viewing conditions so that the results of processing in each of the units 22a and 22b of the appearance faithful reproduction conversion unit 22 at the later stage provide preferred color reproduction in addition to faithful reproduction. On the other hand, the color appearance forward conversion unit 36a and the color appearance inverse conversion unit 36b of the contrast and chroma conversion unit 36 use the same structures as those of the respective units 22a and 22b of the appearance faithful reproduction conversion unit 22 not for appearance faithful reproduction conversion under the viewing illuminating conditions of the transparent subject image obtained by the transparent image viewing condition acquisition unit 19 and the viewing illuminating conditions of the reproduced image obtained by the reproduced image viewing condition acquisition unit 20 but for conversion of an appearance under predetermined transparent image viewing conditions respectively set by the transparent image viewing condition setting units 39a and 39b so as to provide preferred color reproduction even if the faithful reproduction conversion of an appearance is performed at the later stage.

In the conversion of the appearance of a color in the color appearance forward conversion unit 36a, the attribute values D5 of the transparent subject image which are subjected to preferred color reproduction conversion can be obtained by varying the subject luminance value (luminance ratio) within the range obtained by increasing the actual value by 10 to 100 and varying a value of the chroma C within the range obtained by multiplying it by 1.00 to 1.20. Then, the inverse conversion is performed in the color appearance inverse conversion unit 36b to obtain the calorimetric values Dr6 of the transparent subject image which are subjected to the preferred color reproduction conversion.

Although the value of the chroma C is varied in the color appearance forward conversion unit 36a of the preferred color reproduction processing unit 34b in this embodiment, the present invention is not limited thereto. The value of the chroma C may alternatively be varied in the appearance faithful reproduction forward conversion unit 22a of the appearance faithful reproduction processing unit 32c at the later stage shown in FIG. 11. Specifically, the value of the chroma C may be varied within the range obtained by multiplying it by 1.00 to 1.20 in the appearance faithful reproduction forward conversion unit 22a to obtain the attribute values D2 of the transparent subject image which are subjected not only to the appearance faithful reproduction but also to preferred color reproduction conversion.

In this manner, the calorimetric values Dr6 of the transparent subject image (the converted tristimulus values (XaYaZa) of the transparent subject image) which are subjected to preferred color reproduction conversion in the preferred color reproduction processing unit 34b shown in FIG. 12 are input to the appearance faithful reproduction processing unit 32c as shown in FIG. 10. Then, as described above, the appearance faithful reproduction processing is performed in the appearance faithful reproduction processing unit 32c shown in FIG. 11 to convert the colorimetric values Dr6 into the calorimetric values D3 of the converted image which are in turn input to the flare correction section 24.

The flare correction section 24 corrects the amount of flare for the calorimetric values of the transparent subject image which are subjected to chromatic adaptation correction and contrast correction, that is, the calorimetric values D3 of the converted image so as to obtain the calorimetric values D4 of the transparent subject image (the tristimulus values (XYZ) of the reproduced image) to be output as the reproduced image (hardcopy image (print)).

In this manner, the transparent subject image capable of not only faithfully reproducing the appearance of the transparent subject image but also providing preferred color reproduction, that is, the colorimetric values D4 of the reproduced image (tristimulus values (XYZ)) can be obtained in the image processing unit 62. The thus obtained calorimetric values D4 of the reproduced image are input to the image output unit 14.

The image output unit 14 creates and outputs a reproduced image such as a photo print so that the calorimetric values D4 of the finally obtained image to be reproduced, which are subjected to preferred color reproduction processing and appearance faithful reproduction correction processing in the image processing unit 62, are reproduced on the reproduced image to be viewed such as a hardcopy image (print).

The thus output reproduced image is a hardcopy image such as a photo print, on which the appearance of the transparent subject image is faithfully reproduced while preferred color reproduction is achieved. Specifically, the thus obtained reproduced image provides not only faithful reproduction of an appearance but also preferred color reproduction, and therefore looks natural to a human being.

The image processing device of the second mode of the third aspect and the image forming device corresponding to the image output device of the third mode of this aspect are basically configured as described above.

Next, the preferred color reproduction processing performed in the preferred color reproduction processing unit 34b shown in FIG. 12 will be described in detail. In addition, the effects of the image processing device of the second mode of this aspect and the image output device (image forming device) of the third mode, and the image processing method of the first mode of this aspect will be described.

1) As described above, in the image forming device 60 shown in FIG. 10, a transparent subject image on a reversal film is formed by the image input unit 17 to be digitalized. Then, the calorimetric values Dr1 of each point on the transparent subject image (the tristimulus values (XYZ) of the transparent subject image) are calculated therefrom.

2) The transparent image viewing condition acquisition unit 19 (see FIG. 11) in the image processing unit 62 measures and records illuminance information such as an absolute illuminance value and chromaticity information such as a chromaticity value of illumination light illuminating the transparent subject image when the transparent subject image is viewed.

3) Furthermore, illuminance information such as an absolute illuminance value and chromaticity information such as a chromaticity value of illumination when the reproduced image such as a print is viewed are preset by the viewing condition acquisition unit 20 (see FIG. 11).

4) The calorimetric values Dr1 of each point on the transparent subject image (the tristimulus values (XYZ) of the transparent subject image), which are calculated in the image input unit 17, are input to the preferred color reproduction processing unit 34b.

In the preferred color reproduction processing unit 34b shown in FIG. 12, the calorimetric values Dr1 of each point on the transparent subject image (the tristimulus values (XYZ) of the subject image) are input to the contrast and chroma conversion unit 36.

In the appearance forward conversion unit 36a of the contrast and chroma conversion unit 36, the contrast conversion and the chroma conversion are performed by using the conversion formulae of the appearance of a color based on the transparent image viewing conditions set by the transparent image viewing condition setting unit 39a to obtain the lightness J, the hue h, and the colorfulness M as the appearance attribute values D5. At this time, assuming that an observer is adapted to an illumination color at the degree of adaptation ($D_a$) when the adaptation luminance is set higher than that determined by the transparent image viewing conditions obtained by the transparent image viewing condition acquisition unit 19, preferably, the observer is adapted almost or perfectly to the illumination color (D=1), the chromatic adaptation conversion by the chromatic adaptation conversion section 40a of the appearance forward conversion unit 36a is performed. For the contrast and the colorfulness M, the contrast conversion by the non-linear signal conversion section 42a and the chroma conversion by the color attribute conversion section 44a are implemented, assuming that the amount of change in luminance corresponds to an increase obtained by multiplication by 5 to 150, preferably, by 15 to 150, and in the case of priority to skin color of the human portrait image, more preferably, an increase obtained by multiplication by 5 to 20, generally by about 10 to 100.

In this case, the conversion formulae described in Proceedings of IS & T/SID 10th Color Imaging Conference, pages 23 to 27, "CIECAM 02 Color Appearance Model" are used as the conversion formulae of appearance of a color in the appearance forward conversion unit 36a and the appearance forward conversion unit 36b.

Specifically,

1. In the chromatic adaptation conversion by the chromatic adaptation conversion section 40a, the degree of adaptation D is set to $D_a$ (the degree of adaptation when the luminance value $L_A$ of the adaptation luminance is higher than that determined by the transparent image viewing conditions; calculated by the following formula (4)), most preferably, $D_a=1$;

2. In the contrast conversion (non-linear response conversion) by the non-linear signal conversion section 42a, a value of the parameter $F_L$ (the formula (5) described below) is calculated with the luminance value $L_A$ of the adaptation luminance higher than that determined by the transparent image viewing conditions;

3. In the chroma conversion (color perceptual attribute calculation) by the color attribute conversion section 44a, the luminance value $L_A$ of the transparent subject image, which is used in calculation of the colorfulness M (the formula (6) described below), is set to the luminance value of the higher adaptation luminance than that determined by the transparent image viewing conditions, in this case, the luminance value obtained by multiplying the actual luminance value of the transparent subject image by 5 to 150, generally by 10 to 100.

In the above procedure, the values of the lightness J, the hue h, and the colorfulness M are obtained.

Moreover, the value of the chroma C is varied to be 1.00 to 1.20 times larger.

In this case, the luminance ratio and the chroma C are used as enhancement parameters for obtaining preferred color reproduction and faithful reproduction of an appearance for the photo print image of the transparent image on the reversal film. However, the present invention is not limited thereto. Only either one of the luminance ratio and the chroma C may be used. Alternatively, instead of at least one of the luminance ratio and the chroma C, or in addition thereto, one of or both the contrast and the colorfulness M may be used.

Herein, it is assumed that the degree of adaptation D, the parameter $F_L$, and the colorfulness M are given by the following formulae (4), (5), and (6) according to the Preceedings of IS & T/SID 10th Color Imaging Conference, pages 23 to 27, "CIECAM02 Color Appearance Model". Similarly to the degree of adaptation D and the parameter $F_L$, the hue h, the lightness J, the chroma C, the colorfulness M, and the brightness Q are also given according to the Preceedings of IS & T/SID 10th Color Imaging Conference, pages 23 to 27, "CIECAM02 Color Appearance Model". However, since this calculation is described in detail in the Preceedings of IS &

T/SID 10th Color Imaging Conference, pages 23 to 27, "CIECAM02 Color Appearance Model", the description thereof is herein omitted.

In association with the contrast, as indicated by the formula (5) below, the value of the parameter $F_L$ monotonically increases with a change of the luminance value $L_A$. In association with the colorfulness (chroma perception), as indicated by the formula (6) below, the colorfulness M is in proportion to the parameter $F_L$ raised to the ¼ power. Those relations also show that the colorfulness M is improved to obtain a vivid impression if a higher luminance value $L_A$ is virtually set.

$$D = F\left[1 - \left(\frac{1}{3.6}\right)e^{\left(\frac{-L_A - 42}{92}\right)}\right] \quad (4)$$

$$F_L = 0.2k^4(5L_A) + 0.1(1 - k^4)^2(5L_A)^{1/3} \quad (5)$$
$$k = 1/(5L_A + 1)$$

$$M = CF_L^{1/4} \quad (6)$$

5) Then, the color appearance conversion is used as inverse conversion in the color appearance inverse conversion unit 36b based on the thus obtained appearance attribute values D5 (the values of the lightness J, the hue h, and the colorfulness M) obtained in the appearance forward conversion unit 36a to obtain again the calorimetric values Dr6 of the transparent subject image (the converted tristimulus values (XaYaZa) of the subject) serving as image values corresponding to the tristimulus values of the transparent subject image.

At this time, the transparent image viewing conditions themselves obtained in the transparent image viewing condition acquisition unit 19 are used as the viewing condition parameters set by the transparent image viewing condition setting unit 39b in addition to the degree of adaptation $D_a$ used in the appearance forward conversion unit 36a as the degree of adaptation D.

Therefore, specifically, in the appearance inverse conversion unit 36b, the chroma conversion by the color attribute conversion section 44b and the contrast conversion by the non-linear signal conversion section 42b are performed using the luminance value of the transparent subject image to be actually viewed. Then, the degree of adaptation D is set to the above-described degree of adaptation $D_a$, so the chromatic adaptation conversion is performed by the chromatic adaptation conversion section 40a.

In this manner, the transparent subject image virtually has the contrast under the viewing conditions. Moreover, the obtained data has the chroma increased by a predetermined amount.

Such contrast and chroma conversion assimilate to the human perception of contrast and chroma variation with a change of brightness. Therefore, this method is supposed to be a contrast and chroma conversion method for achieving preferred color reproduction which is perceived as natural by a human being.

6) In the preferred color reproduction processing unit 34b shown in FIG. 12, the calorimetric values Dr6 of the transparent subject image (the converted tristimulus values (XaYaZa) of the transparent subject image), which are subjected to the preferred color reproduction conversion in the contrast and chroma conversion unit 36, are obtained to be then input to the appearance faithful reproduction processing unit 32c as shown in FIG. 10.

The colorimetric values Dr6 of the transparent subject image input to the appearance faithful reproduction processing unit 32c are input to the appearance faithful reproduction conversion unit 22 of the appearance faithful reproduction processing unit 32c shown in FIG. 11.

The appearance faithful reproduction conversion unit 22 (the appearance faithful reproduction forward conversion unit 22a and the appearance faithful reproduction inverse conversion unit 22b) first calculates the degree of adaptation (D) to an illumination color of the transparent subject image from the absolute illuminance value of the transparent subject image when the transparent image is viewed. The chromatic adaptation conversion for calculating calorimetric values of a corresponding color for reproducing the appearance of the transparent subject image under the illumination used when a reproduced image such as a print is viewed (see the chromatic adaptation conversion section 26 (26a and 26b)).

Next, a contrast conversion characteristic is calculated from the absolute illuminance value of the illumination used in viewing the transparent image and the absolute illuminance value of the illumination used in viewing the reproduced image (print image) so that the contrast conversion is performed on the calorimetric values of the corresponding color which are subjected to the chromatic adaptation correction in the chromatic adaptation conversion section 26 (see the non-linear signal conversion section 28 (28a and 28b).

In this manner, the calorimetric values D3 of the converted image which are subjected to the appearance faithful reproduction correction can be obtained from the calorimetric values Dr6 of the transparent subject image in the appearance faithful reproduction processing unit 32c. The calorimetric values D3 of the converted image are input from the faithful reproduction processing unit 32c to the flare correction section 24.

7) The flare correction section 24 shown in FIG. 10 calculates the degree of decrease in density due to flare from the surrounding conditions when the reproduced image (print image) is viewed. The colorimetric values D3 of the converted image obtained in the appearance faithful reproduction processing unit 32c are subjected to density correction to compensate for the decrease in density due to flare. As a result, the appearance of the transparent subject image can be faithfully reproduced. In addition, the transparent subject image on which the preferred color reproduction of an appearance is achieved, that is, the calorimetric values D4 of the reproduced image (the tristimulus values (XYZ)) can be obtained.

In this manner, the calorimetric values D4 of the reproduced image obtained in the image processing unit 62 are input to the image output unit 14.

8) The image output unit 14 creates and outputs a reproduced image such as a photo print so that the calorimetric values D4 of the image to be reproduced which are ultimately obtained in the image processing unit 62 are reproduced on a reproduced image to be viewed such as a hardcopy image (print image).

The thus output reproduced image is a hardcopy image such as a photo print, on which the appearance of the subject is faithfully reproduced while preferred color reproduction is achieved. Specifically, the thus obtained reproduced image provides not only faithful reproduction of an appearance but also preferred color reproduction, and therefore looks natural to a human being.

In the above-described example, the value of the chroma C is varied in the color appearance forward conversion unit 36a of the contrast and chroma conversion unit 36 of the preferred color reproduction processing unit 34b shown in FIG. 12.

However, the present invention is not limited thereto. The value of the chroma C may be varied in the appearance faithful reproduction forward conversion unit 22a of the appearance faithful reproduction conversion unit 22 in the appearance faithful reproduction processing unit 32c shown in FIG. 11. Specifically, by varying the value of the chroma C within the range of 1.00 to 1.20 times (a 20% increase) larger in the forward conversion unit 22a, the attribute values D2 of the transparent subject image, on which the appearance faithful reproduction as well as the preferred color reproduction conversion are achieved, may be obtained. In addition, by the inverse conversion in the inverse conversion unit 22b, the tristimulus values D3 of the converted image may be obtained.

Hereinafter, the image processing method of the first mode, the image processing device of the second mode, and the image forming device of the third mode of the third aspect of the present invention will be specifically described with an example.

Example 6

Hereinafter, the case where R, G, and B signals calculated by the image processing method according to the first mode of this aspect are input to a color digital printer corresponding to the image output device of the third mode of this aspect to obtain a preferred chroma-converted (contrast-converted) print image as a reproduced image will be described with reference to FIG. 13.

Figure 13:
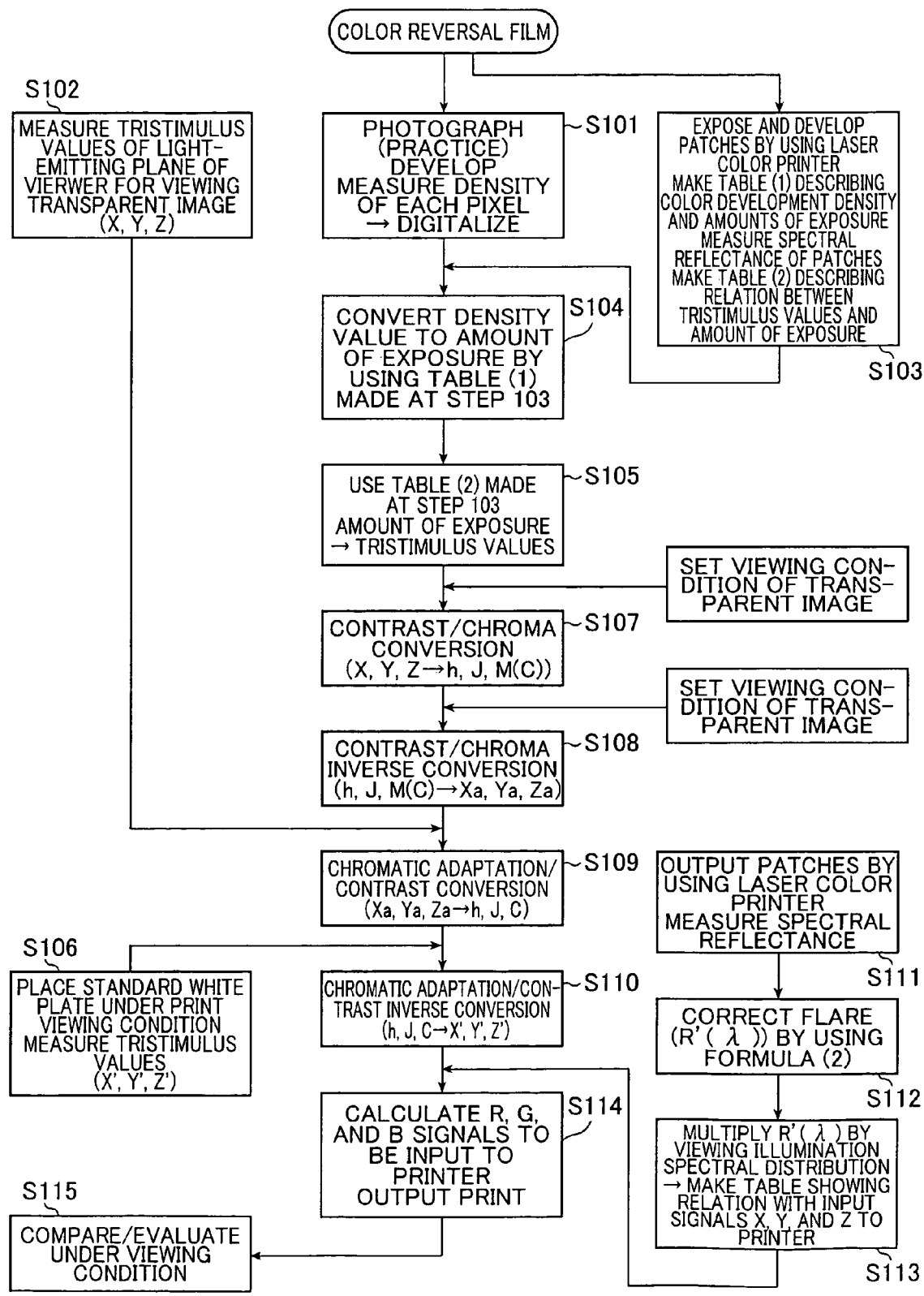
FIG. 13 is a flowchart for illustrating an example of the flow of processing in another embodiment of the image processing method according to the present invention.

FIG. 13 is a flowchart illustrating the flow of a series of processing in this embodiment in the case where a silver salt photographic sensitive material is used.

Step S101:

A transparent image photographed on a color reversal film PROVIA 100F professional fabricated by Fuji Photo Film Co., Ltd. was scanned with the scanner SG-1000 fabricated by Dainippon Screen MFG Co., Ltd. to obtain digital image data as a density value.

Step S102:

A light-emitting plane of an illuminator (Create Viewer fabricated by Pro Lab Create Co., Ltd. with a color appraisal fluorescent lamp at a color temperature of 5,000 K as a light source) for viewing the transparent image on the color reversal film was measured by using an SR-3 fabricated by Topcon Corporation to measure XYZ tristimulus values of a spectral luminance and a luminance. A value of an absolute illuminance 3,000 Lux was obtained.

Step S103:

For the transparent image on the color reversal film, a plurality of patches with varying amounts of exposure of R, G, and B were output by using a laser color printer described in SPIE vol. 1079, pp. 90 to 98. Then, the patches were scanned with the above-described scanner SG-1000 to make Table (1) describing the relation between each of the amounts of exposure given to the photosensitive material and a color development density.

Spectral reflectances of the patches were subjected to spectral colorimetry with a TC-1800M fabricated by Tokyo Denshoku Co., Ltd. In consideration of the fact that the data obtained at the step S2 was a spectral distribution of a viewing light source, from the obtained spectral calorimetric data, CIE XYZ tristimulus values of each of the patches were obtained to create Table (2) describing the relation between each of the amounts of exposure given to the photosensitive material and the CIE XYZ tristimulus values.

Step S104:

Table (1) made at the step S103 was used for the digital image data of the density obtained at the step S101 to calculate the amounts of exposure R, G, and B given to each point in the image data.

Step S105:

Table (2) created at the step S103 was used for the amounts of exposure R, G, and B obtained at the step S104 to calculate the CIE XYZ tristimulus values observed at each point in the image data.

Step S106:

A standard white plate was placed at the same position as the position where a print was placed in a photo print viewing environment illuminated with a color appraisal fluorescent lamp at a color temperature of 5,000 K with an illuminance of 300 Lux. Tristimulus values were measured with a luminance colorimeter CS-100.

Step S107:

By using the formulae described in the Proceedings of IS & T/SID 10th Color Imaging Conference, pages 23 to 27, images (appearance attribute values D5) obtained by performing chroma conversion (the contrast conversion) on transparent subject images (calorimetric values Dr1; tristimulus values (XYZ)) were created. In this case, tristimulus values X', Y', and Z' to be reproduced under the print viewing environment were calculated from the X, Y, and Z values of the color reversal film under the transparent image viewing environment. Herein, the calculation was performed, assuming that the observer was perfectly adapted to the light source illuminating the subject (a value of the degree of adaptation D represented by the above formula (4) was forced to be 1) (the set illuminating condition). In the contrast conversion, calculation was performed, assuming that $L_A=1,000$ cd/m² (set viewing condition; equivalent to the transparent image viewing condition of the color reversal film) to create a series of images whose three appearance attribute values D5, that is, the hue h, the lightness J, and the colorfulness M, were calculated.

Step S108:

By using the formulae described in the Proceedings of IS & T/SID 10th Color Imaging Conference, pages 23 to 27, a series of images represented by tristimulus values (XaYaZa) of the transparent subject image (the calorimetric values Dr6) after chroma conversion were calculated by using the illuminating conditions (the set illuminating conditions) of the transparent image on the color reversal film from the three appearance attribute values D5, that is, the hue h, the lightness J, and the colorfulness M, which were calculated at the step S107.

Step S109:

After that, from the images represented by the tristimulus values (XaYaZa) (the calorimetric values Dr6) obtained at the step S108, the chromatic adaptation conversion and the contrast conversion were performed by using the transparent image viewing conditions obtained at the step S102 with the method described in the Proceedings of IS & T/SID 10th Color Imaging Conference, pages 23 to 27. A series of images whose three appearance attribute values D2, that is, the hue h, the lightness J, and the chroma C were calculated were created.

Step S110:

Next, by using the appearance conversion formulae described in the Proceedings of IS & T/SID 10th Color Imaging Conference, pages 23 to 27, a series of reproduced images represented by tristimulus values (X', Y', Z') of the converted images to be output on prints, which were subjected to appearance faithful reproduction processing and preferred color reproduction processing, were calculated from three appearance attribute values D2, that is, the hue h, the lightness J, and the chroma C, calculated at the step S109 by using the illuminating conditions for viewing the prints, which were obtained at the step S106.

Step S111

The laser color printer described in SPIE vol. 1079, pp 90 to 98 was used as a printer. The patches with R, G and B input signals being varied in advance were output to professional color paper, Prolaser Crystal TYPE II-E fabricated by Fuji Photo Film Co., Ltd. A spectral reflectance of each of the patches was subjected to spectral colorimetry with a TC-1800M fabricated by Tokyo Denshoku Co., Ltd.

Step S112:

For the spectral reflectance data R ($\lambda$) measured at the step S111, a spectral reflectance R' ($\lambda$) after flare correction was calculated according to the following formula (2).

$$R'(\lambda) = \left(\frac{R(\lambda) + h}{1 + h}\right) \cdot (1 + h') - h' \quad (2)$$

where h is a flare rate in the spectrophotometric calorimeter TC-1800M, and h' is a flare rate under the print viewing environment.

Step S113:

Tristimulus values of X, Y, and Z were calculated by multiplying the spectral reflectance R' ($\lambda$) after flare correction calculated at the step S112 by a spectral distribution of the print viewing illumination to make a table showing the relation between the input signals to the printer and the X, Y, and Z tristimulus values after the flare correction.

Step S114:

From the tristimulus values X', Y', and Z' to be output under the viewing environment calculated at the step S110 (calorimetric values D3) and the table obtained at the step S113, R, G, and B signals to be input to the printer were calculated. The R, G, and B signals were input to the printer to obtain a final output image.

Step S115:

The obtained output image was viewed under a print viewing condition to be compared with the appearance of the original transparent image on the color reversal film. The results of comparison confirmed that it was an image providing a very good match with the transparent images.

Example 7

Next, the case where the image processing method of this embodiment shown in FIG. 13 is implemented to obtain a print image as a reproduced image by means of a color digital printer to evaluate the optimal values for contrast conversion and chroma conversion will be described.

Step S101:

Transparent images of eleven different scenes were scanned with the scanner SG-1000 fabricated by Dainippon Screen MFG Co., Ltd. to obtain digital image data in the same manner as in Example 5 except that the transparent images of the eleven scenes were photographed on the same color reversal film as that in Example 6 to be scanned.

Steps S102 to S106:

In exactly the same manner as in Example 6, transparent image viewing conditions (illuminating conditions) when the transparent images on the color reversal film were viewed, viewing conditions (illuminating conditions) in viewing a print, and the calorimetric values Dr1 of the transparent subject images of the eleven scenes (the tristimulus values (XYZ) of the subject) were obtained.

Step S107:

By using the Formula described in the Proceedings of IS & T/SID 10th Color Imaging Conference, pages 23 to 27, images obtained by performing contrast and chroma conversion (the appearance attribute values D5) on the eleven kinds (scenes) of transparent subject images (the colorimetric values Dr1; the tristimulus values (XYZ)) were created. Herein, tristimulus values X', Y', and Z' to be reproduced under the print viewing environment were calculated from the X, Y, and Z values under the transparent image viewing environment of the color reversal film. Moreover, the calculation was performed, assuming that the observer was perfectly adapted to a light source illuminating the transparent images on the color reversal film (a value of the degree of adaptation D expressed by the above formula (4) was forced to be 1) (set viewing conditions). In the contrast conversion, a plurality of values corresponding to constant multiples (luminance ratios) of the viewing illuminance value of the transparent original images on the color reversal film (changes of the value of $L_A$ in the above formula (5) used for calculating $F_L$) (set viewing conditions) to calculate three appearance attribute values D5, i.e., the hue h, the lightness J, and the colorfulness M. A series of images with only the chroma C being varied to constant multiples thereof were fabricated.

Step S108:

By using the formulae described in the Proceedings of IS & T/SID 10th Color Imaging Conference, pages 23 to 27, a series of images represented by the tristimulus values (XaYaZa) of the transparent subject image after chroma conversion (the calorimetric values Dr6) were calculated by using the illuminating conditions of the transparent original images on the color film (the set viewing conditions) from the three appearance attribute values D5, that is, the hue h, the lightness J, and the chroma C calculated at the step S107.

Step S109:

After that, from the images represented by the tristimulus values (XaYaZa) obtained at the step S108 (calorimetric values Dr6), the chromatic adaptation conversion and the contrast conversion were performed by using the transparent image viewing conditions obtained at the step S102 according to the method described in the Proceedings of & T/SID 10th Color Imaging Conference, pages 23 to 27. In this way, the three appearance attribute values D2, that is, the hue h, the lightness J, and the chroma C were calculated to create a series of images.

Step S110:

Next, according to the appearance conversion formulae described in the Proceedings of & T/SID 10th Color Imaging Conference, pages 23 to 27, a series of reproduced images which were subjected to appearance faithful reproduction processing and preferred color reproduction processing, represented by the tristimulus values (X', Y', and Z') of the converted image to be output on a print (the colorimetric values D3) were calculated from the three appearance attribute values D2, that is, the hue h, the lightness J, and the chroma C calculated at the step S109 by using the viewing illuminating conditions for viewing the prints, obtained at the step S106.

Steps S111 to S114:

In exactly the same manner as in Example 6, a series of images represented by the tristimulus values (X', Y', and Z') (the calorimetric values D3) of the converted images to be output on a print, which were obtained at the step S110, were calculated to calculate R, G, and B signals to be input to the printer. The R, G, and B signals were input to the above-described printer to obtain final output images (eleven kinds of scenes in total).

Figure 14:
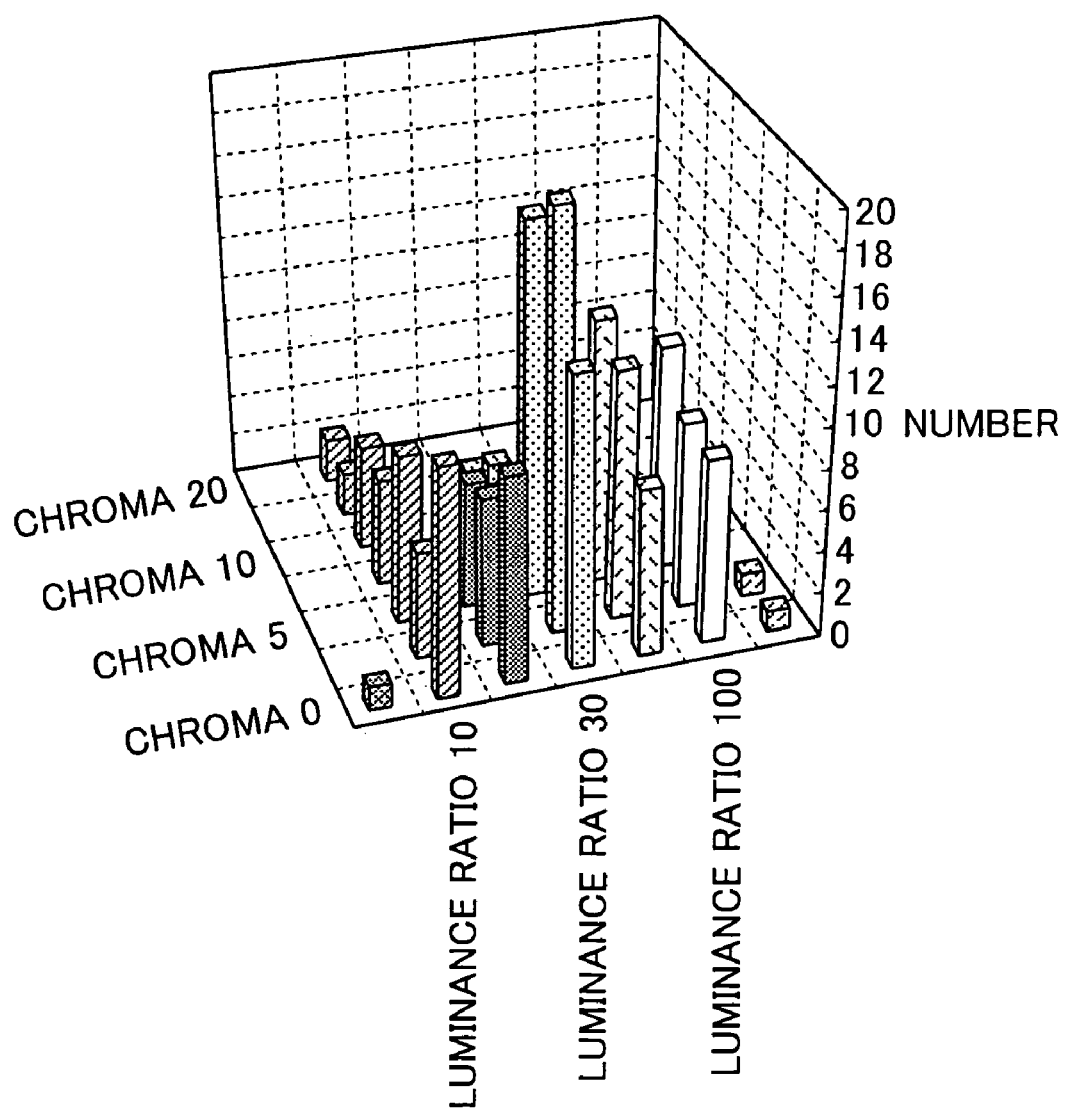
FIG. 14 is a graph showing the results of psychological evaluation of print output images obtained in Example 7 of the present invention.

Step S115:

For the output images (eleven scenes) obtained under the print viewing conditions, psychological evaluation for preference was carried out by ten observers (they were all members of Fuji Photo Film Co., Ltd., and were all engaged in design and development evaluation of color reversal films). The results are shown in FIG. 14. FIG. 14 shows that, as the average of all the scenes, values obtained by multiplying the luminance ratio by 30 and increasing the chroma C by 2.5% were obtained as the optimal values of enhancement parameters as the results.

Prints were created from the transparent images on the color reversal film by using the thus obtained optimal values of the enhancement parameters obtained by multiplying the luminance ratio by 30 and increasing the chroma C by 2.5%. Then, psychological evaluation for preference was carried out by the above-described ten observers. The results that the appearance was preferable were obtained from any of the observers.

In the above-described embodiment and Examples 6 and 7, in the image processing unit 62, the calorimetric values Dr1 of each point on the transparent subject image calculated in the image input unit 17 (the tristimulus values (XYZ) of the transparent subject image) are subjected to color conversion by the preferred color reproduction processing unit 34b to achieve preferred color reproduction and are also subjected to color conversion by the appearance faithful reproduction processing unit 32c to achieve appearance faithful reproduction, thereby outputting the calorimetric values D4 of the reproduced image (the tristimulus values (XYZ)). Specifically, the viewing illuminating conditions of the transparent image on the color reversal film and the viewing illuminating conditions of the photo print images are set in the image processing unit 62 to appropriately set various enhancement parameters such as the degree of adaptation (D), the chroma C, the illuminance value, the luminance ratio, the contrast, the lightness J, the hue h, and the colorfulness M in the color appearance conversion formulae. As a result, a color conversion table (profile) from the colorimetric values Dr1 of each point on the transparent subject image (the tristimulus values (XYZ) of the transparent subject image) into the calorimetric values D4 of the reproduced image (the tristimulus values (XYZ)) can be made.

Therefore, in the present invention, the thus made appearance matching color conversion table, for example, a color conversion table made by using the optimal values obtained by multiplying the luminance ratio by 30 and increasing the chroma C by 2.5% in Example 7 is used to obtain digital image data allowing the appearance of the transparent original images on the color reversal film to be preferably and faithfully color-reproduced on photo prints.

In the above-described example, the color conversion table for converting the calorimetric values Dr1 into the colorimetric values D4 is obtained as a single color conversion table by integrating all the conversions and the corrections such as the contrast conversion, the chroma conversion, the chromatic adaptation correction, the contrast correction, and the flare correction. However, the present invention is not limited thereto. A color conversion table may be defined for each of the above-described conversions and corrections, or a color conversion table may be obtained by integrating some of the above-described conversions and corrections.

For example, the processing process in the image processing method of the present invention may be regarded as being composed of three processing, that is, the preferred appearance reproduction processing including the contrast conversion and the chroma conversion in the preferred color reproduction processing unit 34b, the appearance faithful reproduction processing including the chromatic adaptation correction and the contrast correction in the appearance faithful reproduction processing unit 32c, and the flare correction processing in the flare correction section 24. Accordingly, three processing, that is, the preferred appearance reproduction processing, the appearance faithful reproduction processing, and the flare correction processing, may be defined as a single color conversion table. Alternatively, a color conversion table may be obtained for each of the three processing to use three color conversion tables in total. However, the preferred appearance reproduction processing depends on the observer in some cases while the appearance faithful reproduction processing and the flare correction processing are fixedly determined depending on the viewing environment of the transparent image and the reflection image such as a photo print. Therefore, a color conversion table may be created for the preferred appearance reproduction processing, while another color conversion table may be created for the other three processing, i.e., the appearance faithful reproduction processing and the flare correction processing.

The image processing method, the image processing device, and the image output device respectively constituting the first to third modes of the third aspect of the present invention are basically configured as described above.

Next, an image processing method, an image processing device, and an image output device of the fourth aspect of the present invention will be described with reference to FIGS. 15 to 19B.

In the following description, the case where a subject image to be reproduced is a transparent image recorded on a color reversal film and an image reproduced so as to achieve a match in appearance with the transparent image on the reversal film to be viewed is a photo print image will be described as a representative example. However, the present invention is not limited thereto. The subject image may be an image obtained from a color negative film on which a subject is photographed or an image directly obtained by photographing a subject with a digital camera such as a digital still camera or a digital video camera. Alternatively, the reproduced image may be a hardcopy image such as a photo print image or a softcopy image such as a monitor display image, which is reproduced so that its appearance matches with that of the subject.

Figure 15:
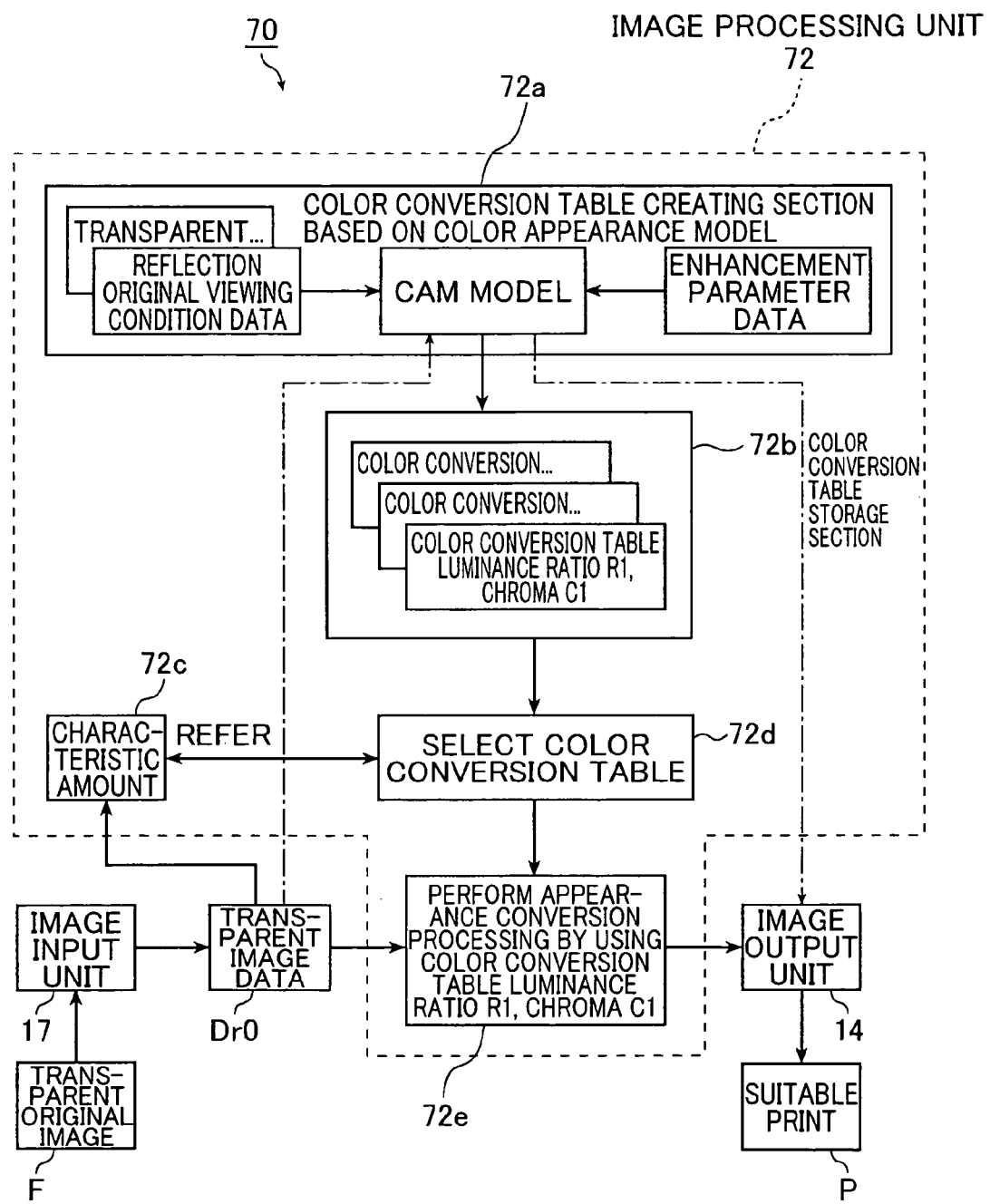
FIG. 15 is a block diagram of another embodiment of the image forming device of the present invention, which is equipped with the image processing device according to the present invention.

FIG. 15 is a block diagram of an embodiment of the image forming device corresponding to the image output device of the third mode, which is equipped with the image processing device of the second mode for executing the image processing method of the first mode of the fourth aspect of the present invention.

An image forming device 70 shown in FIG. 15 has the same structure as that of the image forming device 60 shown in FIG. 10 except that specific structures of an image processing unit 72 and the image processing unit 62 differ from each other. Therefore, the same components are denoted by the same reference numerals, and the detailed description thereof is herein omitted.

As shown in FIG. 15, the image forming device 70 includes: the image input unit 17 for photoelectrically reading a transparent image (transparent original image) F recorded on a reversal film on which a subject is imaged to obtain the digital image data Dr0; the image processing unit 72 for performing image conversion processing including appearance reproduction processing on the image data Dr0 acquired in the image input unit 17 so as not only to faithfully reproduce the appearance of the transparent image F on the reversal film being viewed but also to provide more preferred color reproduction; and the image output unit 14 for outputting an image to be viewed such as a hardcopy image (a photo print P) based on the image data obtained by performing the appearance reproduction conversion processing in the image processing unit 72.

The image processing unit 72 is an embodiment of the image processing device of the second mode of the present invention for executing the image processing method of the first mode of the fourth aspect of the present invention. The image processing unit 72 performs the image conversion processing on the calorimetric values Dr1 of each point on the transparent subject image (the tristimulus values (XYZ) of a color of the transparent subject image), which are calculated from the digital image data Dr0 acquired in the image input unit 17, not only for faithfully reproducing the appearance of the transparent image F on the reversal film being viewed but also for providing further preferred color reproduction.

The image processing unit 72 includes: a color conversion table creating section 72*a* for creating a plurality of color conversion tables (three-dimensional color conversion lookup tables) for performing color conversion based on color appearance conversion formulae; a color conversion table storage section 72*b* for storing the plurality of color conversion tables created in the color conversion table creating section 72*a*; an image characteristic amount calculating section 72*c* for calculating the image characteristic amount from the calorimetric values Dr1 of the transparent subject image on the color reversal film F obtained in the image input unit 17; a color conversion table selecting section 72*d* for selecting an appropriate color conversion table from the plurality of color conversion tables stored in the color conversion table storage section 72*b*; and a conversion processing section 72*e* for performing appearance conversion processing on the calorimetric values Dr1 of the transparent subject image obtained in the image input unit 17 by using the color conversion table selected by the color conversion table selecting section 72*d* so as to obtain an image signal (image data D7 for print output) to be input to a printer.

Figure 16:
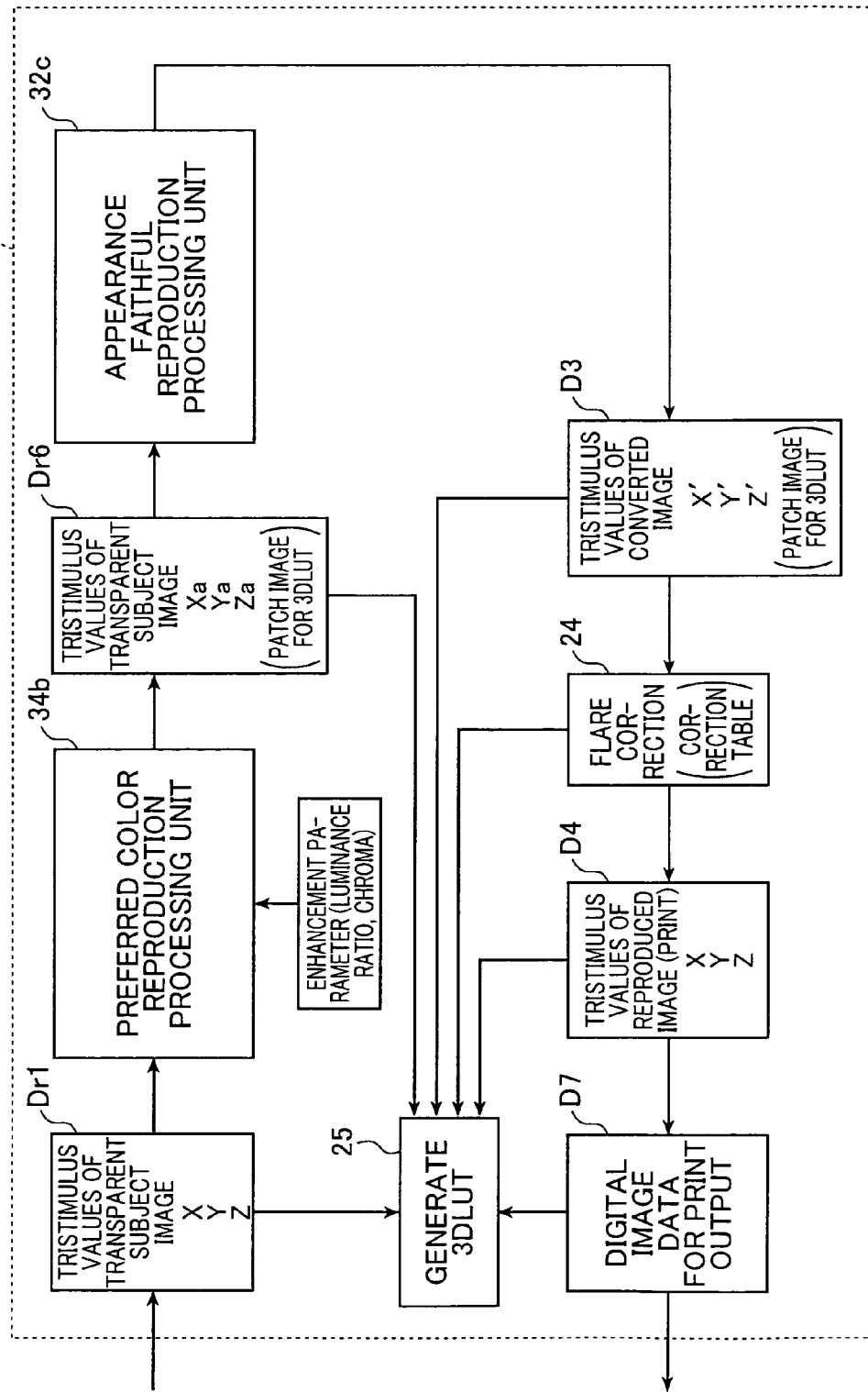
FIG. 16 is a block diagram of an embodiment of a color conversion table creating section in the image forming device shown in FIG. 15.

FIG. 16 is a block diagram of an embodiment of the color conversion table creating section 72*a* of the image forming device 70 shown in FIG. 15.

The color conversion table creating section 72*a* shown in FIG. 16 has the same structure as that of the image processing unit 62 of the image forming device 60 shown in FIG. 10 except that the color conversion table creating section 72*a* includes a three-dimensional color conversion lookup table (hereinafter, referred to also as 3DLUT) generating section 25 and the preferred color reproduction conversion processing in the preferred color reproduction unit 34*b* is performed by varying the enhancement parameters (the luminance ratio and the chroma C). Therefore, the same components are denoted by the same reference numerals, and the detailed description thereof is herein omitted.

As shown in FIG. 16, the color conversion table creating section 72*a* includes: the preferred color reproduction processing unit 34*b* for converting the calorimetric values Dr1 of the transparent subject image into the colorimetric values Dr6 of the transparent subject image (the converted tristimulus values (XaYaZa) of the transparent subject image) (patch images for 3DLUT); the appearance faithful reproduction processing unit 32*c* for receiving the input calorimetric values Dr6 of the transparent subject image processed in the preferred color reproduction processing unit 34*b* to convert them into the calorimetric values D3 of the converted image (the tristimulus values (X'Y'Z') of the image to be output) (patch images for 3DLUT); the flare correction section 24 for correcting the amount of flare for the calorimetric values D3 of the converted image in accordance with the viewing environment of the reproduced image to obtain the colorimetric values D4 of the subject image (the tristimulus values (XYZ) of the reproduced image) to be output as a reproduced image (hardcopy image (print) (patch images for 3DLUT) or a correction table; and the 3DLUT generating section 25 for using the calorimetric values Dr6 of the transparent subject image, the colorimetric values D3 of the converted image, and the colorimetric values D4 of the subject image (patch images for 3DLUT) or the correction table so as to generate a three-dimensional color conversion table (3DLUT) for converting the colorimetric values Dr1 of the transparent subject image into digital image data for print output, for example, RGB data.

In the preferred color reproduction processing unit 34*b*, the enhancement parameters (the luminance ratio and the chroma C) may be varied to obtain a plurality of kinds of calorimetric values Dr6 (patch images for 3DLUT). In the appearance faithful reproduction processing unit 32*c*, the enhancement parameter (the chroma C) may be varied to obtain a plurality of kinds of calorimetric values D3 (patch images for 3DLUT).

Figure 17:
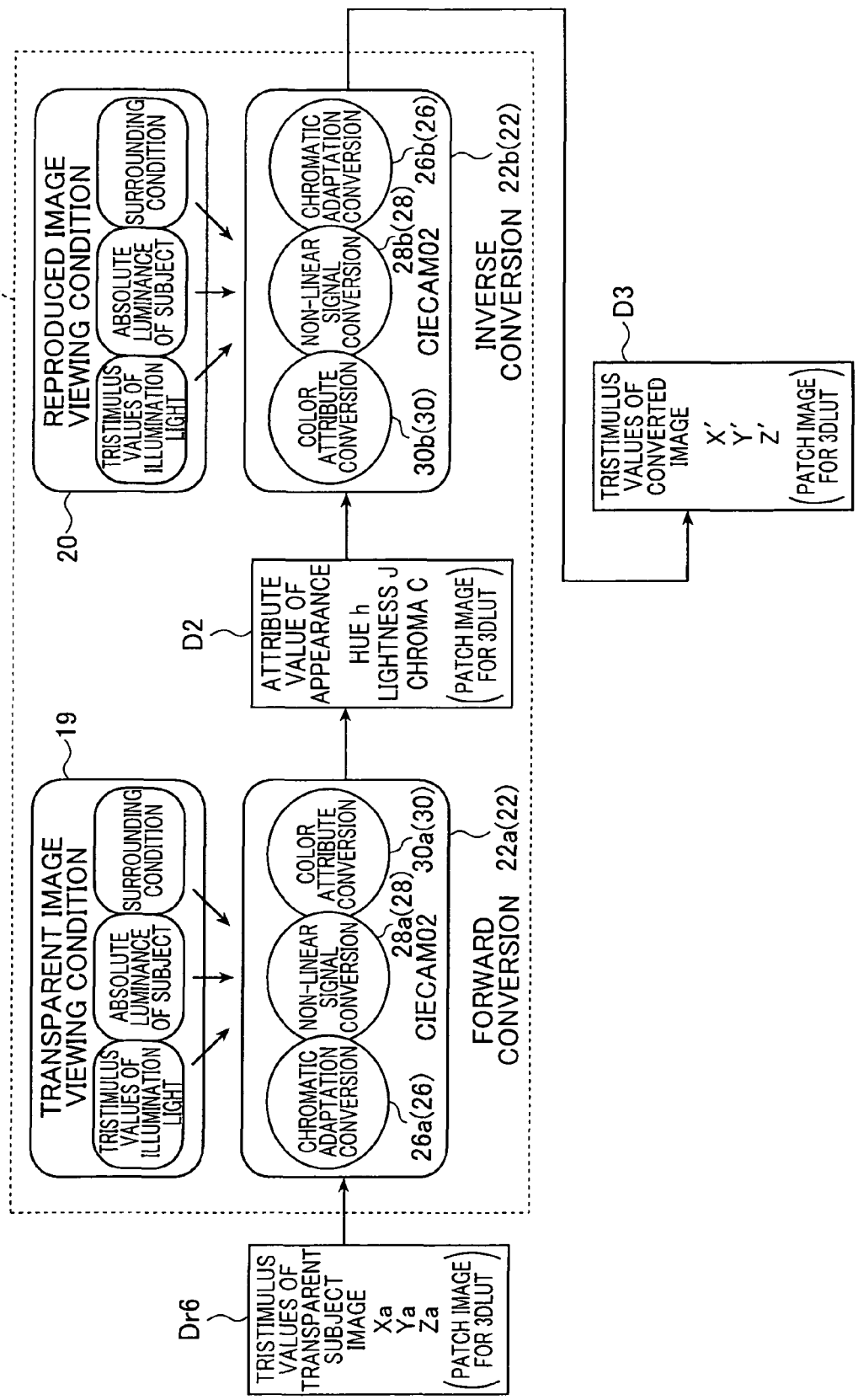
FIG. 17 is a block diagram of an embodiment of an appearance faithful reproduction processing unit in the color conversion table creating section shown in FIG. 16.

FIG. 17 shows a block diagram showing an embodiment of the appearance faithful reproduction processing unit used in the color conversion table creating section 72*a* shown in FIG. 16.

The appearance faithful reproduction processing unit 32*c* shown in FIG. 17 is for performing image processing so that the appearance of the transparent subject image on the reversal film F being viewed can be faithfully reproduced. The calorimetric values Dr6 of the transparent subject image (the converted tristimulus values (XaYaZa) of the transparent subject image) (patch images for 3DLUT) transmitted from the preferred color reproduction processing unit 34*b* at the former stage are forwardly converted by using the transparent image viewing conditions in the forward conversion unit 22*a* of the appearance faithful reproduction conversion unit 22 to obtain the attribute values D2 of color appearance (the hue h, the lightness J, and the chroma C) (patch images for 3DLUT). In addition, the thus obtained appearance attribute values D2 are inversely converted in the inverse conversion unit 22*b* by using the reproduced image viewing conditions into the calorimetric values D3 of the converted image which are subjected to appearance faithful reproduction correction (the tristimulus values (X'Y'Z') of an image to be output) (patch images for 3DLUT).

The appearance faithful reproduction processing unit 32*c* shown in FIG. 17 has the same structure as that of the appearance faithful reproduction processing unit 32*c* shown in FIG. 11 except that the calorimetric values D6 of the transparent subject image, the attribute values D2 of color appearance and the calorimetric values D3 of the converted image are given for a plurality of enhancement parameters (a plurality of combinations of luminance ratio and the chroma C) as a plurality of kinds of patch images for 3DLUT. Therefore, the description thereof is herein omitted.

In this manner, the transparent subject image which is subjected to appearance faithful reproduction processing, that is, the calorimetric values D3 of the converted image can be obtained in the appearance faithful reproduction processing unit 32*c*. The calorimetric values D3 of the converted image are input to the flare correction section 24 (see FIG. 16).

FIG. 18 is a block diagram of an embodiment of the preferred color reproduction processing unit used in the color conversion table creating section 72a shown in FIG. 16.

The preferred color reproduction processing unit 34b shown in FIG. 18 performs predetermined adaptation degree conversion, contrast and/or chroma conversion in advance on the colorimetric values Dr1 of each point on the transparent subject image so as to provide not only faithful reproduction but also preferred color reproduction. The colorimetric values Dr1 of the transparent subject image input from the image input unit 17 (the tristimulus values (XYZ) of a color of the transparent subject image) are converted into the appearance attribute values D5 (the hue h, the lightness J, and the colorfulness M) (patch images for 3DLUT) in the color appearance forward conversion unit 36a of the contrast and chroma conversion unit 36 by using the transparent image viewing conditions. The obtained appearance attribute values D5 are converted into the converted calorimetric values Dr6 of the transparent subject image (the converted tristimulus values (XaYaZa) of the transparent subject image) (patch images for 3DLUT) in the color appearance inverse conversion unit 36b by using the transparent image viewing conditions.

The preferred color reproduction processing unit 34b shown in FIG. 18 has the same structure as that of the preferred color reproduction processing unit 34b shown in FIG. 12 except that the attribute values D5 of color appearance and the converted calorimetric values Dr6 of the transparent subject image are given for a plurality of enhancement parameters (a plurality of combinations of the luminance ratio and the chroma C) as a plurality of kinds of patch images for 3DLUT. Therefore, the description thereof is herein omitted.

In the color appearance conversion in the color appearance forward conversion unit 36a, by varying the luminance value of the subject (the luminance ratio) to be 10 to 100 times as large as its actual value and by increasing the value of the chroma C by 1.00 to 1.20, a plurality of kinds of the attribute values D5 (patch images for 3DLUT) with different luminance ratios and values of the chroma C as enhancement parameters can be obtained to create a plurality of color conversion tables described below. The inverse conversion is performed in the color appearance inverse conversion unit 36b to obtain the calorimetric values Dr6 of the transparent subject image which are subjected to preferred color reproduction conversion (patch images for 3DLUT) can be obtained.

In this embodiment, the value of the chroma C is varied in the color appearance forward conversion unit 36a of the preferred color reproduction processing unit 34b. However, the present invention is not limited thereto. The value of the chroma C may be varied in the appearance faithful reproduction forward conversion unit 22a of the appearance faithful reproduction processing unit 32c at the later stage shown in FIG. 17. Specifically, in the appearance faithful reproduction forward conversion unit 22a, the value of the chroma C may be increased by 1.00 to 1.20 to obtain a plurality of kinds of attribute values D2 (patch images for 3DLUT) with different values of the chroma C as an enhancement parameter to create a plurality of color conversion tables described below.

In this manner, the calorimetric values Dr6 of the transparent subject image which are subjected to preferred color reproduction conversion (the converted tristimulus values (XaYaZa) of the transparent subject image) in the preferred color reproduction processing unit 34b shown in FIG. 18 are input to the appearance faithful reproduction processing unit 32c as shown in FIG. 16. Then, as described above, the calorimetric values Dr6 are subjected to the appearance faithful reproduction processing in the appearance faithful reproduction processing unit 32c shown in FIG. 17 to be converted into the calorimetric values D3 of the converted image, which are then input into the flare correction section 24 shown in FIG. 16.

In the flare correction section 24, the amount of flare is corrected for the calorimetric values D3 of the converted image in accordance with the viewing environment of the reproduced image to obtain the calorimetric values D4 of the transparent subject image (the tristimulus values (XYZ) of the reproduced image) to be output as a reproduced image (a hardcopy image (print)).

In this manner, in the preferred color reproduction processing unit 34b and the appearance faithful reproduction processing unit 32c, the transparent subject image on which the appearance of the transparent subject image is faithfully reproduced while the preferred color reproduction is achieved is obtained. That is, the calorimetric values D4 of the reproduced image (the tristimulus values (XYZ)) can be obtained. The thus obtained calorimetric values D4 of the reproduced image are converted into image data to be output as a reproduced image such as a print image, that is, digital image data D7 for print output, for example, RGB data in the image output unit 14.

In the present invention, the flare correction section 24 may perform the flare correction on the calorimetric values D3 of the converted image so as to directly obtain the digital image data D7 for print output serving as an image signal to be input to a printer. In addition, the flare correction section 24 may be set as a conversion table for this purpose.

The 3DLUT generating section 25 uses the calorimetric values Dr1 of the transparent subject image on the color reversal film F, the digital image data D7 for print output, the colorimetric values D5 and the calorimetric values Dr6 (patch images for 3DLUT), the calorimetric values D2 and the calorimetric values D3 (patch images for 3DLUT), and the colorimetric values D4 or the correction table of the flare correction section 24 so as to generate a three-dimensional color conversion table as a 3DLUT (three-dimensional lookup table) for each of the set enhancement parameters (each combination of the luminance ratio and the chroma C). The patch images for 3DLUT of the calorimetric values D5 and the calorimetric values D6 and the patch images for 3DLUT of the calorimetric values D2 and the calorimetric values D3, each being obtained for one combination of the luminance ratio (enhancement parameter 1) and the chroma C (enhancement parameter 2), are used as components of the 3DLUT for editing. In this manner, the color conversion table for converting the calorimetric values Dr1 into the image data D7 is generated.

As described above, in the 3DLUT creating section 25 of the color conversion table creating section 72a, a plurality of color conversion tables for a plurality of combinations of the luminance ratio (enhancement parameter 1) and the chroma C (enhancement parameter 2) are created.

The method of generating a color conversion table is not particularly limitative in the present invention. Besides the above-described method, a 3DLUT may be generated for each of the forward conversion and the inverse conversion in the contrast and chroma conversion unit 36 of the preferred color reproduction processing unit 34b, the forward conversion and the inverse conversion in the appearance faithful reproduction conversion unit 22 of the appearance faithful reproduction processing unit 32c, and the flare correction by using each of the above-descried calorimetric values and the patch images for 3DLUT or the image data thereof so that each 3DLUT serves as a single 3DLUT. Alternatively, the color conversion table may be generated by using the conversion formula of an appearance used in the preferred color reproduction processing unit 34b (the contrast and chroma conversion unit 36), the conversion formula of an appearance used in the appearance faithful reproduction processing unit 32c (the appearance faithful reproduction conversion unit 22), and a flare correction formula (see the formula (2) described below). Further alternatively, a conventionally known method of generating a 3DLUT may be used.

As shown in FIG. 15, a plurality of color conversion tables created in the color conversion table creating section 72a are stored in the color conversion table storage section 72b.

The color conversion table storage section 72b is configured as a memory or a database, and stores a plurality of color conversion tables created in the color conversion table creating section 72a in correlation with the respective combinations of the luminance ratio (enhancement parameter 1) and the chroma C (enhancement parameter 2).

The image characteristic amount calculating section 72c calculates the image characteristic amount from the colorimetric values Dr1 of the transparent subject image on the color reversal film F obtained in the image input unit 17. The image characteristic amount calculated herein serves to determine the enhancement parameters (the luminance ratio and the chroma C) for selecting appropriate color conversion tables for color conversion to achieve the preferred color reproduction and the faithful reproduction of an appearance. Examples of the image characteristic amount calculated herein include the lightness L and the chroma C, and an average lightness $L_{ave}$ and an average chroma $C_{ave}$.

Any image characteristic amount can be used as the image characteristic amount used for selection of a color conversion table in the present invention as long as the enhancement parameters (the luminance ratio and the chroma C) for selecting an appropriate color conversion table can be determined for the transparent subject image on the color reversal film F whose appearance is to match with that of the reproduced image.

The color conversion table selecting section 72d selects a color conversion table appropriate for conversion of an appearance, which has the enhancement parameters (the combination of the luminance ratio and the chroma C) in accordance with the transparent subject image on the color reversal film F, that is, the image characteristic amount (the average lightness and the average chroma) calculated in the image characteristic amount calculating section 72c, from the plurality of color conversion tables stored in the color conversion table storage section 72b.

The conversion processing section 72e uses a color conversion table appropriate for conversion of an appearance, which is selected by the color conversion table selecting section 72d in accordance with the transparent subject image on the color reversal film F, to perform the conversion processing of an appearance so as to obtain an image signal (the digital image data D7 for print output) to be input to a printer from the calorimetric values Dr1 of the transparent subject image on the color reversal film F. The conversion processing section 72e performs the conversion of an appearance in the color conversion table creating section 72a, that is, the preferred color reproduction of an appearance by the appearance preferred color reproduction processing unit 34b, the appearance faithful reproduction by the appearance faithful reproduction processing unit 32c and the flare correction by the flare correction section 24, and the signal conversion from the calorimetric values D4 to the digital image data D7 for print output to be input to a printer, on a single color conversion table.

The thus obtained image data D7 to be input to a printer, which is obtained in the conversion processing section 72e of the image processing unit 72, allows the output of a print image on which not only the faithful reproduction of an appearance but also preferred reproduction of an appearance are achieved.

In this manner, the transparent subject image not only capable of faithfully reproducing the appearance of the transparent subject image but also providing preferred color reproduction, that is, the image data of the reproduced image (the digital image data D7 for print output) can be obtained in the image processing unit 72. The thus obtained image data D7 of the reproduced image is input to the image output unit 14.

The image output unit 14 creates and outputs a reproduced image such as a photo print so that the image data D7 of the finally obtained image to be reproduced, which is subjected to preferred color reproduction processing and appearance faithful reproduction correction processing in the image processing unit 72, is reproduced on the reproduced image to be viewed such as a hardcopy image (print).

The thus output reproduced image is a hardcopy image such as a photo print, on which the appearance of the subject is faithfully reproduced while preferred color reproduction is achieved. Specifically, the thus obtained reproduced image provides not only faithful reproduction of an appearance but also preferred color reproduction, and therefore looks natural to a human being.

The image output unit 14 may output a reproduced image to be viewed such as a softcopy image displayed on a monitor or the like instead of or in addition to a hardcopy image such as a photo print.

The image processing device of the second mode of the fourth aspect and the image output device (the image forming device) of the third mode of this aspect are basically configured as described above.

Next, the effects of the image processing device of the second mode and the image output device of the third mode, and the image processing method of the first mode of the fourth aspect of the present invention will be described.

In the present invention, a plurality of color conversion tables are created in advance in the color conversion table creating section 72a of the image processing unit 72 of the image forming device 70 shown in FIG. 15 to be stored in the color conversion table storage section 72b. Next, in the color conversion table selecting section 72d, a color conversion table is selected from the color conversion table storage section 72b in accordance with the image characteristic amount of the transparent image on the reversal film, which is calculated in the image characteristic amount calculating section 72c. The color conversion is performed on the image data (the calorimetric values D1) of the transparent image on the reversal film by using the color conversion table selected in the conversion processing section 72e to obtain the image data (the digital image data D7) suitable to be reproduced as a suitable print. Since the color conversion tables are not needed to be recreated as long as the transparent image viewing conditions and the reproduced image viewing conditions remain unchanged, it is sufficient to create the color conversion tables only once.

Hereinafter, the specific description will be given.

1) As described above, in the image forming device 70 shown in FIG. 15, a transparent subject image on a color reversal film is imaged by the image input unit 17 to be digitalized. Then, the calorimetric values Dr1 of each point on the transparent subject image (the tristimulus values (XYZ) of the transparent subject image) are calculated therefrom.

2) The transparent image viewing condition acquisition unit 19 (see FIG. 17) in the color conversion table creating section 72a of the image processing unit 72 measures and records illuminance information such as an absolute illuminance value and chromaticity information such as a chromaticity value of illumination light illuminating the transparent subject image when the transparent subject image is viewed.

3) Furthermore, data for print image (reproduced image) viewing conditions, that is, illuminance information such as an absolute illuminance value and chromaticity information such as a chromaticity value of illumination when the reproduced image such as a print is viewed are preset by the viewing condition acquisition unit 20 (see FIG. 17).

4) In the preferred color reproduction processing unit 34b and the appearance faithful reproduction processing unit 32c in the color conversion table creating section 72a of the image processing unit 72 shown in FIG. 16, the color conversion is performed using the color appearance conversion formulae.

The calorimetric values Dr1 of each point on the transparent subject image (the tristimulus values (XYZ) of the transparent subject image) are input to the preferred color reproduction processing unit 34b in the color conversion table creating section 72a of the image processing unit 72.

In the preferred color reproduction processing unit 34b shown in FIG. 18, the colorimetric values Dr1 of each point on the transparent subject image are input to the contrast and chroma conversion unit 36.

In the color appearance forward conversion unit 36a of the contrast and chroma conversion unit 36, the contrast conversion and the chroma conversion are performed by using the conversion formulae of an appearance of a color based on the transparent image viewing conditions set by the transparent image viewing condition setting unit 39a to obtain the lightness J, the hue h, and the colorfulness M as the appearance attribute values D5. At this time, assuming that an observer is adapted to an illumination color at the degree of adaptation ($D_a$) when the adaptation luminance is set higher than that determined by the transparent image viewing conditions obtained by the transparent image viewing condition acquisition unit 19, preferably, the observer is adapted almost or perfectly to the illumination color (D=1), the chromatic adaptation conversion by the chromatic adaptation conversion section 40a of the color appearance forward conversion unit 36a is performed. For the contrast and the colorfulness M, the contrast conversion by the non-linear signal conversion section 42a and the chroma conversion by the color attribute conversion section 44a are implemented, assuming that the amount of change in luminance when the transparent original image is viewed corresponds to an increase obtained by multiplication by 5 to 150, preferably, by 10 to 100 (enhancement parameter 1). In addition, the value of the chroma C is increased by a factor of 1.00 to 1.20.

Specifically,

1. In the chromatic adaptation conversion by the chromatic adaptation conversion section 40a, the degree of adaptation D is set to $D_a$ (the degree of adaptation when the adaptation luminance is higher than that determined by the transparent image viewing conditions; calculated by the following formula (4)), most preferably, $D_a$=1;

2. In the contrast conversion (non-linear response conversion) by the non-linear signal conversion section 42a, a value of the parameter $F_L$ (the formula (5) described below) is calculated with the luminance value $L_A$ of the adaptation luminance higher than that determined by the transparent image viewing conditions;

3. In the chroma conversion (color perceptual attribute calculation) by the color attribute conversion section 44a, the luminance value $L_A$ of the transparent subject image, which is used in calculation of the colorfulness M (the formula (6) described below), is set to the luminance value of the higher adaptation luminance than that determined by the transparent image viewing conditions, in this case, the luminance value obtained by multiplying the actual luminance value of the transparent subject image by 50 to 150, generally by 10 to 100 (enhancement parameter 1).

In the above procedure, the values of the lightness J, the hue h, and the colorfulness M are obtained.

Moreover, the value of the chroma C is varied to be 1.00 to 1.20 times larger (enhancement parameter 2).

As described above, those conversion operations are performed with the combination of the enhancement parameter 1 (luminance ratio) and the enhancement parameter 2 (the chroma C) to obtain a plurality of color conversion paths.

In this case, the luminance ratio and the chroma C are used as enhancement parameters for obtaining preferred color reproduction and faithful reproduction of an appearance for the photo print image of the transparent image on the reversal film. However, the present invention is not limited thereto. Only either one of the luminance ratio and the chroma C may be used. Alternatively, instead of at least one of the luminance ratio and the chroma C, or in addition thereto, one of or both the contrast and the colorfulness M may be used.

Herein, it is assumed that the degree of adaptation D, the parameter $F_L$ and the colorfulness M are given by the following formulae (4), (5), and (6) according to the Preceedings of IS & T/SID 10th Color Imaging Conference, pages 23 to 27, "CIECAM02 Color Appearance Model". Since those formulae are described in detail in the third aspect, the description thereof is herein omitted.

$$D = F\left[1 - \left(\frac{1}{3.6}\right)e^{\left(\frac{-L_A-42}{92}\right)}\right] \quad (4)$$

$$F_L = 0.2k^4(5L_A) + 0.1(1-k^4)^2(5L_A)^{1/3} \quad (5)$$
$$k = 1/(5L_A + 1)$$

$$M = CF_L^{1/4} \quad (6)$$

5) Then, the color appearance conversion is used as inverse conversion in the color appearance inverse conversion unit 36b based on the thus obtained appearance attribute values D5 (the values of the lightness J, the hue h, and the colorfulness M) obtained in the color appearance forward conversion unit 36a to obtain again the calorimetric values Dr6 of the transparent subject image (the converted tristimulus values (XaYaZa) of the subject) serving as image values corresponding to the tristimulus values of the transparent subject image.

6) In the preferred color reproduction processing unit 34b shown in FIG. 18, the calorimetric values Dr6 of the transparent subject image (the converted tristimulus values (XaYaZa) of the transparent subject image), which are subjected to the preferred color reproduction conversion in the contrast and chroma conversion unit 36, are obtained to be then input to the appearance faithful reproduction processing unit 32c as shown in FIG. 16.

The calorimetric values Dr6 of the transparent subject image, which are input to the appearance faithful reproduction processing unit 32c, are subjected to chromatic adaptation conversion in the chromatic adaptation conversion section 26 (26a and 26b) in the appearance faithful reproduction conversion unit 22 (the appearance faithful reproduction forward conversion unit 22a and the inverse conversion unit 22b)

of the appearance faithful reproduction processing unit 32c shown in FIG. 17 and then are subjected to the contrast conversion in the non-linear signal conversion section 28 (28a and 28b) to obtain the calorimetric values D3 of the converted image, which are subjected to the appearance faithful reproduction correction, as described above.

As shown in FIG. 16, the thus obtained calorimetric values D3 of the converted image are input from the appearance faithful reproduction processing unit 32c to the flare correction section 24.

7) The flare correction section 24 shown in FIG. 16 calculates the degree of decrease in density due to flare from the surrounding conditions when the reproduced image (print image) is viewed. The calorimetric values D3 of the converted image obtained in the appearance faithful reproduction processing unit 32c are subjected to density correction to compensate for the decrease in density due to flare. As a result, the appearance of the transparent subject image can be faithfully reproduced. In addition, the transparent subject image on which the preferred color reproduction of an appearance is achieved, that is, the calorimetric values D4 of the reproduced image (the tristimulus values (XYZ)) can be obtained.

The thus obtained colorimetric values D4 of the reproduced image are subjected to signal conversion into the digital image data D7 to be input to a printer in the color conversion table creating section 72a.

8) In the color conversion table creating section 72a, as described above, the appearance color conversion operations described in the above 4) to 7) are performed with a plurality of combinations of the enhancement parameter 1 (luminance ratio) and the enhancement parameter 2 (chroma C) to obtain a plurality of color conversion paths. Therefore, the patch images corresponding to the 3DLUT components are to be converted and then edited as 3DLUTs after the conversion, whereby a plurality of color conversion tables (3DLUTs) using the lightness (average lightness) and the chroma (average chroma) as enhancement parameters can be obtained. Specifically, the patch images for constituting the 3DLUTs are created in advance on the color reversal film to obtain the image data of the patch images. The obtained image is allowed to pass through the color conversion paths to virtually create image data for a predetermined appearance. The created image data is put into a three-dimensional table format, so a 3DLUT can be created for one combination of enhancement parameters. Therefore, the color patches of the 3DLUT are input to the transparent original image data to create a plurality of 3DLUTs with different enhancement parameters. In this manner, the 3DLUTs are generated while the combinations of enhancement parameters are varied in a parametric manner. As a result, a 3DLUT can be generated for each combination of enhancement parameters.

As described above, a plurality of color conversion tables for color conversion for appearance reproduction to convert the calorimetric values Dr1 of the transparent image on the color reversal film into the digital image data D7 to be input to a printer can be obtained. The plurality of color conversion tables need to be created only once in the color conversion table creating section 72a.

In this manner, the plurality of color conversion tables obtained in the color conversion table creating section 72a are stored in the color conversion table storage section 72b.

9) The image characteristic amount is extracted in the image characteristic amount calculating section 72c from the transparent subject image (the calorimetric values Dr1) obtained by the image input unit 17 in the above 1). In this case, calorimetric values (L*a*b*) of the transparent original image when viewed are obtained. Then, the average lightness L and the average chroma C are obtained for each of the transparent original images as the image characteristic amount.

10) An appropriate color conversion table is selected by the color conversion table selecting section 72d from the plurality of color conversion tables created in the color conversion table creating section 72a in the above 8) in accordance with the image characteristic amount extracted in the image characteristic amount calculating section 72c in the above 8).

11) The calorimetric values Dr1 of the transparent subject image obtained by the image input unit 17 in the above 1) are subjected to color conversion by the conversion processing section 72e of the image processing unit 72 by using the color conversion table selected in the color conversion table selecting section 72d, thereby obtaining the digital image data D7 to be input to a printer of a reproduced image, on which the appearance of the transparent subject image can be faithfully reproduced while the preferred color reproduction of an appearance is achieved.

In this way, the digital image data D7 to be input to a printer, which is obtained in the image processing unit 72, is input to the image output unit 14.

12) The image output unit 14 creates and outputs a reproduced image such as a photo print so that the digital image data D7 of the finally obtained image to be reproduced in the image processing unit 72, is reproduced on the reproduced image to be viewed such as a hardcopy image (print image).

The thus output reproduced image is a hardcopy image such as a photo print, on which the appearance of the subject is faithfully reproduced while preferred color reproduction is achieved. Specifically, the thus obtained reproduced image provides not only faithful reproduction of an appearance but also preferred color reproduction, and therefore looks natural to a human being.

In the above-described example, a value of the chroma C (enhancement parameter 2) is varied in the color appearance forward conversion unit 36a of the contrast and chroma conversion unit 36 of the preferred color reproduction processing unit 34b shown in FIG. 18. However, the present invention is not limited thereto. A value of the chroma C may alternatively be varied in the appearance faithful reproduction forward conversion unit 22a of the appearance faithful reproduction conversion unit 22 of the appearance faithful reproduction processing unit 32c shown in FIG. 17. Specifically, even in the reproduction forward conversion unit 22a, the above-described conversion operations are performed to obtain a plurality of color conversion paths after a value of the chroma C (enhancement parameter 2) is varied to be 1.00 to 1.20 times larger.

Hereinafter, the image processing method constituting the first mode, the image processing device constituting the second mode, and the image output device constituting the third mode of the fourth aspect of the present invention will be specifically described with an example.

Example 8

Hereinafter, the case where R, G, and B signals calculated by the image processing method according to the first aspect of the present invention are input to a color digital printer corresponding to the image forming device of the third aspect of the present invention to obtain a preferred chroma-converted (contrast-converted) print image as a reproduced image will be described with reference to FIGS. 19A and 19B.

Figure 19A:
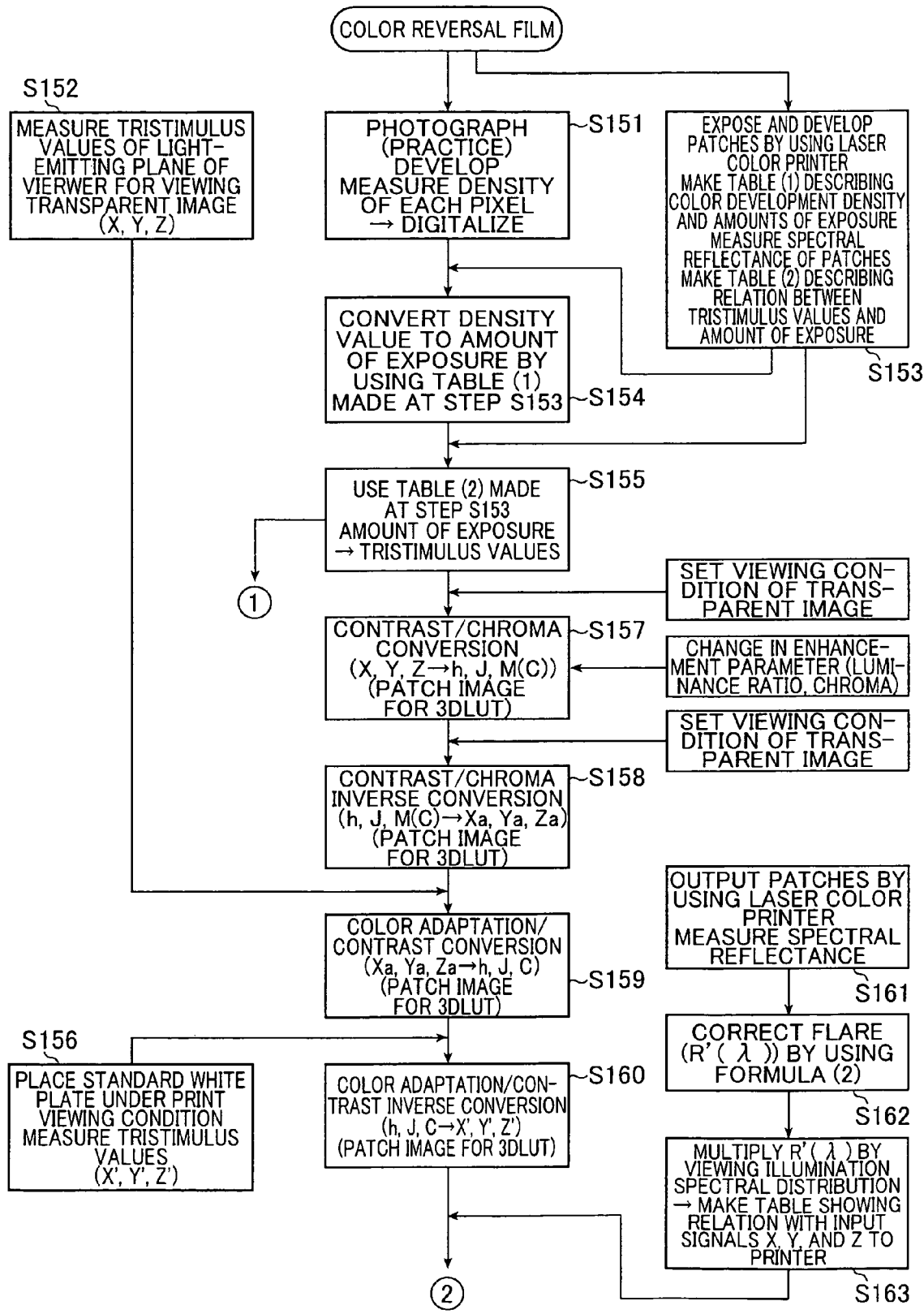
FIGS. 19A and 19B are flowcharts, each for illustrating an example of the flow of processing in a further embodiment of the image processing method of the present invention.
Figure 19B:
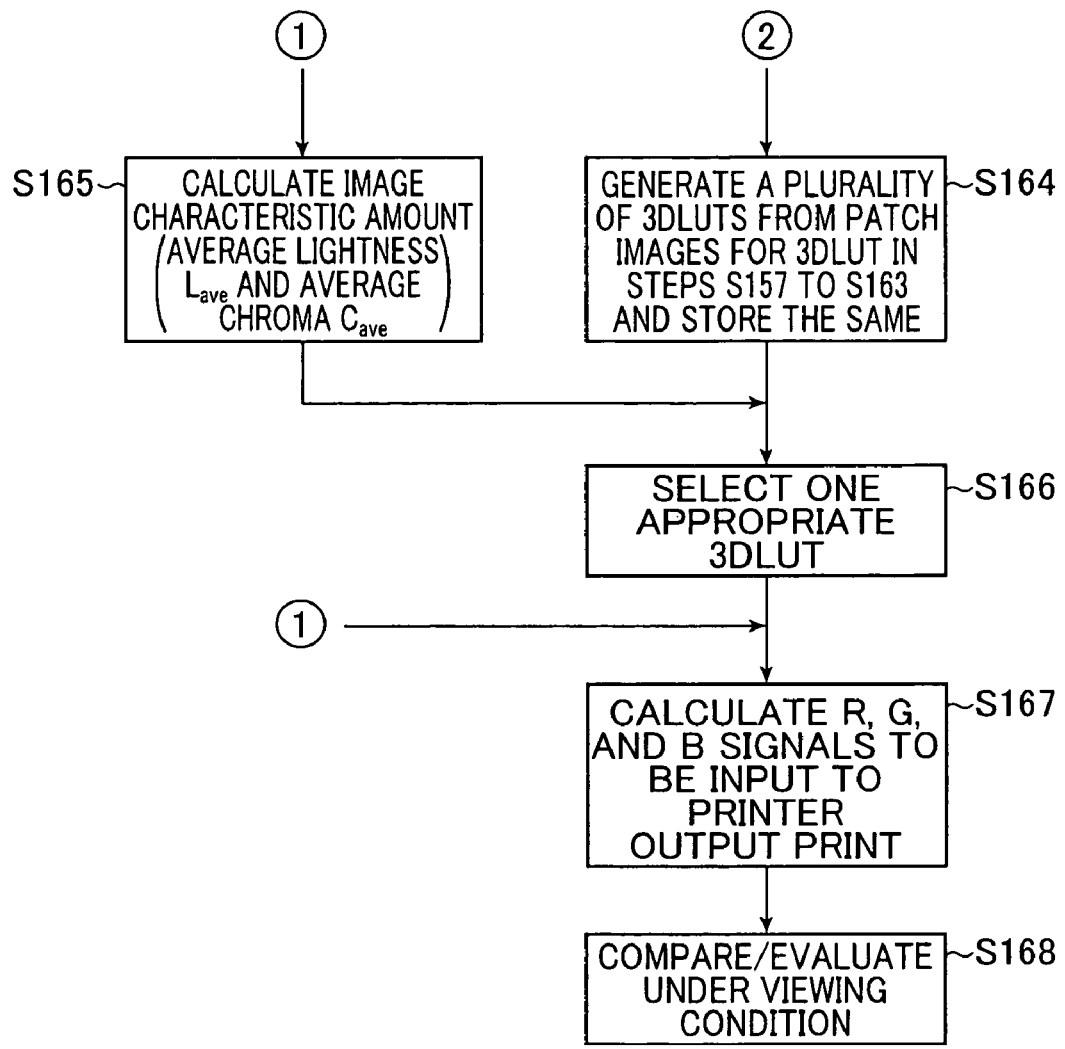

FIGS. 19A and 19B are flowcharts for illustrating the flow of a series of processing in this embodiment where a photo print using a silver salt photographic sensitive material is output from a transparent image on a color reversal film.

Steps S151 to S156:

In exactly the same manner as in the steps S101 to S106 in Example 6, the colorimetric values Dr1 of the transparent subject image (the tristimulus values (XYZ) of the subject), the transparent image viewing conditions for viewing the transparent image on the color reversal film, and the viewing conditions (illuminating conditions) for print viewing were obtained from the transparent image photographed on a color reversal film PROVIA 100F professional fabricated by Fuji Photo Film Co., Ltd.

Step S157:

By using the appearance conversion formula described in the Proceedings of IS & T/SID 10th Color Imaging Conference, pages 23 to 27, patch images for a three-dimensional table (the appearance attribute values D5) were created, which were images obtained by performing the chroma conversion (contrast conversion) on the transparent subject image (the colorimetric values Dr1; the tristimulus values (XYZ)). Herein, the tristimulus values X', Y', and Z' to be reproduced under the print viewing environment were calculated from the X, Y, and Z values of the transparent image viewing environment of the color reversal film. The calculation was performed, assuming that the observer perfectly adapted to a light source illuminating the transparent image on the color reversal film (a value of the degree of adaptation D expressed by the above formula (4) was forced to be 1) (the set viewing conditions). Furthermore, in the contrast conversion, a plurality of values corresponding to the conversion of a viewing illuminance value of the transparent original image on the color reversal film to a constant multiple thereof (the luminance ratio (enhancement parameter 1) (corresponding to a change of the value of the adaptation luminance $L_A$ in the above-described formula (5) used for calculating $F_L$) to calculate three appearance attribute values D5, that is, the hue h, the lightness J, and the colorfulness M. Then, a series of patch images for a three-dimensional (lookup) table (3DLUT) corresponding to images with only the chroma C (enhancement parameter 2) being varied to be a constant multiple thereof were produced.

Step S158:

By using the formulae described in the Proceedings of IS & T/SID 10th Color Imaging Conference, pages 23 to 27, a series of images (patch images for a three-dimensional table) represented by tristimulus values (XaYaZa) of the transparent subject image (the colorimetric values Dr6) after chroma conversion were calculated by using the illuminating conditions (the set illuminating conditions) of the transparent original image on the color reversal film from three appearance attribute values D5, that is, the hue h, the lightness J, and the colorfulness M, which were calculated at the step S157.

Step S159:

After that, from the images represented by the tristimulus values (XaYaZa) (the calorimetric values Dr6) obtained at the step S158, the chromatic adaptation conversion and the contrast conversion were performed by using the transparent image viewing conditions obtained at the step S152 with the method described in the Proceedings of IS & T/SID 10th Color Imaging Conference, pages 23 to 27. A series of images (patch images for a three-dimensional table) whose three appearance attribute values D2, that is, the hue h, the lightness J, and the chroma C were calculated were created.

Step S160:

Next, by using the appearance conversion formulae described in the Proceedings of IS & T/SID 10th Color Imaging Conference, pages 23 to 27, a series of reproduced images (patch images for a three-dimensional table) represented by tristimulus values (X', Y', Z') of the converted images to be output on prints, which were subjected to appearance faithful reproduction processing and preferred color reproduction processing, were calculated from three appearance attribute values D2, that is, the hue h, the lightness J, and the chroma C, calculated at the step S159 by using the viewing illuminating conditions for viewing the prints, which were obtained at the step S156.

Step S161:

A laser color printer described in SPIE vol. 1079, pp 90-98 was used as a printer. Patches with R, G, and B input signals being respectively varied in advance were output on professional color paper Prolaser Crystal TYPE II-E fabricated by Fuji Photo Film Co., Ltd. A spectral reflectance of each of the patches was subjected to spectrophotometric colorimetry by a TC-1800M fabricated by Tokyo Denshoku Co., Ltd.

Step S162:

For the spectral reflectance data R (λ) measured at the step S161, a spectral reflectance R' (λ) after flare correction was calculated according to the following formula (2).

$$R'(\lambda) = \left(\frac{R(\lambda) + h}{1 + h}\right) \cdot (1 + h') - h' \qquad (2)$$

Step S163:

Tristimulus values of X, Y, and Z were calculated by multiplying the spectral reflectance R' (λ) after flare correction calculated at the step S162 by a spectral distribution of the print viewing illumination to make a table showing the relation between the input signals to the printer and the X, Y, and Z tristimulus values (calorimetric values D4) after the flare correction.

Step S164:

As shown in FIG. 19B, patch images for generating three-dimensional tables (3DLUTs) with a plurality of combinations of the luminance ratio (enhancement parameter 1) and the chroma C (enhancement parameter 2) were produced by the operations at the steps 157 to S163 shown in FIG. 19A. The thus produced patch images for generating three-dimensional tables (3DLUTs) were used to make three-dimensional color conversion tables (3DLUTs) with a plurality of combinations of the luminance ratio and the chroma C as follows.

In this case, the luminance ratio: 10, 30, 50, and 100, and the chroma C: 1.00 (0%), 1.05 (increased by 5%), 1.10 (increased by 10%), and 1.20 (increased by 20%) were used to make sixteen three-dimensional color conversion tables.

Step S165:

The X, Y, and Z tristimulus value image (the calorimetric values Dr1) obtained at the step S155 was converted into an Lab color space defined in CIE 1976 to create an image represented by L*a*b*. Furthermore, from the created image, the average lightness ($L_{ave}$) and the average chroma ($C_{ave}$) of the image were obtained as the image characteristic amounts by calculation.

Step S166:

By using the average lightness ($L_{ave}$) and the average chroma ($C_{ave}$) obtained at the step S165, a color conversion table appropriate for color appearance conversion was selected from the plurality of three-dimensional color conversion tables created at the step S164.

In this Example 8, the following regression formulae (7) and (8) were used for selection.

Luminance ratio parameter:

$$R=10^{-0.007 \times C_{ave}+0.018 L_{ave}+0.934} \quad (7)$$

[Formula (8)]

Chroma parameter:

$$C=0.105 \times C_{ave}-0.011 \times L_{ave}+0.56 \quad (8)$$

where the chroma parameter C indicates the degree of enhancement of the chroma C in %.

In this case, the above-described regression formulae (7) and (8) were obtained as follows.

For ten kinds of scenes photographed on a color reversal film, the transparent images under the viewing environment were subjected to appearance reproduction conversion for various combinations of enhancement parameters (the luminance ratio parameter R and the chroma parameter C) to output a plurality of print images with each combination for each scene. Sensory evaluation was carried out by ten observers (they were all members of Fuji Photo Film Co., Ltd., and were all engaged in design and development evaluation of color reversal films). From a plurality of print images obtained for each of the scenes, one print image on which the optimal appearance was reproduced was selected for each scene.

The optimal values of the enhancement parameters (the luminance ratio parameter R and the chroma parameter C) allowing the thus selected optimal print image of each scene to be obtained and the image characteristic amounts (the average lightness $L_{ave}$ and the average chroma $C_{ave}$) of each scene were calculated.

The thus obtained average lightness $L_{ave}$, average chroma $C_{ave}$, optimal value of the luminance ratio parameter R, and optimal value of the chroma parameter C of each of the scenes are shown in Table 1 below.

The regression formula (7) of the luminance ratio parameter R and the regression formula (8) of the chroma parameter C were obtained by using the average lightnesses $L_{ave}$, the average chromas $C_{ave}$, the optimal values of the luminance ratio parameter R, and the optimal values of the chroma parameters C over all the scenes except a human being shown in Table 1.

Calculated values of the luminance ratio parameter R and calculated values of the chroma parameter C of each of the scenes by the thus obtained regression formulae (7) and (8) are shown in Table 1 below.

Table 1 shows that the calculated values of the luminance ratio parameter R and the chroma parameter C of each of the scenes are close to the optimal values of the luminance ratio parameter R and the chroma parameter C.

TABLE 1

| Scene | Image characteristic amount | | Optimal values of the chroma parameter | Calculated values of the chroma parameter | Optimal values of the luminance ratio parameter | Calculated values of the luminance ratio parameter |
|---|---|---|---|---|---|---|
| | Average chromas C | Average lightnesses L | | | | |
| Archeological Site (Building) | 15 | 27 | 2.5 | 1.3 | 20 | 20.54 |
| Still Object (Wooden Figurine) | 23 | 32 | 2.5 | 2.0 | 20 | 21.92 |
| Flower 1 | 60 | 36 | 5 | 5.9 | 10 | 14.36 |
| Flower Bouquet | 54 | 38 | 7.5 | 5.2 | 10 | 17.16 |
| Still Object (Monotone) | 10 | 39 | 0 | 0.6 | 50 | 36.78 |
| Landscape (Lake and Forest) | 42 | 44 | 5 | 3.9 | 30 | 26.45 |
| Landscape (Lake under the glow of the rising sun) | 49 | 48 | 5 | 4.6 | 75 | 28.73 |
| Flower 2 | 53 | 53 | 5 | 4.9 | 40 | 32.60 |
| Still Object (Pastel) | 22 | 65 | 2.5 | 1.5 | 75 | 89.10 |
| Human Being | 15.39 | 60.22 | 0 | 0.925 | 20 | 80.58 |

Based on the luminance ratio parameters R (enhancement parameters 1) and the chroma parameters C (enhancement parameters 2) obtained by the formulae (7) and (8), a three-dimensional color conversion table with the enhancement parameters close to the respective enhancement parameters was selected as a color conversion table appropriate for color appearance conversion from the three-dimensional color conversion tables with a plurality of combinations of enhancement parameters created at the step S164.

However, if a main subject was a human being, the chroma parameter of 0% and the luminance parameter of 20 were fixedly used.

Step S167:

The X, Y, and Z tristimulus value image (the calorimetric values Dr1) obtained at the step S155 was converted into the tristimulus values X, Y, and Z (the calorimetric values D4) after flare correction to be output under the viewing environment by using the color conversion table selected at the step S166. Then, R, G, and B signals to be input to a printer, which were obtained by converting the calorimetric values D4, were input to a printer to obtain a final output image.

Step S168:

Psychological evaluation for preference was carried out by ten observers (they were all members of Fuji Photo Film Co., Ltd., and were all engaged in design and development evaluation of color reversal films) on the output images (11 scenes) obtained under the print viewing condition. As a result, further excellent results were obtained on average over all the scenes as compared with the case where the luminance ratio was increased by 30 times and the chroma C was improved by 2.5% (the third aspect of the present invention).

The image processing method, the image processing device, and the image output device respectively constituting the first, second, and third modes of the fourth aspect of the present invention are basically configured as described above.

Next, with reference to FIGS. 20 to 21B, an image processing method, an image processing device, and an image output device of the fifth aspect of the present invention will be described.

In the fourth aspect of the present invention, an appropriate color conversion table is selected from a plurality of color conversion tables (3DLUTs) prepared for a plurality of enhancement parameters in accordance with the image characteristic amount of a scene. However, the present invention is not limited thereto. As in the fifth aspect of the present invention, an appropriate color conversion table in accordance with a photographed scene may be obtained by synthesis of some of color conversion tables prepared in advance. In this manner, the most suitable color conversion table for a scene can be created to perform the most preferred color reproduction conversion for the scene. In addition, the number of color conversion tables to be prepared in advance can be reduced to reduce the capacity of the storage section for storing the color conversion tables.

Figure 20:
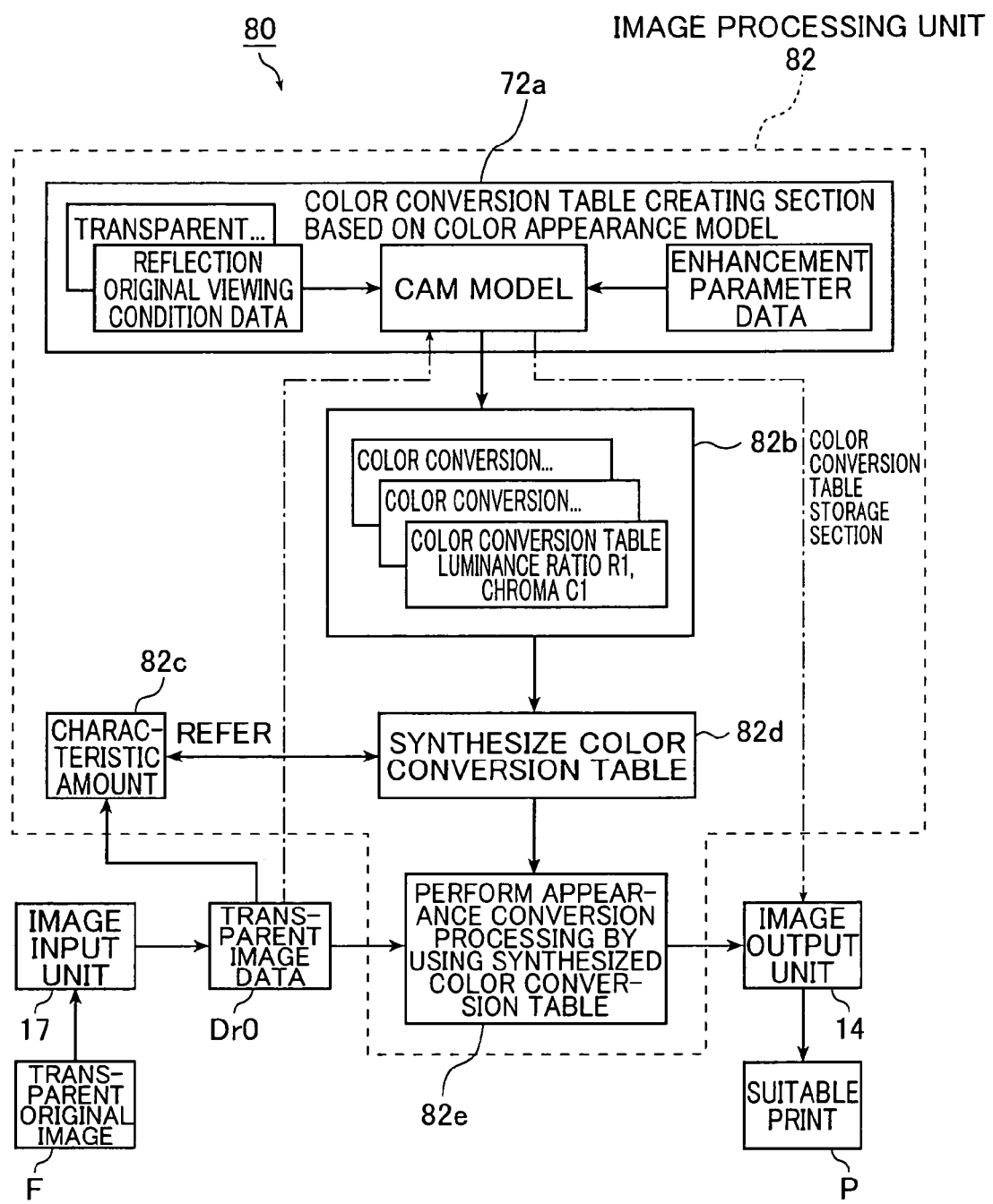
FIG. 20 is a block diagram of a further embodiment of the image forming device according to the present invention, which is equipped with the image processing device of the present invention.

FIG. 20 is a block diagram of an embodiment of an image forming device corresponding to the image output device constituting the third mode, which is equipped with the image processing device constituting the second mode for executing the image processing method constituting the first mode of the fifth aspect of the present invention.

Since an image forming device 80 shown in FIG. 20 and the image forming device 70 shown in FIG. 15 have the same structure except for a difference in specific structure between an image processing unit 82 and the image processing unit 72, the same components are denoted by the same reference numerals and the detailed description thereof is herein omitted.

As shown in FIG. 20, the image forming device 80 includes: the image input unit 17 for photoelectrically reading the transparent image (transparent original image) F recorded on a reversal film on which a subject is imaged so as to acquire the digital image data Dr0; the image processing unit 82 for performing image conversion processing including appearance reproduction processing on the image data Dr0 acquired in the image input unit 17 so as to achieve not only the faithful reproduction of the appearance of the transparent image F on the reversal film being viewed but also further preferred color reproduction; and the image output unit 14 for outputting an image to be viewed such as a hardcopy image (photo print P) based on the image data obtained by performing the appearance reproduction conversion processing in the image processing unit 82.

The image processing unit 82 constitutes an embodiment of the image processing device of the second mode of the present invention for executing the image processing method of the first mode of the fifth aspect of the present invention. The image processing unit 82 performs image conversion processing on the calorimetric values Dr1 (the tristimulus values (XYZ) of a color of the transparent subject image) of each point on the transparent subject image, which are calculated from the digital image data Dr0 acquired in the image input unit 17, so as not only to faithfully reproduce the appearance of the transparent image F on the reversal film being viewed but also to provide further preferred color reproduction.

The image processing unit 82 includes: the color conversion table creating section 72a for creating a plurality of color conversion tables for performing color conversion based on the color appearance conversion formulae; a color conversion table storage section 82b for storing the plurality of color conversion tables created in the color conversion table creating section 72a; an image characteristic amount calculating section 82c for calculating the image characteristic amount from the calorimetric values Dr1 of the transparent subject image on the color reversal film F obtained in the image input unit 17; a color conversion table synthesizing section 82d for synthesizing at least two of the plurality of color conversion tables stored in the color conversion table storage section 82b based on the image characteristic amount calculated in the image characteristic amount calculating section 82c to obtain a single appropriate color conversion table; and a conversion processing section 82e for performing appearance conversion processing on the colorimetric values Dr1 of the transparent subject image obtained in the image input unit 17 using the single color conversion table obtained by synthesis in the color conversion table synthesizing section 82d to obtain an image signal (the image data D7 for print output) to be input to a printer.

Since the color conversion table creating section 72a shown in FIG. 16 can be used even in the image processing unit 82 of this aspect as in the image processing unit 72 of the fourth aspect of the present invention, the description thereof is herein omitted.

As shown in FIG. 20, a plurality of color conversion tables created in the color conversion table creating section 72a are stored in the color conversion table storage section 82b.

The same storage section as the color conversion table storage section 72b shown in FIG. 15 can be used as the color conversion table storage section 82b.

The image characteristic amount calculating section 82c calculates the image characteristic amount from the calorimetric values Dr1 of the transparent subject image on the color reversal film F obtained in the image input unit 17. The image characteristic amount calculated herein serves to determine the enhancement parameters (the luminance ratio and the chroma C) for obtaining a single appropriate color conversion table by synthesis, the color conversion table being for performing color conversion on the transparent subject image on the color reversal film F so as to achieve preferred color reproduction and faithful reproduction of an appearance. Examples of the image characteristic amount calculated herein include the image characteristic amount in an L*a*b* space, the lightness L and the chroma C, and the average lightness $L_{ave}$ and the average chroma $C_{ave}$.

Any image characteristic amount can be used as the image characteristic amount used for synthesis of the color conversion tables in the present invention as long as it can determine the enhancement parameters (the luminance ratio and the chroma C) for obtaining a single appropriate color conversion table by synthesis for the transparent subject image on the color reversal film F, whose appearance is to match with that of the reproduced image. The image characteristic amount calculating section 72c shown in FIG. 15 may also be used as the image characteristic amount calculating section 82c.

The color conversion table synthesizing section 82d synthesizes at least two of the plurality of color conversion tables stored in the color conversion table storage section 82b to obtain a single color conversion table appropriate for appearance conversion having the enhancement parameters (the combination of the luminance ratio and the chroma C) in accordance with the transparent subject image on the color reversal film F, that is, in accordance with the image characteristic amounts (the average lightness and the average chroma) calculated in the image characteristic amount calculating section 82c. Specifically, two or more color conversion tables having values close to the values of the enhancement parameters (the combination of the luminance ratio and the chroma C) in accordance with the image characteristic amounts (the average lightness and the average chroma) are synthesized, preferably, two or more color conversion tables having values interposing the luminance ratio and the chroma C therebetween are selected. A value of the color conversion table having the luminance ratio and the chroma C is obtained by interpolation calculation from the values of the color conversion tables to generate a single color conversion table appropriate for appearance conversion.

The conversion processing section 82e uses the color conversion table appropriate for appearance conversion obtained by synthesis with the color conversion table synthesizing section 82d in accordance with the transparent subject image on the color reversal film F to perform appearance conversion processing for obtaining an image signal (the digital image data D7 for print output) to be input to a printer from the colorimetric values Dr1 of the transparent subject image on the color reversal film F. The conversion processing section 72e shown in FIG. 15 may be used as the conversion processing section 82e.

The image data D7 to be input to a printer, which is obtained in the conversion processing section 82e of the image processing unit 82 in this manner, allows the output of a print image on which not only the faithful reproduction of an appearance but also the preferred reproduction of an appearance are achieved.

In this manner, the transparent subject image not only capable of faithfully reproducing the appearance of the transparent subject image but also providing preferred color reproduction, that is, the image data of the reproduced image (digital image data D7 for print output) can be obtained in the image processing unit 82. The thus obtained image data D7 of the reproduced image is input to the image output unit 14.

The image output unit 14 creates and outputs a reproduced image such as a photo print so that the image data D7 of the finally obtained image to be reproduced, which is subjected to preferred color reproduction processing and appearance faithful reproduction correction processing in the image processing unit 82, is reproduced on the reproduced image to be viewed such as a hardcopy image (print).

The thus output reproduced image is a hardcopy image such as a photo print, on which the appearance of the subject is faithfully reproduced while preferred color reproduction is achieved. Specifically, the thus obtained reproduced image provides not only faithful reproduction of an appearance but also preferred color reproduction.

The image processing device of the second mode of the fifth aspect of the present invention and the image output device of the third mode of this aspect are basically configured as described above.

Next, the effects of the image processing device of the second mode and the image output device of the third mode, and the image processing method of the first mode of the fifth aspect of the present invention will be described.

In this aspect, a plurality of color conversion tables are created in advance in the color conversion table creating section 72a of the image processing unit 82 of the image forming device 80 shown in FIG. 20 to be stored in the color conversion table storage section 82b. Next, in the color conversion table synthesizing section 82d, a single appropriate color conversion table is obtained by synthesis of at least two color conversion tables in the color conversion table storage section 82b in accordance with the image characteristic amount of the transparent image on the color reversal film, which is calculated in the image characteristic amount calculating section 82c. The color conversion is performed on the image data (the calorimetric values Dr1) of the transparent image on the reversal film by using the color conversion table obtained by synthesis in the conversion processing section 82e to obtain the image data (the digital image data D7) suitable to be reproduced as a suitable print.

Hereinafter, the specific description will be given.

Since each of the steps described below is the same as each of the steps of the fourth aspect of the present invention except for a synthesis step of color conversion tables, the detailed description thereof is herein omitted.

As described above, even in the image forming device 80 shown in FIG. 20, as in the fourth aspect, the following processing is performed. Specifically, 1) the calculation of the calorimetric values Dr1 (the tristimulus values (XYZ) of the transparent subject image) of each point on the transparent subject image on the color reversal film, 2) the acquisition of transparent image viewing condition data, 3) the acquisition of print image (reproduced image) viewing condition data, 4) the forward conversion of preferred color reproduction conversion using color appearance conversion formulae in the preferred color reproduction processing unit 34b of the color conversion table creating section 72a, 5) the calculation of the calorimetric values Dr6 of the transparent subject image (the converted tristimulus values (XaYaZa) of the subject) of the inverse conversion, 6) the calculation of the colorimetric values D3 of the converted image by the forward conversion and the inverse conversion of the appearance faithful reproduction conversion using the color appearance conversion formulae in the appearance faithful reproduction processing unit 32c, and 7) the calculation of the calorimetric values D4 (the tristimulus values (XYZ) of the transparent subject image, that is, the reproduced image which is subjected to flare correction in the flare correction section 24 and is capable of faithfully reproducing the appearance of a transparent subject image while the preferred color reproduction of an appearance is achieved, and the signal conversion into the digital image data D7.

8) After that, even in this aspect, as in the fourth aspect, the appearance color conversion operations described in the above 4) to 7) are performed with a plurality of combinations of the enhancement parameter 1 (the luminance ratio) and the enhancement parameter 2 (the chroma C) to obtain a plurality of color conversion paths in the color conversion table creating section 72a as described above. Thus, the patch images corresponding to the components of a 3DLUT are to be converted. After conversion, the patch images are edited as a 3DLUT. As a result, a plurality of color conversion tables (3DLUTs) including the lightness (average lightness) and the chroma (average chroma) as the enhancement parameters can be obtained.

In this manner, a plurality of color conversion tables for performing color conversion to achieve the reproduction of an appearance for converting the calorimetric values Dr1 of the transparent image on the color reversal film into the digital image data D7 to be input to a printer can be obtained. It is necessary to create only once the plurality of color conversion tables for a plurality of combinations of the enhancement parameter 1 (luminance ratio) and the enhancement parameter 2 (chroma C) corresponding to the references in the color conversion table creating section 72a.

The thus obtained plurality of color conversion tables in the color conversion table creating section 72a are stored in the color conversion table storage section 82b.

9) The image characteristic amount is extracted in the image characteristic amount calculating section 82c from the transparent subject image (the calorimetric values Dr1) obtained by the image input unit 17 in the above 1). Herein, the calorimetric values (L*a*b*) of the transparent original image when being viewed are obtained. Then, the lightness L or the average lightness L and the chroma C or the average chroma C are obtained for each transparent original image to be used as the image characteristic amounts.

10) At least two color conversion tables from the plurality of color conversion tables created in the color conversion table creating section 72a in the above 8) are synthesized in accordance with the image characteristic amount extracted in the image characteristic amount calculating section 82c in the above 8) to obtain a single appropriate color conversion table in the color conversion table synthesizing section 82d.

11) The calorimetric values Dr1 of the transparent subject image obtained by the image input unit 17 in the above 1) are subjected to color conversion in the conversion processing section 82e of the image processing unit 82 by using the color conversion table obtained by synthesis in the color conversion table synthesizing section 82b, thereby obtaining the digital image data D7 to be input to a printer of the reproduced image, on which the appearance of the transparent subject image can be faithfully reproduced while the preferred color reproduction of the appearance is achieved.

In this manner, the digital image data D7 to be input to a printer, which is obtained in the image processing unit 82, is input to the image output unit 14.

12) In the image output unit 14, the input digital image data D7 of an image to be reproduced, which is finally obtained in the image processing unit 82, is used to produce and output a reproduced image such as a photo print so as to be reproduced on the reproduced image to be viewed such as a hardcopy image (print image).

The thus output reproduced image is a hardcopy image such as a photo print on which the appearance of the subject is faithfully reproduced while the preferred color reproduction is achieved. Specifically, the thus obtained reproduced image provides not only the faithful reproduction of an appearance but also preferred color reproduction, and therefore looks natural to a human being.

Hereinafter, the image processing method of the first mode, the image processing device of the second mode, and the image output device of the third mode of the fifth aspect of the present invention will be specifically described with an example.

Example 9

Hereinafter, the case where R, G, and B signals calculated by the image processing method according to the first mode of this aspect are input to a color digital printer corresponding to the image forming device of the third mode of the present invention to obtain a preferred chroma-converted (contrast-converted) print image as a reproduced image will be described with reference to FIGS. 21A and 21B.

Figure 21A:
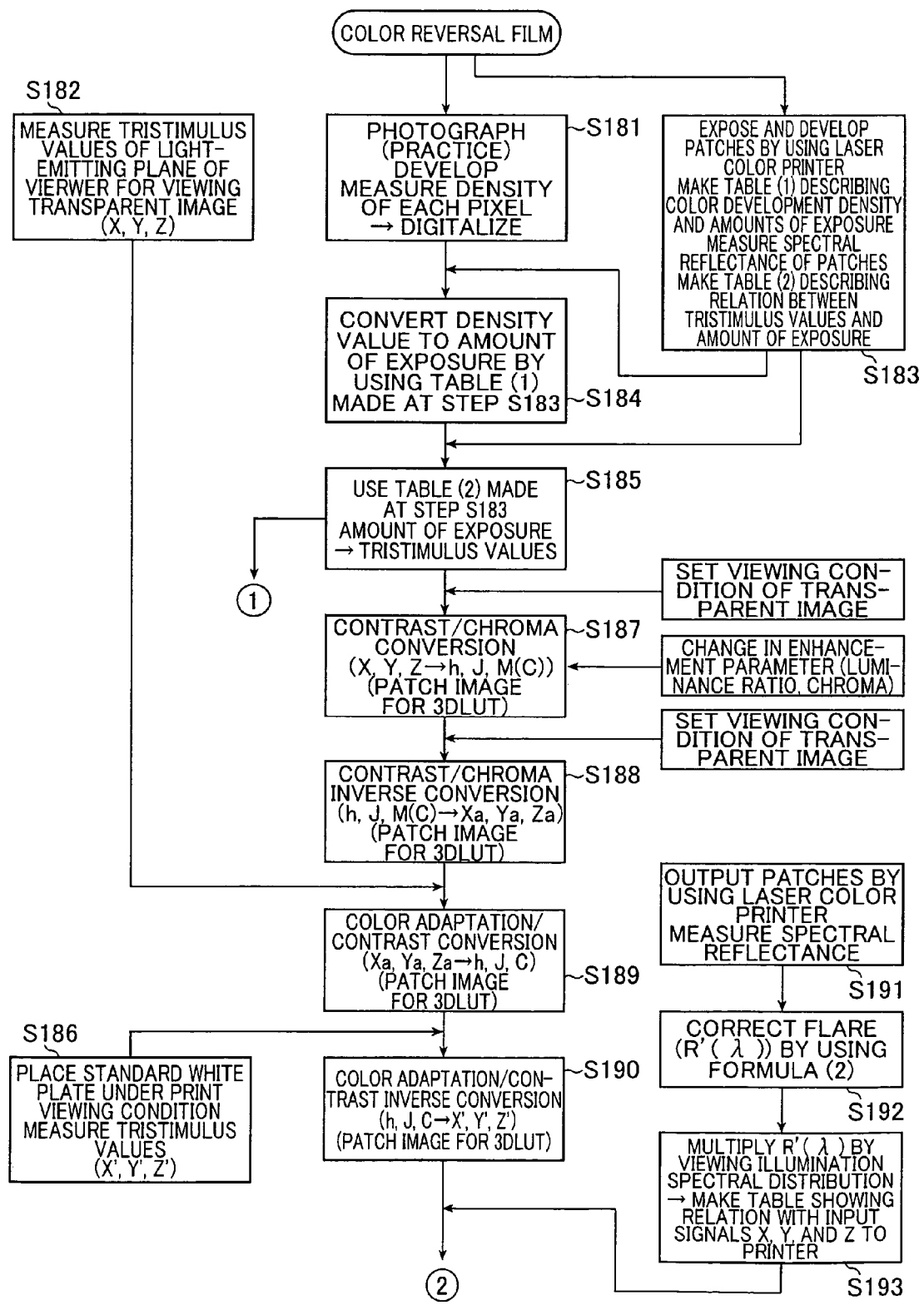
FIGS. 21A and 21B are flowcharts, each for illustrating an example of the flow of processing in a further embodiment of the image processing method of the present invention.
Figure 21B:
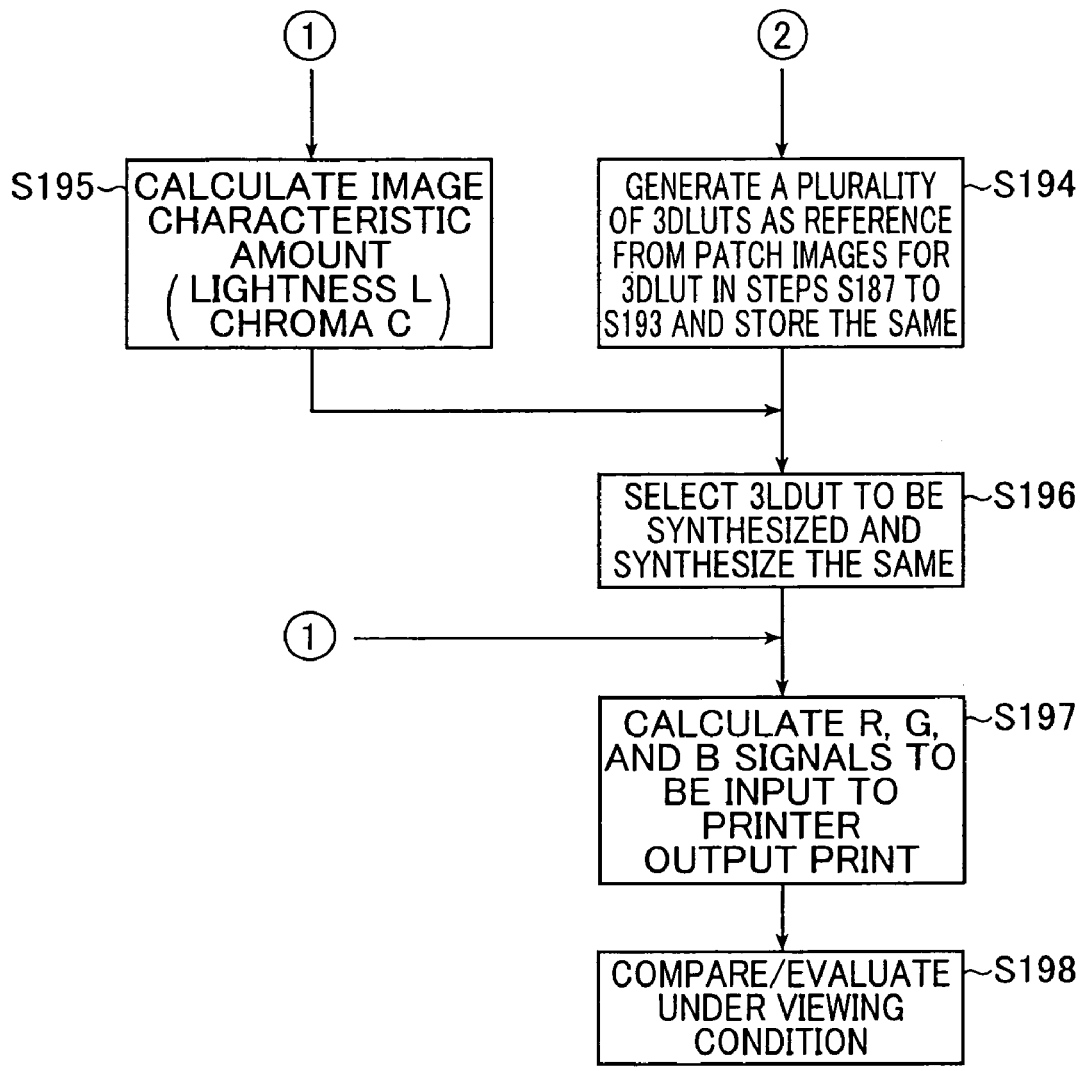

FIGS. 21A and 21B are flowcharts for illustrating the flow of a series of processing in this embodiment where a photo print using a silver salt photographic sensitive material is output from a transparent image on a color reversal film.

Steps S181 to S193:

In exactly the same manner as in the steps S151 to S163 in Example 8, the calorimetric values Dr1 of the transparent subject image (the tristimulus values (XYZ) of the subject), the transparent image viewing conditions for viewing the transparent image on the color reversal film, and the viewing conditions (illuminating conditions) for print viewing were obtained from the transparent image photographed on a color reversal film PROVIA 100F professional fabricated by Fuji Photo Film Co., Ltd. A series of the appearance attribute values D5 (patch images for 3DLUT), the calorimetric values Dr6 (patch image for 3DLUT), the appearance attribute values D2 (patch images for 3DLUT), and the colorimetric values D3 (patch images for 3DLUT) were calculated. Then, a table showing the relation between input signals to a printer and the X, Y, and Z tristimulus values (calorimetric values D4) after flare correction was made.

Step S194:

As shown in FIG. 21B, patch images for generating three-dimensional tables (3DLUTs) with a plurality of combinations of the luminance ratio (enhancement parameter 1) and the chroma C (enhancement parameter 2) corresponding to the references were produced by the operations at the steps 187 to S193 shown in FIG. 21A. The thus produced patch images for generating three-dimensional tables (3DLUTs) were used to make three-dimensional color conversion tables (3DLUTs) with a plurality of combinations of the luminance ratio and the chroma C as follows.

In this case, the luminance ratio: 10, 30, 50, and 100, and the chroma C: 1.00 (0%), 1.025 (increased by 2.5%), and 1.05 (increased by 5%) were used as reference values to make twelve three-dimensional color conversion tables.

Step S195:

The X, Y, and Z tristimulus value image (the calorimetric values Dr1) obtained at the step S185 was converted into an Lab color space defined in CIE 1976 to create an image represented by $L^*a^*b^*$. Furthermore, from the created image, the lightness (L) and the chroma (C) of the image were obtained as the image characteristic amounts by calculation. Although the average lightness and the average chroma were used as the lightness and the chroma of the image, any lightness and chroma may be used as long as they indicate image characteristics. For example, they may be the lightness and the chroma of a main part or a main subject of the image.

Step S196:

By using the lightness (L) and the chroma (C) obtained at the step S195, a single color conversion table appropriate for color appearance conversion was obtained by synthesis of the plurality of three-dimensional color conversion tables serving as the references, which were created at the step S194.

Specifically, by using the lightness (L) and the chroma (C) obtained at the step S195, corresponding luminance ratio parameter and chroma parameter were obtained by the following relational expressions (9) and (10). Two color conversion tables for a luminance ratio parameter and a chroma parameter close to the obtained luminance ratio parameter and chroma parameter were selected from the plurality of three-dimensional color conversion tables serving as the references, which were created at the step S194. The two color conversion tables were synthesized to obtain a single color conversion table appropriate for color appearance conversion for the corresponding luminance ratio parameter and chroma parameter.

Luminance Ratio Parameter (1) $L \leq 30$ Luminance ratio parameter=10 times larger (2) L=30 to 45 Luminance ratio parameter=between 10 and 100 times larger (interpolation)

(3) $L \geq 45$ Luminance ratio parameter=100 times larger  (9)

Chroma Parameter (the Degree of Enhancement of Chroma C Indicated in %)

(1) $C \leq 25$ Chroma parameter=2.5%

(2) C=25 to 40 Chroma parameter=between 2.5% and 5% (interpolation)

(3) $C \geq 40$ Chroma parameter=5%  (10)

In this case, the above relational expressions (9) and (10) were obtained as follows.

The results in Table 1 described above were used as in the fourth aspect of the present invention. For ten kinds of scenes photographed on a color reversal film, appearance reproduction conversion from transparent images under the viewing environment was performed for various combinations of enhancement parameters (the luminance ratio parameter and the chroma parameter) serving as the references to output a plurality of print images for the respective combinations for each of the scenes. Sensory evaluation was carried out by ten observers (they were all members of Fuji Photo Film Co., Ltd., and were all engaged in design and development evaluation of color reversal films). From a plurality of print images obtained for each of the scenes, one print image on which the appearance was optimally reproduced was selected for each scene.

The optimal values of the enhancement parameters (the luminance ratio parameter and the chroma parameter) allowing the thus selected optimal print image of each scene to be obtained and the image characteristic amounts (the lightness L and the chroma C) of each scene were calculated.

The thus obtained average lightness L, average chroma C, optimal value of the luminance ratio parameter, and optimal value of the chroma parameter of each of the scenes are shown in Table 2 below.

The relational expression (9) of the luminance ratio parameter and the relational expression (10) of the chroma parameter were obtained by using the average lightnesses L, the average chromas C, the optimal values of the luminance ratio parameter, and the optimal values of the chroma parameters over all the scenes except a human being shown in Table 2.

TABLE 2

| | Image characteristic amount | | Optimal values | |
|---|---|---|---|---|
| Scene | Average chromas C | Average lightnesses L | Optimal values of the chroma parameter | of the luminance ratio parameter |
| Archeological Site (Building) | 15 | 27 | 2.5 | 20 |
| Still Object (Wooden Figurine) | 23 | 32 | 2.5 | 20 |
| Flower 1 | 60 | 36 | 5 | 10 |
| Flower Bouquet | 54 | 38 | 7.5 | 10 |
| Still Object (Monotone) | 10 | 39 | 0 | 50 |
| Landscape (Lake and Forest) | 42 | 44 | 5 | 30 |
| Landscape (Lake under the glow of the rising sun) | 49 | 48 | 5 | 75 |
| Flower 2 | 53 | 53 | 5 | 40 |
| Still Object (Pastel) | 22 | 65 | 2.5 | 75 |
| Human Being | 15.39 | 60.22 | 0 | 20 |

Based on the luminance ratio parameter (enhancement parameter 1) and the chroma parameter (enhancement parameter 2) obtained by the relational expressions (9) and (10), two three-dimensional color conversion tables with enhancement parameters close to the respective enhancement parameters were selected from the three-dimensional color conversion tables with a plurality of combinations of enhancement parameters created at the step S194. The two three-dimensional color conversion tables were synthesized to obtain a single color conversion table appropriate for color appearance conversion.

However, if a main subject was a human being, the chroma parameter of 0% and the luminance parameter of 20 were fixedly used.

Step S197:

From the X, Y, and Z tristimulus value image (the colorimetric values Dr1) obtained at the step S185, the R, G, and B signals to be input to a printer, obtained by converting the tristimulus values X, Y, and Z (the colorimetric values D4) after the flare correction to be output under the viewing environment, were calculated by using the color conversion table obtained by synthesis at the step S196 to be then input to a printer to obtain a final output image.

Step S198:

For the output images (eleven scenes) obtained under the print viewing conditions, psychological evaluation for preference was carried out by ten observers (they were all members of Fuji Photo Film Co., Ltd., and were all engaged in design and development evaluation of color reversal films). As a result, further excellent results were obtained on average for all the scenes as compared with the case where the luminance ratio was increased by 30 times and the chroma C was improved by 2.5% (the third aspect of the present invention).

The image processing method, the image processing device, and the image output device of the first to third modes of the fifth aspect of the present invention are basically configured as described above.

In the above-described example of the image processing method of the first mode in the third to fifth aspects of the present invention, the color conversion table for converting the colorimetric values Dr1 into the image data D7 to be input to a printer is constituted as a single color conversion table including all the conversions and the corrections such as the contrast conversion, the chroma conversion, the chromatic adaptation correction, the contrast correction, the flare correction, and the signal conversion into the image data D7. However, the present invention is not limited thereto. For example, in order to obtain the image data D7 (for example, RGB signals) from the image data Dr0 (for example, RGB data) of the transparent original image on the color reversal film, all the conversions and corrections, i.e., the color conversion from the image data Dr0 of the transparent original image into the calorimetric values Dr1, the contrast conversion, the chroma conversion, the chromatic adaptation correction, the contrast correction, the flare correction, and the signal conversion into the image data D7 may be collectively constituted as a single conversion table. Alternatively, in order to obtain the calorimetric values D4 from the calorimetric values Dr1, all the contrast conversion, the chroma conversion, the chromatic adaptation correction, the contrast correction, and the flare correction may be collectively constituted as a single color conversion table. Further alternatively, a color conversion table may be defined for each of the conversions and corrections described above. Further alternatively, a color conversion table may be defined for some of the conversions and corrections described above.

For example, the processing process in the image processing method of the first mode in the fourth and fifth aspects of the present invention may be regarded as being composed of three processing, that is, the preferred appearance reproduction processing including the contrast conversion and the chroma conversion in the preferred color reproduction processing unit 34*b*, the appearance faithful reproduction processing including the chromatic adaptation correction and the contrast correction in the appearance faithful reproduction processing unit 32c, and the flare correction processing in the flare correction section 24. Accordingly, a plurality of color conversion tables may be created in accordance with a plurality of enhancement parameters (for example, a plurality of combinations of luminance ratio and chroma) as a color conversion table for processing the three processing, i.e., the preferred appearance reproduction processing, the appearance faithful reproduction processing, and the flare correction processing, as one set of processing. Then, one color conversion table having appropriate enhancement parameters in accordance with a scene may be selected from the plurality of created color conversion tables. Alternatively, some of the plurality of created color conversion tables may be used to obtain one color conversion table having appropriate enhancement parameters in accordance with a scene by synthesis.

However, the preferred appearance reproduction processing is composed of a plurality of processing in accordance with a plurality of enhancement parameters, respectively, while the appearance faithful reproduction processing and the flare correction processing are fixedly determined depending on the viewing environment of the transparent image and the reflection image such as a photo print. Therefore, a fixed color conversion table for the appearance faithful reproduction processing and the flare correction processing is created, while a plurality of color conversion tables are created in accordance with a plurality of enhancement parameters, respectively so that a color conversion table having appropriate enhancement parameters in accordance with a scene is selected from the plurality of created color conversion tables. After the processing with the selected color conversion table, or after the synthesis of some of the plurality of created color conversion tables to obtain a color conversion table with appropriate enhancement parameters in accordance with a scene, followed by the processing with the color conversion table obtained by synthesis, it is preferred to perform the processing with the fixed color conversion table for the appearance faithful reproduction processing and the flare correction processing. Also in this case, it is apparent that fixed color conversion tables may be created and used respectively for the appearance faithful reproduction processing and the flare correction processing.

As a further preferred embodiment of the present invention, a modification is made in the color conversion table (color conversion profile) created in the third aspect of the present invention, selected in the fourth aspect, or obtained by synthesis in the fifth aspect of the present invention as described above.

The reasons of making such a modification are as follows.

1. In view of the relation between the aim of mapping of color conversion by the image processing method of the present invention and the color reproduction gamut of the system, There is a possibility that
   a) the phenomenon of color saturation (the case where the contrast of brightness of a high chroma color is not successfully represented), and
   b) the case where the contrast becomes higher than needed in a high chroma range, may arise.

2. By making it possible to achieve color reproduction in a further preferred manner (the hue, the chroma, and the lightness), further preferred image reproduction can be achieved.

Specifically, in the case as the above reason 1, if the color conversion of the image processing method of the present invention is used alone, there sometimes arises the need for mapping to the outside of the color gamut because of the restriction on the color reproduction gamut of the system. Therefore, in the present invention, it is further preferred to perform the color conversion in consideration of the color reproduction gamut of the system.

Examples of an available method of making a modification in the created color conversion table (color conversion profile) include the following method, that is, a method of correcting a color conversion table (three-dimensional lookup table; 3DLUT) disclosed in JP 11-205620 A by the applicant of the present invention.

This correction method is for giving a current color and an aim color to the color conversion table to partially modify the color conversion table (3DLUT).

Figure 22:
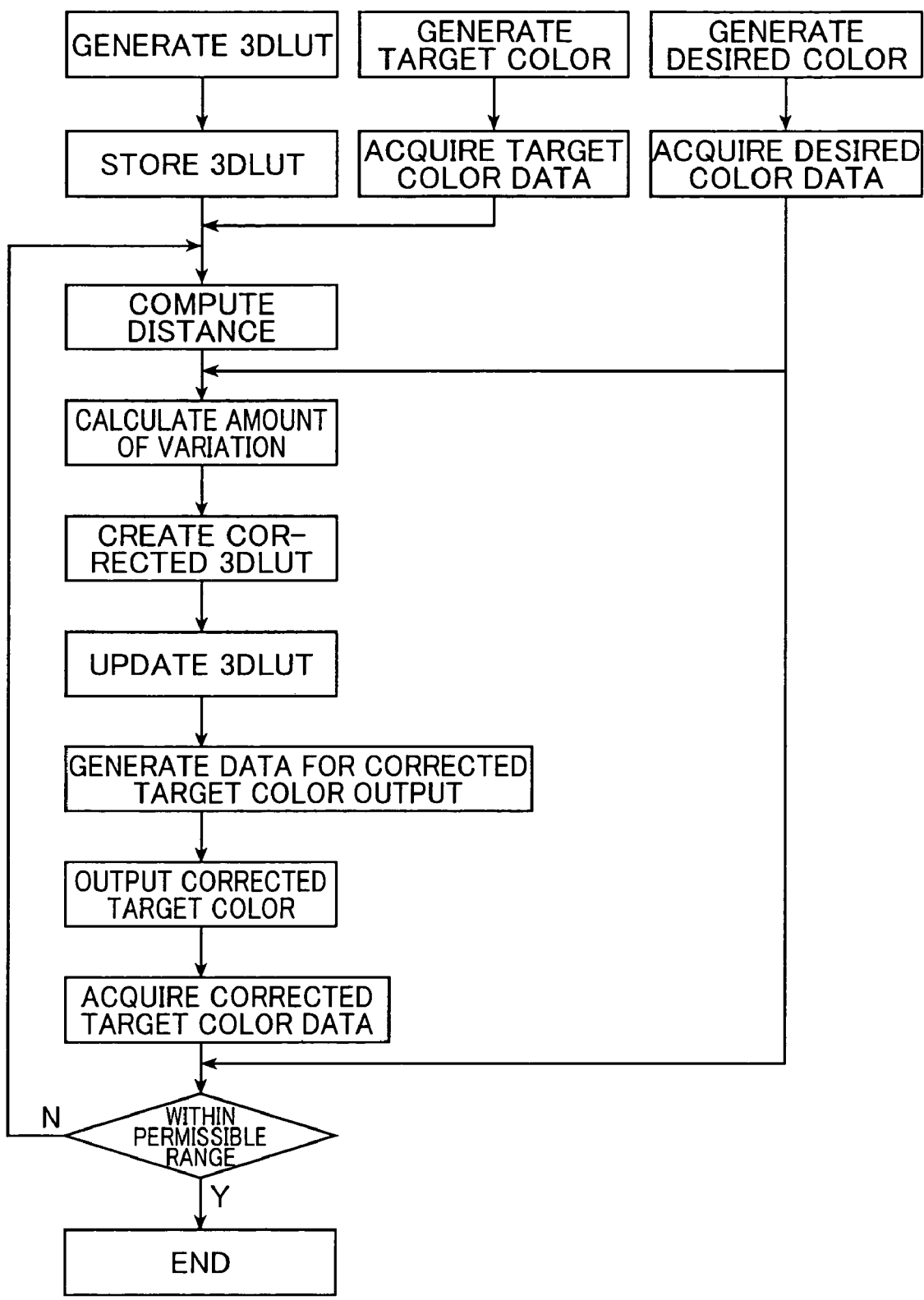
FIG. 22 is a flowchart for illustrating an example of the flow of processing of a correction method of the color conversion table used in the image processing method according to the present invention.

FIG. 22 shows a flowchart of an example of the correction method.

First, it is assumed that a highly accurate 3DLUT (M×M× M) is generated and stored in a memory. On the other hand, a target color and a desired color are determined in advance. The densities thereof are measured to be input as target color data and desired color data, respectively, to be stored in a memory or retained in an operation memory of the image processing unit 82 such as a CPU to be available anytime.

For example, any color may be used as a target color as long as it is a color that a user wants to change its finish, and therefore the target color is not particularly limited. For example, an important color such as skin color, sky blue, or grass green (green) may be used. A desired color obtained as a finish color by color conversion of the target color may be appropriately determined in accordance with the preference of a user, the appearance of a color, the fidelity of color reproduction, and the viewing conditions, and therefore is not particularly limited. For example, in the method of the present invention, skin color to be reproduced on an arbitrary photosensitive material may be used as a target color so that the target color is made to match with skin color on another photosensitive material, which is desired to be obtained. Alternatively, sky blue reproduced on an arbitrary photosensitive material is used as a target color so that the target color is made to match with sky blue of a color chart, which is desired to be obtained. For the target color, only one point for one color may be sufficient if a color chart is used. However, if another kind of photosensitive material is used, in particular, it is preferred that a plurality of points be determined for one color so that the average value thereof is used as data. It is also possible to select a plurality of colors as target colors.

Next, the 3DLUT is read from the memory. By using lattice point data in the 3DLUT and the acquired target color data, a distance between a lattice point in the 3DLUT and a target color in a color space is computed in accordance with, for example, the following formulae (11) and (12). The color space serving to compute the distance between a lattice point and a target color is not particularly limitative. For example, the color space may be a calorimetric space such as an L*a*b* space or an XYZ space, or a density space such as an RGB color space or a CMY color space.

The distance between two colors in such a color space may be defined as follows in, for example, the L*a*b* space and the RGB density space.

Distance in the L*a*b* Space

The distance between two points (L1, a1, b1) and (L2, a2, b2) in the color space is defined by the following formula (11) which is the same as a color difference formula.

$$\Delta E = \sqrt{\{(L1-L2)^2 + (a1-a2)^2 + (b1-b2)^2\}} \quad (11)$$

Distance in the RGB Density Space

Similarly, the distance between two points (Db1, Dg1, Dr1) and (Db2, Dg2, Dr2) in the color space is also defined by the following formula (12) in the case of the density.

$$\Delta D \sqrt{\{(Db1-Db2)^2+(Dg1-Dg2)^2+(Dr1-Dr2)^2\}} \quad (12)$$

The amount of conversion required for converting the target color into the desired color corresponding to an aim color is calculated in accordance with the thus computed distance. The corresponding lattice point data is corrected by the thus calculated amount of conversion to determine corrected lattice point data, thereby creating a corrected 3DLUT (M×M×M).

In a simple method involving calculating the amount of conversion, determining the corrected lattice point data and creating the corrected 3DLUT in accordance with the distance, density modification data for converting a density point of a certain target color on the color space into a desired color as an aim color is used as the center. The points in the surroundings thereof are operated so that the density modification data decreases in proportion to the distance from the center. For example, the density data is converted into L*a*b* values so that the above operation can be performed on the L*a*b* color space in such a manner that the distance from a data point is in correlation with the vision.

A method of modifying the color conversion table in the present invention is not limited to the above-described correction method of the 3DLUT. The color conversion table may also be modified by using a matrix conversion method or other color conversion methods. Moreover, the modification of color conversion may be achieved as a multi-step process for producing the same effect as that of a modification of the color conversion table itself.

Example 10

Next, one of the plurality of color conversion tables obtained by executing the image processing method of the embodiment of the third aspect of the present invention shown in FIG. 13 was used for color conversion from the transparent image on the color reversal film into the print image. The resultant image was such that the reproduction of red was a little saturated and the representation of contrast of brightness was poor.

After the combinations of current colors and target colors before correction shown in Table 3 were given, a color conversion table corrected by the correction method shown in FIG. 22 was created.

TABLE 3

| | Target | | | Current color before correction | | | Difference | | |
|---|---|---|---|---|---|---|---|---|---|
| | L*1 | a*1 | b*1 | L*2 | a*2 | b*2 | Chromatic difference | Lightness difference | ab difference |
| NO. 1 | 77.70 | 7.83 | 4.38 | 77.70 | 7.83 | 4.38 | 0.00 | 0.00 | 0.00 |
| NO. 2 | 35.67 | 69.45 | 54.82 | 35.67 | 69.45 | 54.82 | 0.00 | 0.00 | 0.00 |
| NO. 3 | 24.13 | 66.66 | 41.61 | 25.50 | 68.41 | 43.97 | 3.24 | 1.38 | 2.94 |
| NO. 4 | 17.94 | 59.55 | 30.92 | 23.30 | 66.21 | 40.18 | 12.60 | 5.36 | 11.41 |
| NO. 5 | 22.65 | 67.06 | 39.07 | 23.74 | 68.42 | 40.93 | 2.55 | 1.09 | 2.30 |
| NO. 6 | 26.27 | 69.71 | 42.88 | 26.30 | 69.75 | 42.95 | 0.08 | 0.03 | 0.08 |
| NO. 7 | 24.12 | 69.04 | 41.59 | 24.12 | 69.04 | 41.59 | 0.00 | 0.00 | 0.00 |
| NO. 8 | 19.63 | 62.50 | 33.86 | 22.45 | 65.99 | 38.71 | 6.60 | 2.81 | 5.97 |
| NO. 9 | 26.20 | 68.11 | 45.17 | 27.67 | 69.95 | 47.69 | 3.46 | 1.47 | 3.13 |
| NO. 10 | 9.99 | 48.30 | 17.22 | 15.81 | 55.70 | 27.26 | 13.77 | 5.82 | 12.48 |
| NO. 11 | 7.48 | 44.46 | 12.91 | 12.12 | 50.70 | 20.90 | 11.15 | 4.64 | 10.14 |
| NO. 12 | 24.66 | 67.96 | 42.50 | 24.66 | 67.96 | 42.51 | 0.01 | 0.00 | 0.01 |
| NO. 13 | 33.04 | 73.54 | 3.25 | 33.12 | 73.51 | 3.40 | 0.18 | 0.08 | 0.16 |
| NO. 14 | 75.83 | −8.65 | 94.02 | 75.83 | −8.65 | 94.01 | 0.00 | 0.00 | 0.00 |
| NO. 15 | 39.53 | 63.88 | 67.94 | 39.54 | 63.88 | 67.96 | 0.02 | 0.01 | 0.02 |
| NO. 16 | 31.47 | 70.82 | 54.26 | 31.49 | 70.83 | 54.28 | 0.03 | 0.02 | 0.03 |
| NO. 17 | 29.39 | 4.13 | −71.63 | 29.39 | 4.13 | −71.63 | 0.00 | 0.00 | 0.00 |
| NO. 18 | 35.25 | −63.73 | 42.35 | 35.25 | −63.73 | 42.35 | 0.00 | 0.00 | 0.00 |
| | | | | | | Average | 2.98 | 1.26 | 2.70 |

Table 3 shows that color data No. 2 to No. 12 represent red and a difference between the target colors and the current colors (a chromatic difference, a lightness difference, and an ab difference) is large. Therefore, a modification is desired. However, the remaining data must remain unchanged.

The thus obtained corrected color conversion table was created at the following accuracy for the target colors as shown in Table 4.

TABLE 4

| | Target | | | Output color after correction | | | Difference | | |
|---|---|---|---|---|---|---|---|---|---|
| | L*1 | a*1 | b*1 | L*2 | a*2 | b*2 | Chromatic difference | Lightness difference | ab difference |
| NO. 1 | 77.70 | 7.83 | 4.38 | 77.70 | 7.84 | 4.38 | 0.01 | 0.00 | 0.01 |
| NO. 2 | 35.67 | 69.45 | 54.82 | 35.17 | 68.93 | 54.04 | 1.06 | 0.49 | 0.94 |
| NO. 3 | 24.13 | 66.66 | 41.61 | 24.59 | 67.21 | 42.30 | 1.00 | 0.46 | 0.89 |

TABLE 4-continued

|  | Target | | | Output color after correction | | | Difference | | |
| --- | --- | --- | --- | --- | --- | --- | --- | --- | --- |
|  | L*1 | a*1 | b*1 | L*2 | a*2 | b*2 | Chromatic difference | Lightness difference | ab difference |
| NO. 4 | 17.94 | 59.55 | 30.92 | 19.47 | 61.50 | 33.62 | 3.66 | 1.53 | 3.33 |
| NO. 5 | 22.65 | 67.06 | 39.07 | 22.15 | 66.61 | 38.32 | 1.01 | 0.50 | 0.87 |
| NO. 6 | 26.27 | 69.71 | 42.88 | 25.81 | 69.39 | 42.28 | 0.82 | 0.47 | 0.68 |
| NO. 7 | 24.12 | 69.04 | 41.59 | 23.28 | 68.08 | 40.20 | 1.89 | 0.84 | 1.69 |
| NO. 8 | 19.63 | 62.50 | 33.86 | 19.19 | 61.92 | 33.07 | 1.08 | 0.44 | 0.98 |
| NO. 9 | 26.20 | 68.11 | 45.17 | 26.73 | 68.88 | 46.11 | 1.34 | 0.54 | 1.22 |
| NO. 10 | 9.99 | 48.30 | 17.22 | 10.64 | 48.70 | 17.93 | 1.05 | 0.66 | 0.82 |
| NO. 11 | 7.48 | 44.46 | 12.91 | 7.83 | 44.96 | 13.51 | 0.86 | 0.35 | 0.70 |
| NO. 12 | 24.66 | 67.96 | 42.50 | 22.81 | 65.61 | 39.28 | 4.40 | 1.84 | 3.99 |
| NO. 13 | 33.04 | 73.54 | 3.25 | 33.13 | 73.44 | 3.39 | 0.20 | 0.09 | 0.18 |
| NO. 14 | 75.83 | −8.65 | 94.02 | 75.85 | −8.63 | 94.05 | 0.04 | 0.02 | 0.04 |
| NO. 15 | 39.53 | 63.88 | 67.94 | 39.57 | 63.56 | 67.50 | 0.55 | 0.04 | 0.55 |
| NO. 16 | 31.47 | 70.82 | 54.26 | 31.05 | 70.09 | 53.31 | 1.27 | 0.42 | 1.20 |
| NO. 17 | 29.39 | 4.13 | −71.63 | 29.39 | 4.13 | −71.66 | 0.03 | 0.00 | 0.03 |
| NO. 18 | 35.25 | −63.73 | 42.35 | 35.24 | −63.73 | 42.34 | 0.01 | 0.00 | 0.01 |
|  |  |  |  |  |  | Average | 1.13 | 0.48 | 1.01 |

Table 4 shows the following. In the red range from the color data No. 2 to No. 12, a difference (a chromatic difference, a lightness difference, or an ab difference) between the target color and the output color after correction is reduced. As a result, the output color after correction is greatly improved to become closer to the target color, while a difference (a chromatic difference, a lightness difference, or an ab difference) between the target color and the output color after correction is kept small in the remaining color data which is not desired to be changed, and therefore is scarcely changed.

An image created by using the thus corrected color conversion table (profile) was rich in contrast within the target red range (the color data No. 2 to No. 12 in Table 4) as compared with the image before correction, and therefore a further preferred image was obtained.

The image processing method of the first mode in each of the first to fifth aspects of the present invention described above can be executed by computer control. The technical scope of the present invention encompasses a program for such computer control, and a computer readable recording medium on which the program is recorded. Specifically, the image processing program of the fourth mode in each of the first to fifth aspects of the present invention is a program for computer control, for executing the image processing method of the first mode of each of the first to fifth aspects of the present invention described above. The recording medium of the fifth mode of each of the first to fifth aspects of the present invention is a recording medium on which the image processing program of the fourth mode of each of the first to fifth aspects of the present invention is recorded so as to be readable by a computer.

The image processing method and device, the image forming device using such image processing method and device, the image processing program for executing the image processing method, and the recording medium on which the image processing program is recorded according to the present invention have been described in detail with various embodiments and examples. However, the present invention is not limited to the above-described embodiments and examples. It is apparent that various modifications and changes are possible without departing from the scope of the present invention.

For example, in each of the first and second aspects of the present invention, the illuminance of a light source illuminating a subject can be estimated from a calorimetric value which is normally obtained when the subject is photographed. Moreover, the chromaticity of a light source illuminating a subject may be estimated from a white point in the image or the average chromaticity. Moreover, if an object with a known reflectance is present in the image, the acquisition of the chromaticity of a light source is ensured.

The example where a color negative film or a digital camera is used to obtain the colorimetric values of a subject has been given above. However, it is undeniable that the acquired calorimetric values contain a certain degree of error because the spectral sensitivity characteristic of the color negative film or the digital camera is not ideal (does not match with that of the human eyes). To cope with such a problem, it is preferred to use an image acquisition device with a high q coefficient (calorimetric quality coefficient). The use of a multiband camera provides better results.

For example, the illuminance of a light source for viewing a transparent image on a reversal film in each of the third to fifth aspects of the present invention can be estimated from performance data of a viewer or a projector with which the transparent image on the reversal film is viewed.

Moreover, the transparent image is not limited to a transparent image on a reversal film. Any transparent image or softcopy image can be used as long as the viewing illuminating conditions for viewing the transparent image can be acquired.

For example, in the present invention, a subject image to be reproduced may be a transparent image (softcopy image) displayed on a monitor or the like, while a reproduced image whose appearance is to match with that of the transparent image may be a print image (hardcopy image). Specifically, the transparent image is not limited to a transparent image on a reversal film. Any transparent image or softcopy image can be used as long as the viewing illuminating conditions for viewing the transparent image can be acquired.

In addition, the illuminance of a light source for viewing a transparent image on the reversal film can be estimated from performance data of a viewer or a projector with which the transparent image on the reversal film is viewed.

In each of the first to fifth aspects of the present invention, the flare rate in the viewing environment described above is generally indicated by a ratio of light directly reflected on the surface of a monitor or a print. This value greatly depends on the conditions of the surroundings of the environment where a print is viewed. If the environment is surrounded by white walls, the flare rate becomes high. The flare rate of a print under the environment which is surrounded by gray walls with direct illumination from above is about 2%. If the flare rate in the viewing environment cannot be estimated in advance, it is preferred to use this value.

The flare correction expressed by the above formulae (2) and (3) can be included as so-called posterization. Normally, in order to realize it, a plurality of 1DLUTs in correlation with flare rates are prepared.

What is claimed is:

1. An image processing method, comprising:
   photographing a subject under viewing environment of the subject to acquire image data of a subject image that is thus photographed;
   performing colorimetric conversion on the acquired image data to acquire first colorimetric values of said subject image; as well as
   acquiring first chromaticity information and first illuminance information of a first light source illuminating said subject as subject illuminating conditions characterizing the viewing environment of the subject, and second chromaticity information and second illuminance information of a second light source illuminating a reproduced subject image as reproduced subject image viewing conditions characterizing viewing environment of the reproduced subject image as one of a hardcopy image and a softcopy image;
   performing on said colorimetric values of the subject image chromatic adaptation correction based on said first and second chromaticity information and said first and second illuminance information of the first and second light sources that are acquired,
   and contrast correction based on said first and second illuminance information of the first and second light sources to acquire second colorimetric values of said subject image; and
   correcting an amount of flare in outputting the reproduced subject image for said second colorimetric values of the subject image in accordance with the viewing environment of the reproduced subject image to obtain as tristimulus values corrected third colorimetric values of the reproduced subject image to be output as the hardcopy image and the softcopy image.

2. The image processing method according to claim 1, wherein said chromaticity information and said illuminance information of the light source are acquired by actual measurement with a measuring device.

3. The image processing method according to claim 1, wherein said illuminance information of the light source is acquired by estimation from a photometric value obtained in photographing said subject.

4. The image processing method according to claim 1, wherein said chromaticity information of the light source is acquired by estimation from one of a white point and an average chromaticity in said subject.

5. The image processing method according to claim 1, wherein said chromaticity information of the light source is acquired by acquiring a chromaticity of an object having a known reflectance in said subject.

6. The image processing method according to claim 1, wherein a flare rate in viewing one of said hardcopy image and said softcopy image is acquired in advance to correct said amount of flare by using said acquired flare rate in accordance with a viewing environment.

7. An image processing method, comprising:
   photographing a subject under viewing environment of the subject to acquire image data of a subject image that is thus photographed;
   performing colorimetric conversion on the acquired image data to acquire first colorimetric values of said subject image;
   acquiring first chromaticity information and first illuminance information of a first light source illuminating said subject as subject illuminating conditions characterizing the viewing environment of the subject, and second chromaticity information and second illuminance information of a second light source illuminating a reproduced subject image as reproduced subject image viewing conditions characterizing viewing environment of the reproduced subject image as one of a hardcopy image and a softcopy image;
   performing at least one of contrast conversion and chroma conversion on said first colorimetric values of the subject image based on a chromaticity value in a case where a degree of adaptation is set higher than that obtained from said first chromaticity information and said first illuminance information of the first light source that are acquired to obtain converted colorimetric values of said subject image;
   performing on said converted colorimetric values of the subject image chromatic adaptation correction based on said first and second chromaticity information and said first and second illuminance information of the first and second light sources, and contrast correction based on said first and second illuminance information of the first and second light sources to acquire second colorimetric values of said subject image; and
   correcting an amount of flare in outputting the reproduced subject image for said converted second colorimetric values of the subject image in accordance with the viewing environment of the reproduced subject image to obtain as tristimulus values corrected third colorimetric values of the reproduced subject image to be output as the hardcopy image and the softcopy image.

8. The image processing method according to claim 7, wherein said contrast conversion comprises conversion equivalent to an illuminance of said subject virtually being within a range of 10,000 to 100,000 Lux.

9. The image processing method according to claim 7, wherein said chroma conversion is performed by providing an increase in colorfulness value equivalent to an increase in luminance of said subject obtained by multiplying an actual value by 5 to 150.

10. The image processing method according to claim 7, wherein said chroma conversion is performed by providing an increase in colorfulness value equivalent to an increase in luminance of said subject obtained by multiplying an actual value by 15 to 150.

11. The image processing method according to claim 7, wherein said chroma conversion is performed by providing an increase in colorfulness value equivalent to an increase in luminance of said subject obtained by multiplying an actual value by 5 to 20 in a case where said subject image comprises a portrait image and priority is given to skin color.

12. The image processing method according to claim 7, wherein said chromaticity value in the case where said degree of adaptation is set higher than that obtained from said chromaticity information and said illuminance information of the light source is a chromaticity value when it is assumed that perfect adaptation to said light source is achieved.

13. An image processing device, comprising:
imaging means for imaging a subject under viewing environment of the subject to acquire image data of a subject image;
colorimetric conversion means for performing colorimetric conversion on the acquired image data to acquire first colorimetric values of said subject image;
acquisition means for acquiring first chromaticity information and first illuminance information of a first light source illuminating said subject as subject illuminating conditions characterizing the viewing environment of the subject, and second chromaticity information and second illuminance information of a second light source illuminating a reproduced subject image as reproduced subject image viewing conditions characterizing viewing environment of the reproduced subject image as one of a hardcopy image and a softcopy image;
chromatic adaptation and contrast correction means for performing on said first colorimetric values of the subject image chromatic adaptation correction based on said first and second chromaticity information and said first and second illuminance information of the first and second light sources that are acquired, and contrast correction based on said first and second illuminance information of the first and second light sources to acquire second colorimetric values of said subject image; and
flare correction means for correcting an amount of flare in outputting the reproduced subject image for said second colorimetric values of the subject image in accordance with the viewing environment of the hardcopy and the softcopy image of the reproduced subject image to obtain as tristimulus values corrected third colorimetric values of the reproduced subject image to be output as the hardcopy image and the softcopy image.

14. The image processing device according to claim 13, wherein said acquisition means comprises a measuring device for actually measuring a chromaticity and an illuminance of said light source.

15. The image processing device according to claim 13, wherein said acquisition means acquires said illuminance information of the light source by estimation from a photometric value obtained in imaging said subject.

16. The image processing device according to claim 13, wherein said acquisition means acquires said chromaticity information of the light source by estimation from one of a white point and an average chromaticity in said subject.

17. The image processing device according to claim 13, wherein said acquisition means acquires a chromaticity of an object having a known reflectance in said subject to acquire said illuminance information of the light source.

18. The image processing device according to claim 13, further comprising flare rate acquisition means for acquiring in advance a flare rate in viewing one of said hardcopy image and said softcopy image,
wherein said flare correction means corrects said amount of flare by using said acquired flare rate in accordance with a viewing environment.

19. An image processing device, comprising:
imaging means for imaging a subject under viewing environment of the subject to acquire image data of a subject image;
colorimetric conversion means for performing colorimetric conversion on the acquired image data to acquire first colorimetric values of said subject image;
acquisition means for acquiring first chromaticity information and first illuminance information of a first light source illuminating said subject as subject illuminating conditions characterizing the viewing environment of the subject, and second chromaticity information and second illuminance information of a second light source illuminating a reproduced subject image as reproduced subject image viewing conditions characterizing viewing environment of the reproduced subject image as one of a hardcopy image and a softcopy image;
conversion means for performing at least one of contrast conversion and chroma conversion on said first colorimetric values of the subject image based on a chromaticity value in a case where a degree of adaptation is set higher than that obtained from said first chromaticity information and said first illuminance information of the first light source that are acquired to obtain converted colorimetric values of said subject image;
chromatic adaptation and contrast correction means for performing chromatic adaptation correction on said converted colorimetric values of the subject image based on said first and second chromaticity information and said first and second illuminance information of the first and second light sources that are acquired, and contrast correction based on said first and second illuminance information of the first and second light sources to acquire second colorimetric values of said subject image; and
flare correction means for correcting an amount of flare in outputting a reproduced subject image for said second colorimetric values of the subject image in accordance with the viewing environment of the hardcopy image and the softcopy image of said reproduced subject image to obtain as tristimulus values corrected third colorimetric values of the reproduced subject image to be output as the hardcopy image and the softcopy image.

20. The image processing device according to claim 19, wherein said conversion means performs conversion equivalent to an illuminance of said subject virtually
being within a range of 10,000 to 100,000 Lux as said contrast conversion.

21. The image processing device according to claim 19, wherein said conversion means performs said chroma conversion to provide an increase in colorfulness value equivalent to an increase in luminance of said subject obtained by multiplying an actual value by 5 to 150.

22. The image processing device according to claim 19, wherein said conversion means performs said chroma conversion to provide an increase in colorfulness value equivalent to an increase in luminance of said subject obtained by multiplying an actual value by 15 to 150.

23. The image processing device according to claim 19, wherein said conversion means performs said chroma conversion to provide an increase in colorfulness value equivalent to an increase in luminance of said subject obtained by multiplying an actual value by 5 to 20 in a case where said subject image comprises a portrait image and priority is given to skin color.

24. The image processing device according to claim 19, wherein said chromaticity value in the case where said degree of adaptation is set higher than that obtained from said chromaticity information and said illuminance information of the light source is a chromaticity value when it is assumed that perfect adaptation to said light source is achieved.

25. An image output device, comprising:
an image processing device; and
image output means for outputting one of a hardcopy image and a softcopy image based image data being subjected to correction processing in said image processing device, wherein said image processing device including:

imaging means for imaging a subject under viewing environment of the subject to acquire image data of a subject image;

colorimetric conversion means for performing colorimetric conversion on the acquired image data to acquire first colorimetric values of said subject image;

acquisition means for acquiring first chromaticity information and first illuminance information of a first light source illuminating said subject as subject illuminating conditions characterizing the viewing environment of the subject, and second chromaticity information and second illuminance information of a second light source illuminating a reproduced subject image as reproduced subject image viewing conditions characterizing viewing environment of the reproduced subject image as one of a hardcopy image and a softcopy image;

chromatic adaptation and contrast correction means for performing on said first colorimetric values of the subject image chromatic adaptation correction based on said first and second chromaticity information and said first and second illuminance information of the first and second light sources that are acquired, and contrast correction based on said first and second illuminance information of the first and second light sources to acquire second colorimetric values of said subject image; and flare correction means for correcting an amount of flare in outputting the reproduced subject image for said second colorimetric values of the subject image in accordance with the viewing environment of the hardcopy image and the softcopy image of the reproduced subject image to obtain as tristimulus values corrected third colorimetric values of the reproduced subject image to be output as the hardcopy image and the softcopy image.

26. An image output device, comprising:

an image processing device; and image output means for outputting one of a hardcopy image and a softcopy image based image data being subjected to correction processing in said image processing device, wherein said image processing device including:

imaging means for imaging a subject under viewing environment of the subject to acquire image data of a subject image;

colorimetric conversion means for performing colorimetric conversion on the acquired image data to acquire first colorimetric values of said subject image;

acquisition means for acquiring first chromaticity information and first illuminance information of a first light source illuminating said subject as subject illuminating conditions characterizing the viewing environment of the subject, and second chromaticity information and second illuminance information of a second light source illuminating a reproduced subject image as reproduced subject image viewing conditions characterizing viewing environment of the reproduced subject image as one of a hardcopy image and a softcopy image;

conversion means for performing at least one of contrast conversion and chroma conversion on said first colorimetric values of the subject image based on a chromaticity value in a case where a degree of adaptation is set higher than that obtained from said first chromaticity information and said first illuminance information of the first light source that are acquired to obtain converted colorimetric values of said subject image;

chromatic adaptation and contrast correction means for performing chromatic adaptation correction on said converted colorimetric values of the subject image based on said first and second chromaticity information and said first and second illuminance information of the first and second light sources that are acquired, and contrast correction based on said first and second illuminance information of the first and second light sources to acquire second colorimetric values of said subject image; and flare correction means for correcting an amount of flare in outputting the reproduced subject image for said second colorimetric values of the subject image in accordance with the viewing environment of the hardcopy image and the softcopy image of said reproduced subject image to obtain as tristimulus values corrected third colorimetric values of the reproduced subject image to be output as the hardcopy image and the softcopy image.

27. A digital camera, comprising:

an image processing device; and image display means for displaying an image based on image data being subjected to correction processing in said image processing device, wherein said image processing device including:

imaging means for imaging a subject under viewing environment of the subject to acquire image data of a subject image;

colorimetric conversion means for performing colorimetric conversion on the acquired image data to acquire first colorimetric values of said subject image;

acquisition means for acquiring first chromaticity information and first illuminance information of a first light source illuminating said subject as subject illuminating conditions characterizing the viewing environment of the subject, and second chromaticity information and second illuminance information of a second light source illuminating a reproduced subject image as reproduced subject image viewing conditions characterizing viewing environment of the reproduced subject image as one of a hardcopy image and a softcopy image;

chromatic adaptation and contrast correction means for performing on said first colorimetric values of the subject image chromatic adaptation correction based on said first and second chromaticity information and said first and second illuminance information of the first and second light sources that are acquired, and contrast correction based on said first and second illuminance information of the first and second light sources to acquire second colorimetric values of said subject image; and flare correction means for correcting an amount of flare in outputting the reproduced subject image for said second colorimetric values of the subject image in accordance with the viewing environment of the hardcopy and the softcopy image of the reproduced subject image to obtain as tristimulus values corrected third colorimetric values of the reproduced subject image to be output as the hardcopy image and the softcopy image.

28. A digital camera, comprising:

an image processing device; and image display means for displaying an image based on image data being subjected to correction processing in said image processing device, wherein said image processing device including:

imaging means for imaging a subject under viewing environment of the subject to acquire image data of a subject image;

colorimetric conversion means for performing colorimetric conversion on the acquired image data to acquire first colorimetric values of said subject image;

acquisition means for acquiring first chromaticity information and first illuminance information of a first light source illuminating said subject as subject illuminating conditions characterizing the viewing environment of the subject, and second chromaticity information and second illuminance information of a second light source illuminating a reproduced subject image as reproduced subject image viewing conditions characterizing viewing environment of the reproduced subject image as one of a hardcopy image and a softcopy image;

conversion means for performing at least one of contrast conversion and chroma conversion on said first colorimetric values of the subject image based on a chromaticity value in a case where a degree of adaptation is set higher than that obtained from said first chromaticity information and said first illuminance information of the first light source that are acquired to obtain converted colorimetric values of said subject image;

chromatic adaptation and contrast correction means for performing chromatic adaptation correction on said converted colorimetric values of the subject image based on said first and second chromaticity information and said first and second illuminance information of the first and second light sources that are acquired, and contrast correction based on said first and second illuminance information of the first and second light sources to acquire second colorimetric values of said subject image; and flare correction means for correcting an amount of flare in outputting a reproduced subject image for said second colorimetric values of the subject image in accordance with the viewing environment of the hardcopy image and the softcopy image of said reproduced subject image to obtain as tristimulus values corrected third colorimetric values of the reproduced subject image to be output as the hardcopy image and the softcopy image.

29. A computer-readable medium having embodied thereon an image processing program for executing an image processing method by computer control, said image processing method comprising:

photographing a subject under viewing environment of the subject to acquire image data of a subject image that is thus photographed;

performing colorimetric conversion on the acquired image data to acquire first colorimetric values of said subject image; as well as acquiring first chromaticity information and first illuminance information of a first light source illuminating said subject as subject illuminating conditions characterizing the viewing environment of the subject, and second chromaticity information and second illuminance information of a second light source illuminating a reproduced subject image as reproduced subject image viewing conditions characterizing viewing environment of the reproduced subject image as one of a hardcopy image and a softcopy image;

performing on said first colorimetric values of the subject image chromatic adaptation correction based on said first and second chromaticity information and said first and second illuminance information of the first and second light sources that are acquired, and contrast correction based on said first and second illuminance information of the first and second light sources to acquire second colorimetric values of said subject image; and correcting an amount of flare in outputting the reproduced subject image for said second colorimetric values of the subject image in accordance with the viewing environment of the reproduced subject image to obtain as tristimulus values corrected third colorimetric values of the reproduced subject image to be output as the hardcopy image and the softcopy image.

30. A computer-readable medium having embodied thereon an image processing program for executing an image processing method by computer control, said image processing method comprising:

photographing a subject under viewing environment of the subject to acquire image data of a subject image that is thus photographed;

performing colorimetric conversion on the acquired image data to acquire first colorimetric values of said subject image;

acquiring first chromaticity information and first illuminance information of a first light source illuminating said subject as subject illuminating conditions characterizing the viewing environment of the subject, and second chromaticity information and second illuminance information of a second light source illuminating a reproduced subject image as reproduced subject image viewing conditions characterizing viewing environment of the reproduced subject image as one of a hardcopy image and a softcopy image;

performing at least one of contrast conversion and chroma conversion on said first colorimetric values of the subject image based on a chromaticity value in a case where a degree of adaptation is set higher than that obtained from said first chromaticity information and said first illuminance information of the first light source that are acquired to obtain converted colorimetric values of said subject image;

performing on said converted colorimetric values of the subject image chromatic adaptation correction based on said first and second chromaticity information and said first and second illuminance information of the first and second light sources, and contrast correction based on said first and second illuminance information of the first and second light sources to acquire second colorimetric values of said subject image; and correcting an amount of flare in outputting the reproduced subject image for said second colorimetric values of the subject image in accordance with the viewing environment of the reproduced subject image to obtain as tristimulus values corrected third colorimetric values of the reproduced subject image to be output as the hardcopy image and the softcopy image.

31. A computer readable recording medium, on which an image processing program for executing an image processing method by computer control is recorded, said image processing method comprising:

photographing a subject under viewing environment of the subject to acquire image data of a subject image that is thus photographed;

performing colorimetric conversion on the acquired image data to acquire first colorimetric values of said subject image; as well as acquiring first chromaticity information and first illuminance information of a first light source illuminating said subject as subject illuminating conditions characterizing the viewing environment of the subject, and second chromaticity information and second illuminance information of a second light source illuminating a reproduced subject image as reproduced subject image viewing conditions characterizing viewing environment of the reproduced subject image as one of a hardcopy image and a softcopy image;

performing on said first colorimetric values of the subject image chromatic adaptation correction based on said first and second chromaticity information and said first and second illuminance information of the first and second light sources that are acquired, and contrast correction based on said first and second illuminance information of the first and second light sources to acquire second colorimetric values of said subject image; and correcting an amount of flare in outputting the reproduced subject image for said second colorimetric values of the subject image in accordance with the viewing environment of the reproduced subject image to obtain as tristimulus values corrected third colorimetric values of the reproduced subject image to be output as the hardcopy image and the softcopy image.

32. A computer readable recording medium, on which an image processing program for executing an image processing method by computer control is recorded, said image processing method comprising:

photographing a subject under viewing environment of the subject to acquire image data of a subject image that is thus photographed;

performing colorimetric conversion on the acquired image data to acquire first colorimetric values of said subject image;

acquiring first chromaticity information and first illuminance information of a first light source illuminating said subject as subject illuminating conditions characterizing the viewing environment of the subject, and second chromaticity information and second illuminance information of a second light source illuminating a reproduced subject image as reproduced subject image viewing conditions characterizing viewing environment of the reproduced subject image as one of a hardcopy image and a softcopy image;

performing at least one of contrast conversion and chroma conversion on said first colorimetric values of the subject image based on a chromaticity value in a case where a degree of adaptation is set higher than that obtained from said first chromaticity information and said first illuminance information of the first light source that are acquired to obtain converted colorimetric values of said subject image;

performing on said converted colorimetric values of the subject image chromatic adaptation correction based on said first and second chromaticity information and said first and second illuminance information of the first and second light sources, and contrast correction based on said first and second illuminance information of the first and second light sources to acquire second colorimetric values of said subject image; and correcting an amount of flare in outputting the reproduced subject image for said second colorimetric values of the subject image in accordance with the viewing environment of the reproduced subject image to obtain as tristimulus values corrected third colorimetric values of the reproduced subject image to be output as the hardcopy image and the softcopy image.

33. An image processing method, comprising:

acquiring digital data of a transparent image on a color reversal film to calculate first colorimetric values of said transparent image from said digital data;

acquiring first chromaticity information and first illuminance information of a first light source illuminating said transparent image to be viewed on said color reversal film as transparent image illuminating conditions characterizing the viewing environment of the transparent image, and second chromaticity information and second illuminance information of a second light source illuminating a reproduced transparent image as reproduced transparent image viewing conditions characterizing viewing environment of the reproduced transparent image to be viewed as a photographic print image;

performing at least one of contrast conversion and chroma conversion on said first colorimetric values of the transparent image based on a chromaticity value in a case where an adaptation luminance is set higher than that obtained from said first chromaticity information and said first illuminance information of the first light source that are acquired to obtain converted colorimetric values of the transparent image to be viewed;

performing on said converted colorimetric values of the transparent image to be viewed chromatic adaptation correction based on said first and second chromaticity information and said first and second illuminance information of the first and second light sources, and contrast correction based on said first and second illuminance information of the first and second light sources to acquire second colorimetric values of said transparent image; and correcting an amount of flare in outputting the reproduced transparent image for said second colorimetric values of the transparent image in accordance with the viewing environment of the reproduced transparent image to be viewed as the photographic print image to obtain as tristimulus values corrected third colorimetric values to be output as the photographic print image.

34. The image processing method according to claim 33, wherein said contrast conversion performs conversion equivalent to a viewing illuminance of said transparent image on said color reversal film being virtually within a range of 30,000 to 300,000 Lux.

35. The image processing method according to claim 33, wherein in said chroma conversion, an increase rate of chroma is within •a range of 1.0 to 1.2 times and a viewing illuminance of said transparent image on said color reversal film is within a range of 30,000 to 300,000 Lux.

36. The image processing method according to claim 33, wherein in said chroma conversion, an increase rate of chroma is within a range of 1.0 to 1.05 times and a viewing illuminance of said transparent image on said color reversal film is within a range of 50,000 to 200,000 Lux as optimal values.

37. The image processing method according to claim 33, wherein said chromaticity value in the case where said adaptation luminance is set higher than that obtained from said chromaticity information and said illuminance information of the light source is a chromaticity value when it is assumed that perfect adaptation to said light source is achieved.

38. The image processing method according to claim 33, wherein an enhancement parameter set in at least one of said contrast conversion and said chroma conversion comprises at least one of a luminance ratio, a chroma, a contrast, and a colorfulness.

39. The image processing method according to claim 33, wherein said colorimetric values comprise tristimulus values.

40. The image processing method according to claim 33, wherein at least one of said contrast conversion and said chroma conversion, said chromatic adaptation correction, said contrast correction, and said correction of said amount of flare are made as a three-dimensional color conversion table for converting the colorimetric values of the transparent image into said colorimetric values to be output from said colorimetric values of the transparent image.

41. The image processing method according to claim 40, wherein color conversion for modifying a part of said three-dimensional color conversion table is added to said three-dimensional color conversion table.

42. The image processing method according to claim 41, wherein said three-dimensional color conversion table comprises a three-dimensional lookup table for color conversion, and
said color conversion for modifying the part of said three-dimensional color conversion table is added to said three-dimensional color conversion table by obtaining a distance from an aim color in color correction to a lattice point in said three-dimensional lookup table in a color space, obtaining an amount of conversion of said lattice point necessary for converting said aim color into a
desired target color in accordance with said obtained distance to correct said three-dimensional lookup table.

43. An image processing device, comprising:
imaging means for photoelectrically reading a transparent image on a color reversal film to acquire digital data of said transparent image to calculate first colorimetric values of said transparent image from the thus acquired digital data;
acquisition means for acquiring first chromaticity information and first illuminance information of a first light source illuminating said transparent image to be viewed on said color reversal film as transparent image illuminating conditions characterizing viewing environment of the transparent image, and second chromaticity information and second illuminance information of a second light source illuminating a reproduced transparent image as reproduced transparent image viewing conditions characterizing viewing environment of the reproduced transparent image to be viewed as a photographic print image;
conversion means for performing at least one of contrast conversion and chroma conversion on said first colorimetric values of the transparent image to be viewed based on a chromaticity value in a case where an adaptation luminance is set higher than that obtained from said first chromaticity information and said first illuminance information of the first light source that are acquired to obtain converted colorimetric values of the transparent image to be viewed;
chromatic adaptation and contrast correction means for performing on said converted colorimetric values of the transparent image to be viewed chromatic adaptation correction based on said first and second chromaticity information and said first and second illuminance information of the first and second light sources that are acquired, and contrast correction based on said first and second illuminance information of the first and second light sources to acquire second colorimetric values of said transparent image; and
flare correction means for correcting an amount of flare in outputting the reproduced transparent image for said second colorimetric values of the transparent image to be viewed in accordance with the viewing environment of the photographic print image of said reproduced transparent image to be viewed to obtain as tristimulus values corrected third colorimetric values to be output as the photographic print image.

44. The image processing device according to claim 43, wherein said conversion means performs conversion equivalent to a viewing illuminance of said transparent image on said color reversal film being virtually within a range of 30,000 to 300,000 Lux as said contrast conversion.

45. The image processing device according to claim 43, wherein said conversion means performs conversion with an increase rate of chroma being within a range of 1.0 to 1.2 times and a viewing illuminance of said transparent image on said color reversal film being within a range of 30,000 to 300,000 Lux as said chroma conversion.

46. The image processing device according to claim 43, wherein said conversion means performs conversion with an increase rate of chroma being within a range of 1.0 to 1.05 times and a viewing illuminance of said transparent image on said color reversal film being within a range of 50,000 to 200,000 Lux as optimal values of said chroma conversion.

47. The image processing device according to claim 43, wherein said chromaticity value in the case where said adaptation luminance is set higher than that obtained from said chromaticity information and said illuminance information of the light source is a chromaticity value when it is assumed that perfect adaptation to said light source is achieved.

48. The image processing device according to claim 43, wherein an enhancement parameter set in at least one of said contrast conversion and said chroma conversion comprises at least one of a luminance ratio, a chroma, a contrast, and a colorfulness.

49. The image processing device according to claim 43, wherein said colorimetric values comprise tristimulus values.

50. An image forming device comprising:
an image processing device; and
image output means for outputting a photographic print image based on output image data being subjected to correction processing in said image processing device,
wherein said image processing device includes:
imaging means for photoelectrically reading a transparent image on a color reversal film to acquire digital data of said transparent image to calculate first colorimetric values of said transparent image from the thus acquired digital data;
acquisition means for acquiring first chromaticity information and first illuminance information of a first light source illuminating said transparent image to be viewed on said color reversal film as transparent image illuminating conditions characterizing viewing environment of the transparent image, and second chromaticity information and second illuminance information of a second light source illuminating a reproduced transparent image as reproduced transparent image viewing conditions characterizing viewing environment of the reproduced transparent image to be viewed as a photographic print image;
conversion means for performing at least one of contrast conversion and cliroma conversion on said first colorimetric values of the transparent image to be viewed based on a chromaticity value in a case where an adaptation luminance is set higher than that obtained from said first chromaticity information and said first illuminance information of the first light source that are acquired to obtain converted colorimetric values of the transparent image to be viewed;
chromatic adaptation correction and contrast means for performing on said converted colorimetric values of the transparent image to be viewed chromatic adaptation correction based on said first and second chromaticity information and said first and second illuminance information of the first and second light sources that are acquired, and contrast correction based on said first and second illuminance information of the first and second light sources to acquire second colorimetric values of said transparent image; and flare correction means for correcting an amount of flare in outputting the reproduced transparent image for said second colorimetric values of the transparent image to be viewed in accordance with the viewing environment of the photographic print image of said reproduced transparent image to be viewed to obtain as tristimulus values corrected third colorimetric values to be output as the photographic print image.

51. A computer-readable medium having embodied thereon an image processing program for executing an image processing method by computer control, said image processing method comprising:

acquiring digital data of a transparent image on a color reversal film to calculate first colorimetric values of said transparent image from said digital data;

acquiring first chromaticity information and first illuminance information of a first light source illuminating said transparent image to be viewed on said color reversal film as transparent image illuminating conditions characterizing the viewing environment of the transparent image, and second chromaticity information and second illuminance information of a second light source illuminating a reproduced transparent image as reproduced transparent image viewing conditions characterizing viewing environment of the reproduced transparent image to be viewed as a photographic print image;

performing at least one of contrast conversion and chroma conversion on said first colorimetric values of the transparent image based on a chromaticity value in a case where an adaptation luminance is set higher than that obtained from said first chromaticity information and said first illuminance information of the first light source that are acquired to obtain converted colorimetric values of the transparent image to be viewed;

performing on said converted colorimetric values of the transparent image to be viewed chromatic adaptation correction based on said first and second chromaticity information and said first and second illuminance information of the first and second light sources, and contrast correction based on said first and second illuminance information of the first and second light sources to acquire second colorimetric values of said transparent image; and correcting an amount of flare in outputting the reproduced transparent image for said second colorimetric values of the transparent image in accordance with the viewing environment of the reproduced transparent image to be viewed as the photographic print image to obtain as tristimulus values corrected third colorimetric values to be output as the photographic print image.

52. A computer readable recording medium, on which an image processing program for executing an image processing method by computer control is recorded, said image processing method comprising:

acquiring digital data of a transparent image on a color reversal film to calculate first colorimetric values of said transparent image from said digital data;

acquiring first chromaticity information and first illuminance information of a first light source illuminating said transparent image to be viewed on said color reversal film as transparent image illuminating conditions characterizing the viewing environment of the transparent image, and second chromaticity information and second illuminance information of a second light source illuminating a reproduced transparent image as reproduced transparent image viewing conditions characterizing viewing environment of the reproduced transparent image to be viewed as a photographic print image;

performing at least one of contrast conversion and chroma conversion on said first colorimetric values of the transparent image based on a chromaticity value in a case where an adaptation luminance is set higher than that obtained from said first chromaticity information and said first illuminance information of the first light source that are acquired to obtain converted colorimetric values of the transparent image to be viewed;

performing on said converted colorimetric values of the transparent image to be viewed chromatic adaptation correction based on said first and second chromaticity information and said first and second illuminance information of the first and second light sources, and contrast correction based on said first and second illuminance information of the first and second light sources to acquire second colorimetric values of said transparent image; and correcting an amount of flare in outputting the reproduced transparent image for said second colorimetric values of the transparent image in accordance with the viewing environment of the reproduced transparent image to be viewed as the photographic print image to obtain as tristimulus values corrected third colorimetric values to be output as the photographic print image.

53. An image processing method, comprising:

acquiring first digital image data of a subject image;

acquiring first chromaticity information and first illuminance information of a first illuminating light source illuminating one of said subject image and a subject thereof as subject image illuminating conditions characterizing viewing environment of the subject image;

acquiring second chromaticity information and second illuminance information of a second illuminating light source illuminating a reproduced image of said subject image as reproduced image viewing conditions characterizing viewing environment in viewing the reproduced image of said subject image; and performing on said first digital image data appearance conversion processing for obtaining a match between an appearance of said reproduced image on which said subject image is reproduced and an appearance of said subject image by using said first and second chromaticity information and said first and second illuminance information of the first and second illuminating light sources, wherein said appearance conversion processing includes:

at least one of contrast conversion and chroma conversion performed on first colorimetric values of said subject image obtained by colorimetric conversion from said first digital image data based on a chromaticity value in a case where an adaptation luminance is set higher than that obtained from said first chromaticity information and said first illuminance information of the first illuminating light source to obtain converted colorimetric values of said subject image;

chromatic adaptation correction performed on said converted colorimetric values of the subject image based on said first and second chromaticity information and said first and second illuminance information of the first and second illuminating light sources, and contrast correction performed on said converted colorimetric values of the subject image based on said first and second illuminance information of the first and second illuminating light sources, thereby acquiring second colorimetric values of said subject image; and flare correction for correcting an amount of flare in outputting a reproduced subject image for said second colorimetric values of the subject image in accordance with the viewing environment of the reproduced subject image as said reproduced image to obtain as tristimulus values corrected third colorimetric values of said reproduced subject image to be output, at least one processing of said contrast conversion, said chroma conversion, said chromatic adaptation correction, said contrast correction and said flare correction includes a plurality of conversion processes with different conversion intensities for a single kind of conversion process, a single conversion process is selected from said plurality of conversion processes in accordance with said first digital image data of the subject image, and said appearance conversion processing is performed by performing said at least one processing using the thus selected single conversion process and second digital image data of said reproduced image is obtained from said third colorimetric values of the reproduced image to be output.

54. The image processing method according to claim 53, wherein sad conversion process is performed using one or more color conversion tables.

55. The image processing method according to claim 53, wherein all processing in said appearance conversion processing is performed as single conversion processing, one kind of color conversion table is set as said single kind of conversion process for said single conversion processing, and a plurality of color conversion tables with the different enhancement parameters are set for said one kind of color conversion table as said plurality of conversion processes with the different conversion intensities for said single kind of conversion process.

56. The image processing method according to claim 55, wherein said enhancement parameters comprise a luminance ratio to a luminance under said first illuminating light source and a chroma.

57. The image processing method according to claim 53, wherein
said subject image is obtained by photographing said subject,
said first digital image data comprises one of image data photoelectrically read from a color negative film on which said subject is photographed and image data photoelectrically directly acquired by photographing said subject, and
said first illuminating light source comprises a light source for illuminating said subject in photographing said subject.

58. The image processing method according to claim 53, wherein
said subject image comprises a transparent image to be viewed,
said first digital image data comprises image data of said transparent image, and
said first illuminating light source comprises a light source for illuminating said transparent image when said transparent image is viewed.

59. The image processing method according to claim 58, wherein
said transparent image comprises a transparent image to be viewed on a color reversal film, and
said image data of said transparent image comprises image data photoelectrically read from said color reversal film.

60. The image processing method according to claim 53, wherein
said reproduced image comprises a reflection image to be viewed, on which said subject image is reproduced,
said second digital image data comprises image data for outputting said reflection image, and
said second illuminating light source comprises a light source for illuminating said reflection image when said reflection image is viewed.

61. The image processing method according to claim 60, wherein said reflection image comprises a photographic print image.

62. The image processing method according to claim 53, wherein said plurality of conversion processes are set by an image characteristic amount of said subject image.

63. The image processing method according to claim 53, wherein said single conversion process is selected from said plurality of conversion processes based on an image characteristic amount of said subject image obtained from said first digital image data of said subject image.

64. The image processing method according to claim 62, wherein said image characteristic amount of said subject image is obtained based on at least one attribute value including a lightness and a chroma of said subject image.

65. The image processing method according to claim 53, wherein said chromaticity value in the case where said adaptation luminance is set higher than that obtained from said chromaticity information and said illuminance information of the first illuminating light source comprises a chromaticity value when it is assumed that perfect adaptation to said light source is achieved.

66. The image processing method according to claim 53, wherein said colorimetric values comprise tristimulus values.

67. An image processing device, comprising:
first acquisition means for acquiring first digital image data of a subject image;
second acquisition means for acquiring first chromaticity information and first illuminance information of a first illuminating light source illuminating one of said subject image and a subject thereof as subject image illuminating conditions characterizing viewing environment of the subject image;
third acquisition means for acquiring second chromaticity information and second illuminance information of a second illuminating light source illuminating a reproduced image of said subject image as reproduced image viewing conditions characterizing viewing environment for viewing the reproduced image; and
appearance conversion processing means for performing on the first digital image data appearance conversion processing for obtaining a match between an appearance of said reproduced image on which said subject image is reproduced and an appearance of said subject image by using said first and second chromaticity information and said first and second illuminance information of the first and second illuminating light sources,
wherein said appearance conversion processing means performs as the appearance conversion processing
at least one of contrast conversion and chroma conversion performed on colorimetric values of said subject image obtained by colorimetric conversion from said first digital image data based on a chromaticity value in a case where an adaptation luminance is set higher than that obtained from said first chromaticity information and said first illuminance information of the first illuminating light source to obtain converted colorimetric values of said subject image, chromatic adaptation correction performed on said converted colorimetric values of the subject image based on said first and second chromaticity information and said first and second illuminance information of the first and second illuminating light sources, and contrast correction performed on said converted colorimetric values of the subject image based on said first and second illuminance information of the first and second illuminating light sources, thereby acquiring second colorimetric values of said subject image and flare correction for correcting an amount of flare in outputting a reproduced subject image for said second colorimetric values of the subject image in accordance with the viewing environment of the reproduced subject image as said reproduced image to obtain as tristimulus values corrected third colorimetric values of said reproduced subject image to be output, wherein said appearance conversion processing means includes:

storage means for storing a plurality of color conversion tables with different conversion intensities for one kind of color conversion table for performing at least one processing of said contrast conversion, said chroma conversion, said chromatic adaptation correction, said contrast correction and said flare correction; and selection means for selecting one color conversion table from said plurality of color conversion tables in accordance with said first digital image data of the subject image, and wherein said appearance conversion processing is performed by performing said at least one processing using said selected one color conversion table and second digital image data of the reproduced image is obtained from said third colorimetric values of the reproduced image to be output.

68. The image processing device according to claim 67, wherein said appearance conversion processing means performs all processing of said appearance conversion processing as single conversion processing, said one kind of color conversion table is set for said single conversion processing, and a plurality of color conversion tables with different enhancement parameters are set as said plurality of color conversion tables with said different conversion intensities for said one kind of color conversion table.

69. The image processing device according to claim 68, wherein said enhancement parameters comprise a luminance ratio to a luminance under said first illuminating light source and a chroma.

70. The image processing device according to claim 67, wherein said plurality of color conversion tables are set by an image characteristic amount of said subject image.

71. The image processing device according to claim 67, wherein said selection means selects said one color conversion table from said plurality of color conversion tables based on an image characteristic amount of said subject image obtained from said first digital image data of the subject image.

72. The image processing device according to claim 70, wherein said image characteristic amount of the subject image is obtained based on at least one attribute value including a lightness and a chroma of said subject image.

73. An image forming device comprising:
an image processing device; and
image output means for outputting a photographic print image based on second digital image data of a reproduced image being subjected to appearance conversion processing in said image processing device, wherein said image processing means includes:

first acquisition means for acquiring first digital image data of a subject image;

second acquisition means for acquiring first chromaticity information and first illuminance information of a first illuminating light source illuminating one of said subject image and a subject thereof as subject image illuminating conditions characterizing viewing environment of the subject image;

third acquisition means for acquiring second chromaticity information and second illuminance information of a second illuminating light source illuminating a reproduced image of said subject image as reproduced image viewing conditions characterizing viewing environment for viewing the reproduced image; and appearance conversion processing means for performing on the first digital image data appearance conversion processing for obtaining a match between an appearance of said reproduced image on which said subject image is reproduced and an appearance of said subject image by using said first and second chromaticity information and said first and second illuminance information of the first and second illuminating light sources, wherein said appearance conversion processing means performs as the appearance conversion processing at least one of contrast conversion and chroma conversion performed on colorimetric values of said subject image obtained by colorimetric conversion from said first digital image data based on a chromaticity value in a case where an adaptation luminance is set higher than that obtained from said first chromaticity information and said first illuminance information of the first illuminating light source to obtain converted colorimetric values of said subject image, chromatic adaptation correction performed on said converted colorimetric values of the subject image based on said first and second chromaticity information and said first and second illuminance information of the first and second illuminating light sources, and contrast correction performed on said converted colorimetric values of the subject image based on said first and second illuminance information of the first and second illuminating light sources, thereby acquiring second colorimetric values of said subject image and flare correction for correcting an amount of flare in outputting a reproduced subject image for said second colorimetric values of the subject image in accordance with the viewing environment of the reproduced subject image as said reproduced image to obtain as tristimulus values corrected third colorimetric values of said reproduced subject image to be output, wherein said appearance conversion processing means includes:

storage means for storing a plurality of color conversion tables with different conversion intensities for one kind of color conversion table for performing at least one processing of said contrast conversion, said chroma conversion, said chromatic adaptation correction, said contrast correction and said flare correction; and selection means for selecting one color conversion table from said plurality of color conversion tables in accordance with said first digital image data of the subject image, and wherein said appearance conversion processing is performed by performing said at least one processing using said selected one color conversion table and second digital image data of the reproduced image is obtained from said third colorimetric values of the reproduced image to be output.

74. A computer-readable medium having embodied thereon an image processing program for executing an image processing method by computer control, said image processing method comprising:

acquiring first digital image data of a subject image;

acquiring first chromaticity information and first illuminance information of a first illuminating light source illuminating one of said subject image and a subject thereof as subject image illuminating conditions characterizing viewing environment of the subject image;

acquiring second chromaticity information and second illuminance information of a second illuminating light source illuminating a reproduced image of said subject image as reproduced image viewing conditions characterizing viewing environment in viewing the reproduced image of said subject image; and performing on said first digital image data appearance conversion processing for obtaining a match between an appearance of said reproduced image on which said subject image is reproduced and an appearance of said subject image by using said first and second chromaticity information and said first and second illuminance information of the first and second illuminating light sources, wherein said appearance conversion processing includes:

at least one of contrast conversion and chroma conversion performed on first colorimetric values of said subject image obtained by colorimetric conversion from said first digital image data based on a chromaticity value in a case where an adaptation luminance is set higher than that obtained from said first chromaticity information and said first illuminance information of the first illuminating light source to obtain converted colorimetric values of said subject image;

chromatic adaptation correction performed on said converted colorimetric values of the subject image based on said first and second chromaticity information and said first and second illuminance information of the first and second illuminating light sources, and contrast correction performed on said converted colorimetric values of the subject image based on said first and second illuminance information of the first and second illuminating light sources, thereby acquiring second colorimetric values of said subject image; and flare correction for correcting an amount of flare in outputting a reproduced subject image for said second colorimetric values of the subject image in accordance with the viewing environment of the reproduced subject image as said reproduced image to obtain as tristimulus values corrected third colorimetric values of said reproduced subject image to be output, at least one processing of said contrast conversion, said chroma conversion, said chromatic adaptation correction, said contrast correction and said flare correction includes a plurality of conversion processes with different conversion intensities for a single kind of conversion process, a single conversion process is selected from said plurality of conversion processes in accordance with said first digital image data of the subject image, and said appearance conversion processing is performed by performing said at least one processing using the thus selected single conversion process and second digital image data of said reproduced image is obtained from said third colorimetric values of the reproduced image to be output.

75. A computer readable recording medium, on which an image processing program for executing an image processing method by computer control is recorded, said image processing method comprising:

acquiring first digital image data of a subject image;

acquiring first chromaticity information and first illuminance information of a first illuminating light source illuminating one of said subject image and a subject thereof as subject image illuminating conditions characterizing viewing environment of the subject image;

acquiring second chromaticity information and second illuminance information of a second illuminating light source illuminating a reproduced image of said subject image as reproduced image viewing conditions characterizing viewing environment in viewing the reproduced image of said subject image; and performing on said first digital image data appearance conversion processing for obtaining a match between an appearance of said reproduced image on which said subject image is reproduced and an appearance of said subject image by using said first and second chromaticity information and said first and second illuminance information of the first and second illuminating light sources, wherein said appearance conversion processing includes:

at least one of contrast conversion and chroma conversion performed on first colorimetric values of said subject image obtained by colorimetric conversion from said first digital image data based on a chromaticity value in a case where an adaptation luminance is set higher than that obtained from said first chromaticity information and said first illuminance information of the first illuminating light source to obtain converted colorimetric values of said subject image;

chromatic adaptation correction performed on said converted colorimetric values of the subject image based on said first and second chromaticity information and said first and second illuminance information of the first and second illuminating light sources, and contrast correction performed on said converted colorimetric values of the subject image based on said first and second illuminance information of the first and second illuminating light sources, thereby acquiring second colorimetric values of said subject image; and flare correction for correcting an amount of flare in outputting a reproduced subject image for said second colorimetric values of the subject image in accordance with the viewing environment of the reproduced subject image as said reproduced image to obtain as tristimulus values corrected third colorimetric values of said reproduced subject image to be output, at least one processing of said contrast conversion, said chroma conversion, said chromatic adaptation correction, said contrast correction and said flare correction includes a plurality of conversion processes with different conversion intensities for a single kind of conversion process, a single conversion process is selected from said plurality of conversion processes in accordance with said first digital image data of the subject image, and said appearance conversion processing is performed by performing said at least one processing using the thus selected single conversion process and second digital image data of said reproduced image is obtained from said third colorimetric values of the reproduced image to be output.

76. An image processing method, comprising:

acquiring first digital image data of a subject image;

acquiring first chromaticity information and first illuminance information of a first illuminating light source illuminating one of said subject image and a subject thereof as subject image illuminating conditions characterizing viewing environment of the subject image;

acquiring second chromaticity information and second illuminance information of a second illuminating light source illuminating a reproduced image of said subject image as reproduced image viewing conditions characterizing viewing environment in viewing the reproduced image of said subject image; and performing on said first digital image data appearance conversion processing for obtaining a match between an appearance of said reproduced image on which said subject image is reproduced and an appearance of said subject image by using said first and second chromaticity information and said first and second illuminance information of the first and second illuminating light sources, wherein said appearance conversion processing includes:

at least one of contrast conversion and chroma conversion performed on first colorimetric values of said subject image obtained by colorimetric conversion from said first digital image data based on a chromaticity value in a case where an adaptation luminance is set higher than that obtained from said first chromaticity information and said first illuminance information of the first illuminating light source to obtain converted colorimetric values of said subject image;

chromatic adaptation correction performed on said converted colorimetric values of the subject image based on said first and second chromaticity information and said first and second illuminance information of the first and second illuminating light sources, and contrast correction performed on said converted colorimetric values of the subject image based on said first and second illuminance information of the first and second illuminating light sources, thereby acquiring second colorimetric values of said subject image; and flare correction for correcting an amount of flare in outputting a reproduced subject image for said second colorimetric values of the subject image in accordance with the viewing environment of the reproduced subject image as said reproduced image to obtain as tristimulus values corrected third colorimetric values of said reproduced subject image to be output, at least one processing of said contrast conversion, said chroma conversion, said chromatic adaptation correction, said contrast correction and said flare correction includes a plurality of conversion processes with different conversion intensities for a single kind of conversion process, at least two conversion processes of said plurality of color conversion processes are synthesized in accordance with said first digital image data of the subject image to obtain one conversion process, and said appearance conversion processing is performed by performing said at least one processing using the thus synthesized one conversion process and second digital image data of said reproduced image is obtained from said third colorimetric values of the reproduced image to be output.

77. The image processing method according to claim 76, wherein said conversion process is performed using one or more color conversion tables.

78. The image processing method according to claim 76, wherein all processing in said appearance conversion processing is performed as single conversion processing, one kind of color conversion table is set as said single kind of conversion process for said single conversion processing, and a plurality of color conversion tables with the different enhancement parameters are set for said one kind of color conversion table as said plurality of conversion processes with the different conversion intensities for said one kind of conversion process.

79. The image processing method according to claim 78, wherein said enhancement parameters comprise a luminance ratio to a luminance under said first illuminating light source and a chroma.

80. The image processing method according to claim 76, wherein
said subject image is obtained by photographing said subject,
said first digital image data comprises one of image data photoelectrically read from a color negative film on which said subject is photographed and image data photoelectrically directly acquired by photographing said subject, and
said first illuminating light source comprises a light source for illuminating said subject in photographing said subject.

81. The image processing method according to claim 76, wherein
said subject image comprises a transparent image to be viewed,
said first digital image data comprises image data of said transparent image, and
said first illuminating light source comprises a light source for illuminating said transparent image when said transparent image is viewed.

82. The image processing method according to claim 81, wherein
said transparent image comprises a transparent image to be viewed on a color reversal film, and
said image data of said transparent image comprises image data photoelectrically read from said color reversal film.

83. The image processing method according to claim 76, wherein
said reproduced image comprises a reflection image to be viewed, on which said subject image is reproduced,
said second digital image data comprises image data for outputting said reflection image, and
said second illuminating light source comprises a light source for illuminating said reflection image when said reflection image is viewed.

84. The image processing method according to claim 83, wherein said reflection image comprises a photographic print image.

85. The image processing method according to claim 76, wherein said plurality of conversion processes are set by an image characteristic amount of said subject image.

86. The image processing method according to claim 76, wherein said one conversion process is obtained by synthesizing said at least two conversion processes selected from said plurality of conversion processes based on an image characteristic amount of said subject image obtained from said first digital image data of said subject image.

87. The image processing method according to claim 10 or 11, wherein said image characteristic amount of said subject image is obtained based on at least one attribute value including a lightness and a chroma of said subject image, and said one conversion process obtained by synthesis is obtained based on said at least one attribute value.

88. The image processing method according to claim 76, wherein said chromaticity value in the case where said adaptation luminance is set higher than that obtained from said chromaticity information and said illuminance information of the first illuminating light source comprises a chromaticity value when it is assumed that perfect adaptation to said light source is achieved.

89. The image processing method according to claim 76, wherein said colorimetric values comprise tristimulus values.

90. An image processing device, comprising:
first acquisition means for acquiring first digital image data of a subject image;
second acquisition means for acquiring first chromaticity information and first illuminance information of a first illuminating light source illuminating one of said subject image and a subject thereof as subject image illuminating conditions characterizing viewing environment of the subject image;
third acquisition means for acquiring second chromaticity information and second illuminance information of a second illuminating light source illuminating a reproduced image of said subject image as reproduced image viewing conditions characterizing viewing environment for viewing the reproduced image; and
appearance conversion processing means for performing on said first digital image data appearance conversion processing for obtaining a match between an appearance of said reproduced image on which said subject image is reproduced and an appearance of said subject image by using said first and second chromaticity information and said first and second illuminance information of the first and second illuminating light sources,
wherein said appearance conversion processing means performs as said appearance conversion processing,
at least one of contrast conversion and chroma conversion performed on colorimetric values of said subject image obtained by colorimetric conversion from said first digital image data based on a chromaticity value in a case where an adaptation luminance is set higher than that obtained from said first chromaticity information and said first illuminance information of the first illuminating light source to obtain converted colorimetric values of said subject image,
chromatic adaptation correction performed on said converted colorimetric values of the subject image based on said first and second chromaticity information and said first and second illuminance information of the first and second illuminating light sources, and contrast correction performed on said converted colorimetric values of the subject image based on said first and second illuminance information of the first and second illuminating light sources, thereby acquiring second colorimetric values of said subject image and
flare correction for correcting an amount of flare in outputting a reproduced subject image for said second colorimetric values of the subject image in accordance with the viewing environment of the reproduced subject image as said reproduced image to obtain as tristimulus values corrected third colorimetric values of said reproduced subject image to be output,
wherein said appearance conversion processing means includes:
storage means for storing a plurality of color conversion tables with different conversion intensities for one kind of color conversion table for performing at least one processing of said contrast conversion, said chroma conversion, said chromatic adaptation correction, said contrast correction and said flare correction; and
synthesis means for synthesizing at least two conversion processes of said plurality of color conversion tables into one color conversion table in accordance with said first digital image data of the subject image, and
wherein said appearance conversion processing is performed by performing said at least one processing using said one color conversion table obtained by synthesis and second digital image data of the reproduced image is obtained from said third colorimetric values of the reproduced image to be output.

91. The image processing device according to claim 90, wherein said appearance conversion processing means performs all processing of said appearance conversion processing as single conversion processing, said one kind of color conversion table is set for said single conversion processing, and a plurality of color conversion tables with different enhancement parameters are set as said plurality of color conversion tables with said different conversion intensities for said one kind of color conversion table.

92. The image processing device according to claim 91, wherein said enhancement parameters comprise a luminance ratio to a luminance under said first illuminating light source and a chroma.

93. The image processing device according to claim 90, wherein said plurality of color conversion tables are set by an image characteristic amount of said subject image.

94. The image processing device according to claim 90, wherein said synthesis means synthesizes said at least two color conversion tables selected from said plurality of color conversion tables into said one color conversion table based on an image characteristic amount of said subject image obtained from said first digital image data of the subject image.

95. The image processing device according to claim 93, wherein said image characteristic amount of said subject image is obtained based on at least one attribute value including a lightness and a chroma of said subject image, and said one conversion process obtained by synthesis is obtained based on said at least one attribute value.

96. An image forming device comprising:
an image processing device; and
image output means for outputting a photographic print image based on second digital image data of a reproduced image being subjected to appearance conversion processing in said image processing device,
wherein said image processing means includes:
first acquisition means for acquiring first digital image data of a subject image;
second acquisition means for acquiring first chromaticity information and first illuminance information of a first illuminating light source illuminating one of said subject image and a subject thereof as subject image illuminating conditions characterizing viewing environment of the subject image;
third acquisition means for acquiring second chromaticity information and second illuminance information of a second illuminating light source illuminating a reproduced image of said subject image as reproduced image viewing conditions characterizing viewing environment for viewing the reproduced image; and appearance conversion processing means for performing on said first digital image data appearance conversion processing for obtaining a match between an appearance of said reproduced image on which said subject image is reproduced and an appearance of said subject image by using said first and second chromaticity information and said first and second illuminance information of the first and second illuminating light sources, wherein said appearance conversion processing means performs as said appearance conversion processing, at least one of contrast conversion and chroma conversion performed on colorimetric values of said subject image obtained by colorimetric conversion from said first digital image data based on a chromaticity value in a case where an adaptation luminance is set higher than that obtained from said first chromaticity information and said first illuminance information of the first illuminating light source to obtain converted colorimetric values of said subject image, chromatic adaptation correction performed on said converted colorimetric values of the subject image based on said first and second chromaticity information and said first and second illuminance information of the first and second illuminating light sources, and contrast correction performed on said converted colorimetric values of the subject image based on said first and second illuminance information of the first and second illuminating light sources, thereby acquiring second colorimetric values of said subject image and flare correction for correcting an amount of flare in outputting a reproduced subject image for said second colorimetric values of the subject image in accordance with the viewing environment of the reproduced subject image as said reproduced image to obtain as tristimulus values corrected third colorimetric values of said reproduced subject image to be output, wherein said appearance conversion processing means includes:

storage means for storing a plurality of color conversion tables with different conversion intensities for one kind of color conversion table for performing at least one processing of said contrast conversion, said chroma conversion, said chromatic adaptation correction, said contrast correction and said flare correction; and synthesis means for synthesizing at least two conversion processes of said plurality of color conversion tables into one color conversion table in accordance with said first digital image data of the subject image, and wherein said appearance conversion processing is performed by performing said at least one processing using said one color conversion table obtained by synthesis and second digital image data of the reproduced image is obtained from said third colorimetric values of the reproduced image to be output.

97. A computer-readable medium having embodied thereon an image processing program for executing an image processing method by computer control, said image processing method including:

acquiring first digital image data of a subject image;

acquiring first chromaticity information and first illuminance information of a first illuminating light source illuminating one of said subject image and a subject thereof as subject image illuminating conditions characterizing viewing environment of the subject image;

acquiring second chromaticity information and second illuminance information of a second illuminating light source illuminating a reproduced image of said subject image as reproduced image viewing conditions characterizing viewing environment in viewing the reproduced image of said subject image; and performing on said first digital image data appearance conversion processing for obtaining a match between an appearance of said reproduced image on which said subject image is reproduced and an appearance of said subject image by using said first and second chromaticity information and said first and second illuminance information of the first and second illuminating light sources, wherein said appearance conversion processing includes:

at least one of contrast conversion and chroma conversion performed on first colorimetric values of said subject image obtained by colorimetric conversion from said first digital image data based on a chromaticity value in a case where an adaptation luminance is set higher than that obtained from said first chromaticity information and said first illuminance information of the first illuminating light source to obtain converted colorimetric values of said subject image;

chromatic adaptation correction performed on said converted colorimetric values of the subject image based on said first and second chromaticity information and said first and second illuminance information of the first and second illuminating light sources, and contrast correction performed on said converted colorimetric values of the subject image based on said first and second illuminance information of the first and second illuminating light sources, thereby acquiring second colorimetric values of said subject image; and flare correction for correcting an amount of flare in outputting a reproduced subject image for said second colorimetric values of the subject image in accordance with the viewing environment of the reproduced subject image as said reproduced image to obtain as tristimulus values corrected third colorimetric values of said reproduced subject image to be output, at least one processing of said contrast conversion, said chroma conversion, said chromatic adaptation correction, said contrast correction and said flare correction includes a plurality of conversion processes with different conversion intensities for a single kind of conversion process, at least two conversion processes of said plurality of color conversion processes are synthesized in accordance with said first digital image data of the subject image to obtain one conversion process, and said appearance conversion processing is performed by performing said at least one processing using the thus synthesized one conversion process and second digital image data of said reproduced image is obtained from said third colorimetric values of the reproduced image to be output.

98. A computer readable recording medium, on which an image processing program for executing an image processing method by computer control is recorded, said image processing method including:

acquiring first digital image data of a subject image;

acquiring first chromaticity information and first illuminance information of a first illuminating light source illuminating one of said subject image and a subject thereof as subject image illuminating conditions characterizing viewing environment of the subject image;

acquiring second chromaticity information and second illuminance information of a second illuminating light source illuminating a reproduced image of said subject image as reproduced image viewing conditions characterizing viewing environment in viewing the reproduced image of said subject image; and performing on said first digital image data appearance conversion processing for obtaining a match between an appearance of said reproduced image on which said subject image is reproduced and an appearance of said subject image by using said first and second chromaticity information and said first and second illuminance information of the first and second illuminating light sources, wherein said appearance conversion processing includes:

at least one of contrast conversion and chroma conversion performed on first colorimetric values of said subject image obtained by colorimetric conversion from said first digital image data based on a chromaticity value in a case where an adaptation luminance is set higher than that obtained from said first chromaticity information and said first illuminance information of the first illuminating light source to obtain converted colorimetric values of said subject image;

chromatic adaptation correction performed on said converted colorimetric values of the subject image based on said first and second chromaticity information and said first and second illuminance information of the first and second illuminating light sources, and contrast correction performed on said converted colorimetric values of the subject image based on said first and second illuminance information of the first and second illuminating light sources, thereby acquiring second colorimetric values of said subject image; and flare correction for correcting an amount of flare in outputting a reproduced subject image for said second colorimetric values of the subject image in accordance with the viewing environment of the reproduced subject image as said reproduced image to obtain as tristimulus values corrected third colorimetric values of said reproduced subject image to be output, at least one processing of said contrast conversion, said chroma conversion, said chromatic adaptation correction, said contrast correction and said flare correction includes a plurality of conversion processes with different conversion intensities for a single kind of conversion process, at least two conversion processes of said plurality of color conversion processes are synthesized in accordance with said first digital image data of the subject image to obtain one conversion process, and said appearance conversion processing is performed by performing said at least one processing using the thus synthesized one conversion process and second digital image data of said reproduced image is obtained from said third colorimetric values of the reproduced image to be output.

99. The image processing method according to claim 7, wherein the degree of adaptation is dependent on a luminance value at an outdoor daylight level.

100. The image processing method according to claim 7, wherein the degree of adaptation indicates a level of adaptation of an observer of the subject image to a second light source which illuminates the output subject image.

101. The image processing method according to claim 53, wherein the plurality of conversion processes comprise a luminance ratio and a chroma.

102. The image processing method according to claim 1, wherein said correcting of the amount of flare is calculating a degree of decrease in density due to the amount of flare from environment conditions when the reproduced subject image is viewed and performing density correction on said colorimetric values of the subject image which have been subjected to said chromatic adaptation correction and said contrast correction so as to compensate for the decrease in density due to the amount of flare.

103. The image processing method according to claim 1, wherein said second colorimetric values of the subject image are obtained by performing said chromatic adaptation correction and said contrast correction which comprise the steps of:

performing chromatic adaptation forward conversion using said first chromaticity information and said first illuminance information of the first light source and contrast forward conversion using said first illuminance information of the first light source on said first colorimetric values of the subject image to convert said first colorimetric values of the subject image to attribute values of appearance of the subject image; and then performing chromatic adaptation inverse conversion using said second chromaticity information and said second illuminance information of the second light source and contrast inverse conversion using said second illuminance information of the second light source on said attribute values of appearance of the subject image to convert said attribute values of appearance of the subject image to said second colorimetric values of the subject image.

104. The image processing method according to claim 103, wherein said attribute values of appearance of the subject image include hue, lightness and chroma.

105. The image processing method according to claim 1, wherein said second colorimetric values of the subject image are obtained by performing chromatic adaptation forward conversion using said first chromaticity information and said first illuminance information of the first light source and chromatic adaptation inverse conversion using said second chromaticity information and said second illuminance information of the second light source on said first colorimetric values of the subject image as said chromatic adaptation correction; and performing contrast forward conversion using said first illuminance information of the first light source and contrast inverse conversion using said second illuminance information of the second light source on said first colorimetric values of the subject image as said contrast correction.

* * * * *